United States Patent [19]

Basov et al.

[11] 4,209,768
[45] Jun. 24, 1980

[54] AIRCRAFT TAKE-OFF AND LANDING SYSTEM AND METHOD FOR USING SAME

[76] Inventors: Nikolai G. Basov, ulitsa Dmitria Ulyanova, 3, kv. 113, Moscow; Igor A. Berezhnoi, ulitsa Tukhachevskogo, 253, kv. 18; Vyacheslav S. Vekshin, ulitsa Partizanskaya, 94, kv. 56, both of Kuibyshev; Vladimir A. Danilychev, ulitsa Profsojuznaya, 111, korpus 3, kv. 226, Moscow; Albert I. Elatontsev, ulitsa Sovetskoi Armii, 163, kv. 16, Kuibyshev; Vladimir V. Ignatiev, prospekt Kirova, 293, kv. 40, Kuibyshev; Vitaly D. Karyshev, ulitsa Sportivnaya, 5-25, kv. 5, Kuibyshev; Alexandr K. Togulev, ulitsa Jubileinaya, 8, kv. 71, Kuibyshev, all of U.S.S.R.

[21] Appl. No.: 794,413

[22] Filed: May 6, 1977

Related U.S. Application Data

[62] Division of Ser. No. 622,762, Oct. 15, 1975, Pat. No. 4,063,218.

[51] Int. Cl.$^2$ .............................................. G08G 5/00
[52] U.S. Cl. .................................. 340/26; 244/114 R
[58] Field of Search ................... 340/26, 366 R, 27 R, 340/27 NA; 343/108 R, 112 R, 101, 107, 106 R, 108 M; 244/180, 114 R, 186, 183, 189; 250/349, 372

[56] References Cited

U.S. PATENT DOCUMENTS

| | | | |
|---|---|---|---|
| 1,872,975 | 8/1932 | Kolster | 340/26 |
| 2,152,202 | 3/1939 | Miller | 340/26 |
| 2,463,095 | 3/1949 | Wight et al. | 343/108 R |
| 2,536,112 | 1/1951 | Varian et al. | 343/108 R |
| 2,549,860 | 4/1951 | Swanson | 343/108 R |
| 2,596,603 | 5/1952 | Sands | 340/26 |
| 2,794,967 | 6/1957 | Coggins et al. | 340/26 |
| 2,822,540 | 2/1958 | Butler | 343/108 R |
| 3,012,224 | 12/1961 | Ferguson | 340/26 |
| 3,152,316 | 10/1964 | Baxter et al. | 340/26 |
| 3,302,201 | 1/1967 | Vladimir et al. | 343/106 R |
| 3,648,231 | 3/1972 | Owens et al. | 340/27 NA |
| 3,662,180 | 5/1972 | Jorgensen et al. | 340/26 |
| 3,665,198 | 5/1972 | Barstad | 343/108 R |
| 3,952,309 | 4/1976 | Lammers | 343/108 R |
| 3,968,495 | 7/1976 | Hergenrother | 343/108 R |

FOREIGN PATENT DOCUMENTS 793868  4/1958  United Kingdom ...................... 340/26

Primary Examiner—John W. Caldwell, Sr.
Assistant Examiner—James J. Groody
Attorney, Agent, or Firm—Fleit & Jacobson

[57] ABSTRACT

An aircraft take-off and landing system, wherein a symbol of a specified configuration is employed as an instrument means for take-off and landing.

This symbol is formed by directed extended references made up of electromagnetic pencil beams with a wavelength which is within atmospheric windows, produced by at least one source of electromagnetic radiation, positioned on a flight platform. The electromagnetic pencil beams are oriented in space so that they determine the configuration of a symbol and, simultaneously, indicate the course and glide slope of an aircraft take-off and landing path, set a spatical take-off and landing corridor wherein this path lies, and show additionally various limits of a take-off and landing platform or various marker points of an estimated take-off and landing path. The method of aircraft take-off and landing, according to the proposed system, consists in flying an aircraft on a symbol of a specified configuration, its distortions being indicative of the aircraft's deviation from the estimated take-off and landing path and their magnitude being indicative of the deviation direction and value. The proposed system may be made purely instrumental or visual, permitting both automatic and manual flying of an aircraft and is 100 or 1,000 times more accurate than conventional systems with localizers and glide slope transmitters. The aircraft flying method, according to the proposed system, is characterized by exceptional simplicity and reliability, it remains consistent at all stages of a take-off or landing path.

6 Claims, 52 Drawing Figures

SOURCES MAY HAVE DIFFERENT COLORS

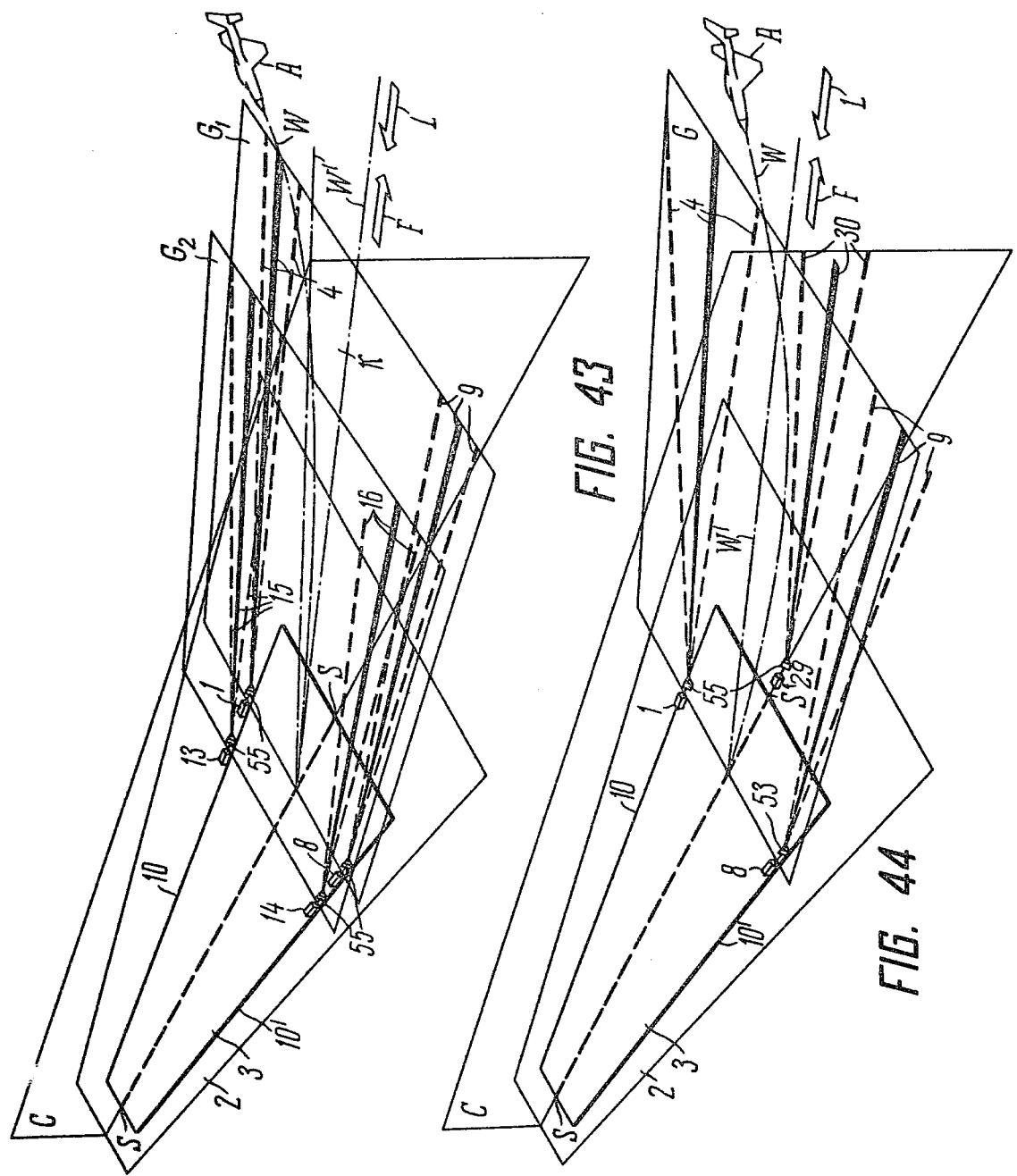

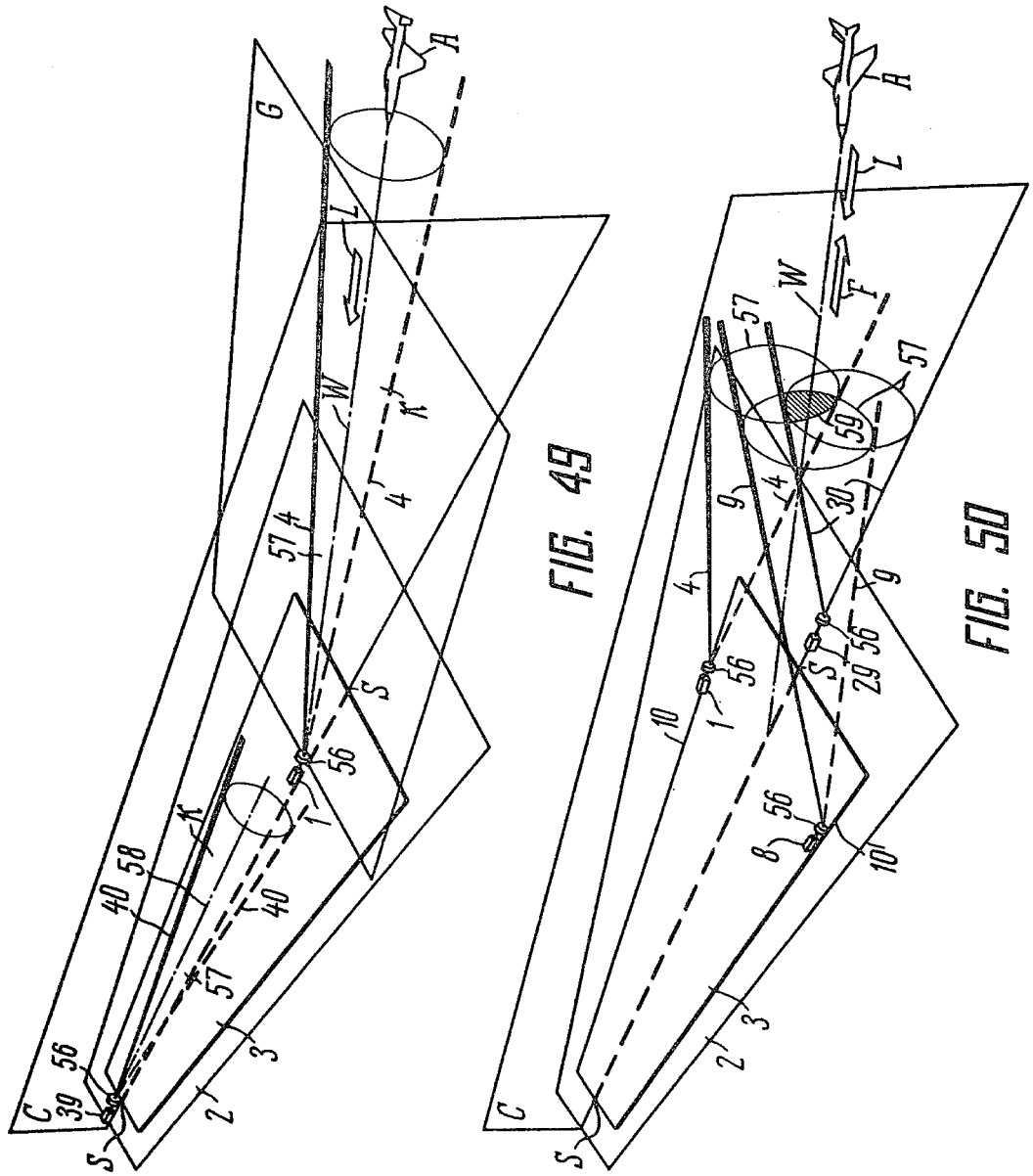

AIRCRAFT TAKE-OFF AND LANDING SYSTEM AND METHOD FOR USING SAME

This is a divisional of application Ser. No. 622,762, filed Oct. 15, 1975 now U.S. Pat. No. 4,063,218.

This invention relates to aviation equipment and, in particular, to aircraft take-off and landing systems.

There are known take-off and landing systems comprising different functionally isolated systems making up a take-off and landing system as a whole and performing different functions at successive stages of the take-off or landing, special mention being deserved by localizer and glide slope transmitter systems indicating the course and glide slope to an aircraft during landing, radio beacon systems, lighting systems marking the runway, approach and lead-in lights systems, radio marker systems indicating the moment of an aircraft being overhead the middle and outer marker locators, and, in the Instrument Landing System (ILS), also overhead an additional middle marker locator, various ground controlled approach systems, etc. All these systems are based on employment of electromagnetic radiation of radio-frequency or visible range. Specifically, localizer and glide slope systems use radiowaves of metric, decimetric, or centimetric wavelengths. Such systems as approach and lead-in lights, as well as runway marking systems are made as visual means assisting the pilot to determine the location of his aircraft in space in relation to the runway. There are also known lighting systems indicating the glide slope and course of an aircraft. Such systems are frequently employed for landing aircraft on a carrier deck. Among these is a landing system made as a mirror indicator and designated as Deck Landing Mirror Sight (DLMS).

Besides, there is a DLPS (Deck Landing Projector Sight) landing system or the so called projector approach indicator.

Despite the tremendous difference in the structural principle, purpose and design, all these systems are common in that they employ electromagnetic radiation as directed radiation, any scattered radiation being regarded as an interfering noise.

Enhancing flight safety is currently considered one of the major trends in the progress of aviation, particularly at the stage of approach for landing and landing itself.

The solution of the problem will make it possible to introduce more stringent landing minima (altitude of decision taking and runway visibility distance). This may result in decrease of aircraft idle time caused by adverse weather conditions, and higher economic efficiency of aviation, particularly of civil airlines.

That is why take-off and landing systems are constantly improved, new ones are developed and old ones are upgraded to step up their reliability and service life. Development and improvement of take-off and landing systems are basically characterized by a tendency to upgrade the performances of separate, functionally isolated systems constituting a take-off and landing system as a whole, as well as to provide new systems permitting automatic approach and landing until aircraft touchdown and landing run. Besides, a plurality of various auxiliary and additional systems have been and are being developed to serve as duplicates of those in operation at present or to perform auxiliary functions assisting the pilot to take off or land. Even the advent of new sources of electromagnetic radiation, exhibiting novel properties, gives rise to development of systems duplicating the existing functionally isolated systems.

Thus, the invention of lasers resulted in development of a number of visual auxiliary systems assisting the pilot to determine the direction to the runway. In particular, there is a navigational system according to U.S. Pat. No. 3,874,968, which is structurally made as three rows of reflecting mirrors positioned along straight lines directed to the runway, laser beams being reflected therefrom, comprising lasing sources, vertical beam oscillating means and a beam visibility limiting means. Such a system produces an effect of a beam travelling in the direction of the runway and helps the pilot to find that direction. The width of the approach zone is limited by the beams reflected from the screens placed to the left and to the right of the runway and narrows as an aircraft approaches the runway.

However, as it was pointed out at the 7th Aeronavigational Conference held in Montreal in April, 1972, none of the existing landing systems, including the international Instrument Landing System (ILS), will be able to meet, in the near future, the requirements imposed upon landing systems, since transition to more rigid landing minima calls for better accuracy and a wider sphere of functional capabilities as compared to the ILS system. The advent of new types of aircraft is also to be taken into consideration.

The 7th Aeronavigational Conference considered the present situation and promoted an ICAO programme project to develop a new landing approach system. Such a system is to possess much greater capabilities and, primarily, high-degree accuracy. Suffice it to say that the permissible altitude error at the runway threshold should not exceed 1.2 m and diminish till the beginning of levelling-off directly prior to landing. Besides, the system is to provide for control along the landing path, thereby offering an acceptable accuracy of landing.

This decision of the 7th Aeronavigational Conference derives from the fact that the systems in service feature a number of fundamental disadvantages, their low sensitivity being among the most serious ones and, consequently, low accuracy of aircraft flying and a narrow scope of functions. Though the accuracy of localizer and glide slope transmitter systems is more often than not satisfactory and outperforms similar purpose lighting systems in accuracy many times over, they make flying of an aircraft difficult since there is not reliable visual information as to the spatial attitude of an aircraft. Some steps have been taken, however, in the last years. In particular, television systems are employed permitting the pilot to see the runway in low-visibility conditions or systems projecting the instrument information onto the windscreen, etc.

A holographic landing indicator (cf. U.S. Pat. No. 3,583,784) may be taken as an example, whereon an image of the runway is displayed before the pilot corresponding to the actual attitude of the aircraft in relation to the runway at a given moment.

The appearance of a great number of various functionally isolated systems constituting a take-off and landing system as a whole resulted in development of a whole set of diverse instruments mounted aboard the aircraft. The pilot should watch the readings of a plurality of instruments during landing and observe the situation outside the aircraft. This is the cause of a high psychological stress, makes pilotage difficult and gives rise to additional accident cause factors, since transition from instrument to visual flying and observation of the outside space demands a period of 3–5 sec for visual accomodation and ground objects identification.

It should be emphasized that in developing various functionally isolated systems comprising a take-off and landing system as a whole, emphasis is laid on the development of systems for aircraft landing. This is due to the fact that the process of landing is no doubt more complicated and the number of flight accidents and air crashes is decidedly higher during landing than during take-off. The advent of high-speed and, particularly, supersonic aircraft, however, has posed the problem of take-off safety, especially in difficult weather conditions.

Availability of diversified take-off and landing systems with a plurality of various functionally isolated systems resulted in evolvement of several landing techniques. The number of take-off methods is much fewer.

The method of aircraft take-off and landing depends on the nature of a take-off and landing system. Landing technique comprises a number of successive operations and consists in bringing an aircraft within the coverage of an airfield take-off and landing system, aircraft descent along an estimated landing path, flaring out, landing and ground run.

In case of the take-off and landing system of an airfield comprises a localizer and glide slope transmitter system, the landing process proper starts with the moment the aircraft on-board equipment captures the localizer and glide slope transmitter landing system.

An estimated landing path of localizer and glide slope transmitter systems is the line of intersection of the course plane and the glide slope plane of an aircraft produced by a localizer and a glide slope transmitter, respectively. These planes are usually equisignal zones or, in some instances, zones of modulation frequencies minimum radiation. Aircraft deviation from the equisignal zone of a localizer is determined by the localizer receiver, whereas deviation from the equisignal zone of a glide slope transmitter is determined with the help of the glide slope receiver. Basically, two radio beacon instrument landing systems are currently used in civil aviation: the international ILS system (Instrument Landing System) and a landing system employed by airfields in the Soviet Union (CII50), the difference between these two systems being the nature of beacon radiation. In case an airfield is not equipped with a localizer and glide slope transmitter system, an aircraft moves in the glide slope plane by determining the distance to the runway threshold and its altitude, as well as the moment of flying overhead the radio markers. The course is controlled by tracking homing beacons and by a magnetic compass.

As the aircraft approaches the runway threshold, it is flown, beginning from the decision height, visually by landmarks and by night with the help of lighting aids arranged on the ground on the runway along its edges and at its approaches. The aircraft is usually flared out manually with visual orientation by references on the runway. Then, the aircraft touches down and performs the landing run.

In the case of automatic landing, the whole process of landing to the end of the ground run is performed fully automatically. The existing automatic landing systems are, however, far from being perfect and do not satisfy the requirements imposed thereon.

The take-off technique consists in running, separation and climbing, and is currently performed manually, because no take-off systems have been developed so far, except for lighting aids and runway lights.

Carrier landing systems are, as a rule, of a combined type and comprise localizer and glide slope transmitter systems and light course and glide slope indicator systems for greater landing reliability. Besides, various additional monitoring and auxiliary systems are employed to increase landing safety.

Among carrier radio landing systems are, for example, the A-Sean system developed by the Flazesean company, the AN/SN-42 system operating in three modes: command, semi-automatic and fully automatic, as well as the ACLS system (All-Weather Carrier Landing System) and the like.

Modern carrier landing systems operate, as a rule, automatically both at the stage of bringing an aircraft to an estimated landing path and at the stage of landing proper until the aircraft touches the landing deck. Visual systems are employed for monitoring and for manual landing in case of automatic equipment failure.

Development of take-off and landing systems composed of various functionally isolated systems performing a variety of functions in the process of aircraft take-off and landing is not the result of a unified effort to solve the problem of safe and reliable aircraft landing, but a product of lengthy evolution, the systems being gradually improved, supplemented by others, duplicated, etc. The result of that prolonged process of improvement has been that information on the spatial attitude of an aircraft, supplied by diverse isolated systems, comprises a variety of basically different signals, like, for example, deflections of pointers or bars of instruments of localizer and glide slope transmitter systems, light signals of light systems, in particular, approach and lead-in lights systems, audible signals indicating flight overhead radio markers, etc. The inflow of a great number of functionally isolated systems has been brought about by a striving to make up to shortcomings of some component systems by using others. Thus, for example, light localizer - GS systems complement radio localizer - GS systems to make up for their most serious drawback consisting in that visual observation of the estimated landing path is impossible.

Practically all existing take-off and landing systems are deficient in that they do not produce clearly marked spatial runway limits, providing no extension to the runway which would make landing so much easier. Lighting aids marking runway boundaries, as well as approach and lead-in lights serve the purpose to a certain degree, but such equipment is positioned on an airfield in a plane different from the glide slope plane. This demands great skill of spatial orientation of the pilot. Systems producing light glide slopes based on light beam dynamics provide indistinct borders of the glide slope plane, since it is marked by spotlight beams and due to their characteristics, particularly to their great divergence, the borders are blurred.

The list of similar drawbacks of conventional take-off and landing systems may be continued, but it will be stopped here, since many of the drawbacks are fully evident as they were emphasized in the documents of the 7th Aeronavigational Conference resulting in the promotion of a draft ICAO program to develop new landing systems.

The problem of developing a take-off and landing system complying with the requirements of modern aviation and its future progress may be solved only comprehensively and is to employ new principles of system design different from the traditional ones, since they have already exhausted their potentialities. It should also be taken into consideration that a pilot is to be provided with reliable information on the aircraft's spatial attitude on its take-off path and its deviations from the estimated take-off path.

It is an object of this invention to provide a take-off and landing system ensuring the entire process of landing of an aircraft from the moment it comes to the landing course to the end of the landing run and the process of take-off of an aircraft from the moment it starts its take-off run till reaching the safe altitude.

Another object of this invention is to provide a take-off and landing system ensuring high accuracy of aircraft take-off and landing, exceeding the accuracy of all currently used take-off and landing systems.

Yet another object of this invention is to provide a take-off and landing system which can be made both instrumental and visual with proper selection of a wavelength of electromagnetic radiation.

Still another object of the invention is to provide a visual take-off and landing system ensuring the process of aircraft take-off and landing with an accuracy no less than that of any modern instrumental take-off and landing systems.

A further object of this invention is to provide a landing system ensuring high accuracy of aircraft landing on the landing deck of a carrier ship.

A still further object of this invention is to provide a landing system ensuring high accuracy of aircraft landing.

Another object of this invention is to provide a take-off system ensuring high accuracy of aircraft take-off.

Yet another object of this invention is to provide a take-off and landing system featuring high accuracy of aircraft take-off and landing in any weather.

Still another object of this invention is to provide a landing system indicating an assigned distance to the beginning of a runway.

A further object of this invention is to provide a landing system indicating an assigned speed of aircraft's flight along the estimated landing path.

A still further object of this invention it to provide a take-off and landing system indicating the boundaries of a runway.

Another object of this invention is to provide a take-off and landing system ensuring determination of the magnitude and direction of the aircraft's bank in the course of take-off and landing.

Yet another object of this invention is to provide a landing system ensuring aircraft landing along a curved or broken landing path.

A further object of this invention is to provide a fundamentally new method of aircraft take-off and landing, ensuring high accuracy take-off and landing of an aircraft through the use of the proposed take-off and landing system, said method remaining the consistent at all stages of take-off and landing.

A still further object of this invention is to provide a fundamentally new method of determining the course and glide slope of a take-off or landing path.

Another object of this invention is to provide a fundamentally new method of determining the limits of a take-off or landing corridor during aircraft take-off and landing.

Yet another object of this invention is to provide a new method of determining the boundaries of a runway.

Still another object of this invention is to provide a new method of determining the assigned range to a runway in the course of aircraft landing.

A further object of this invention is to provide a new method of determining the aircraft flare initiation point during landing.

Another object of this invention is to provide a new method of determining the aircraft's bank during take-off or landing.

Yet another object of this invention it to provide a fundamentally new method of landing an aircraft along a curved or broken path.

Still another object of this invention is to provide a fundamentally new method of determining motions of a ship landing deck during aircraft landing.

Still another object of this invention it to provide a basically new method of determining the assigned speed of the aircraft's flight along the estimated landing path.

And, finally, another object of this invention is to provide a fundamentally new method being the same in instrumental and visual take-off or landing of an aircraft.

These and other objects are achieved by that an aircraft take-off and landing system is made as directed extended references made up of electromagnetic pencil beams with a divergence no greater than 5° and a wavelength lying within atmospheric windows, one or several sources of said beams being positioned on a flight platform. These beams are perceived on board an aircraft, when it is outside the direct radiation zone, owing to scattering of the electromagnetic radiation, producing a beam, on air molecules and atmospheric aerosols, and produce a symbol acquiring a specified configuration in case the aircraft is on an estimated take-off or landing path.

Some of the beams, besides producing a symbol of the estimated take-off or landing path, produce additional symbols acquiring a specified configuration when an aircraft reaches an assigned range or the surface of the take-off and landing platform. All symbols produced by the beams of various sources are basically alike and ensure determination, besides aircraft's deviations from the estimated take-off or landing path, of the aircraft's bank, the assigned range to the take-off and landing platform, as well as deviations of the aircraft's speed from the assigned speed of movement along the estimated take-off or landing path.

These objects are achieved by providing a new method of aircraft take-off and landing, consisting in that an aircraft is piloted along an estimated take-off or landing path by maintaining the specified symbol configuration, and all aircraft's deviations from said path may be determined by distortions of said symbol configuration. The take-off and landing method is consistent at all stages of take-off or landing and ensures successive execution of all steps during take-off or landing by distortions of the specified symbol configuration.

The following terms will be used henceforth in the specification to avoid ambiguity and for the sake of simplicity.

Take-off and landing platform is a prepared site for aircraft take-off or landing, positioned on the ground or aboard a ship, or forming part of a water surface. In a specific case the take-off and landing platform may be a runway on a ground airfield, as well as a take-off or landing deck of a ship. The take-off and landing platform is a part of a flight platform.

Flight platform is an area including the take-off and landing platform, as well as adjacent take-off termination areas and side safety strips. A flight platform is a part of an airfield. In a specific case, the flight platform is a flight strip of a ground airfield with a width of no less than 150 m to each side of the runway center line or take-off termination area.

Directed extended reference is a system of material points or bodies contrasting against the background of the environment and organized as extended directed plane or 3-D configurations of small cross dimensions. Examples of directed extended references can be found in markings of a highway or a runway, curb stones running along the edges of a highway, etc. Directed extended references may be made as a system of discrete luminous points, such as lights indicating the side boundaries of a runway or its center line, etc.

Electromagnetic pencil beams with a divergence no greater than 5° and energy contrast in the selected wavelength against the background of the environment are employed in the proposed invention as directed extended references. The cross section of a beam should be such that, when an aircraft is on the estimated take-off or landing path, it is perceived at an angle of no more than 10° to provide for the required accuracy and sensitivity of the system. The best results, however, can be obtained if the beam cross section permit its perception at an angle of no more than 1–2°.

The energy contrast derives from the fact that the energy density of scattered electromagnetic radiation, resulting from propagation of direct electromagnetic radiation in the atmosphere, producing the beam exceeds the energy density of the background and is achieved by the appropriate power of direct electromagnetic radiation producing the beam.

The wavelength of electromagnetic radiation is to be selected so that it is within so-called atmospheric windows, that is, it corresponds to the conditions of minimum absorption by air molecules and atmospheric aerosols. Under these conditions, direct radiation is attenuated and almost completely transformed into scattered radiation. Scattering occurs on air molecules, so-called Rayleigh scattering, as well as on aerosols present in the atmosphere, so-called Mie scattering. Due to scattering, the energy contrast of the beam becomes apparent against the background of the environment, and this scattered radiation may be detected by a receiver, if it deviates sidewise from the beam.

If the wavelength of electromagnetic radiation is selected within the visible range of electromagnetic radiation, the beam becomes visible. Therefore, the receiver may be a human eye and the take-off and landing system using such beams becomes a visual system.

Glide slope is a path of an aircraft take-off or landing during take-off or approach for landing. The notion "glide slope" in this case, unlike the commonly accepted term, is extended to include a take-off path for the sake of unification of terminology. Words "take-off" or "landing" are added to make clear what glide slope is meant, e.g., "aircraft take-off glide slope".

Estimated glide slope is a glide slope of a specific airfield ensuring the required obstacle clearance limit.

Glide slope plane is a plane orthogonal to the course plane and comprising the estimated glide slope.

Source of electromagnetic radiation is a means for emitting or reflecting an electromagnetic beam, made as a mirror, reflecting surface, aerial array, etc, or a generator, as in the case of lasers or spotlights.

Electromagnetic pencil beams are beams with a divergence no greater than 5°. The best results, however, can be obtained with a beam divergence no greater than 5'–10'. The extreme minimum divergence of an electromagnetic beam equals the natural diffraction divergence, its magnitude being proportional to the wavelength of radiation and inversely proportional to the outlet apperture of a generator or radiator. When an electromagnetic beam does not conform to these requirements, the sources of electromagnetic radiation are provided with collimators. Beams may be collimated by all known methods and with the help of various means, including lenses, mirrors, reflectors or cavities, as well as in the electromagnetic generator itself, as in the case of a laser.

Beginning of the take-off and landing platform is the limit of the platform wherefrom an aircraft starts its take-off or landing run. It is often termed "edge" or "threshold".

End of the take-off and landing platform is its limit opposite to the beginning, that is the limit of the take-off and landing platform toward which an aircraft moves during its take-off or landing run.

The invention will now be described in greater detail with reference to specific embodiments thereof, taken in conjunction with the accompanying drawings, wherein.

Figure 21:
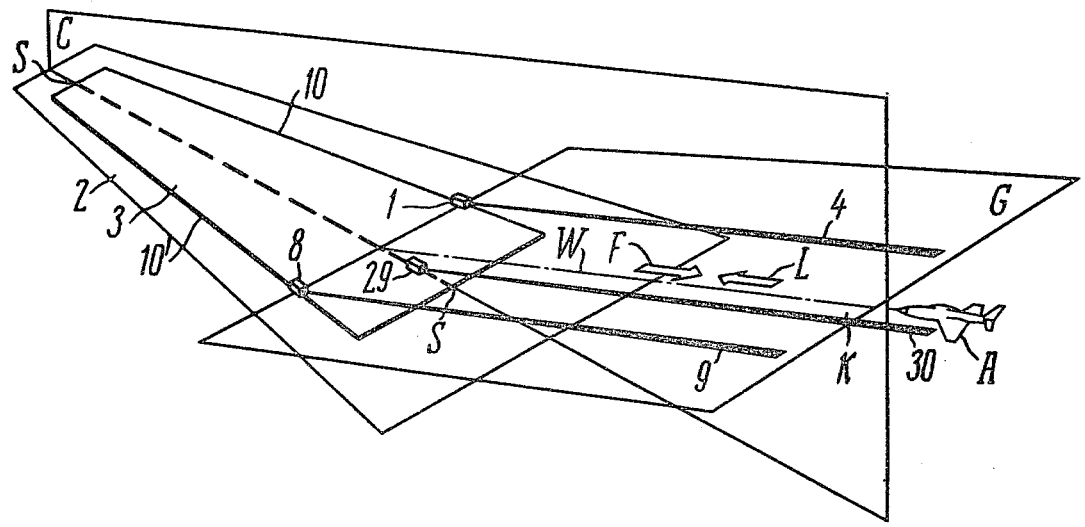
FIG. 21 shows an embodiment of the take-off and landing system with three sources of electromagnetic radiation, two of these sources being arranged in a pair and positioned on the opposite side boundaries of a take-off and landing platform, their beams being oriented in a common glide slope plane, and the third being positioned below the glide slope plane, in accordance with the invention.
Figure 23:
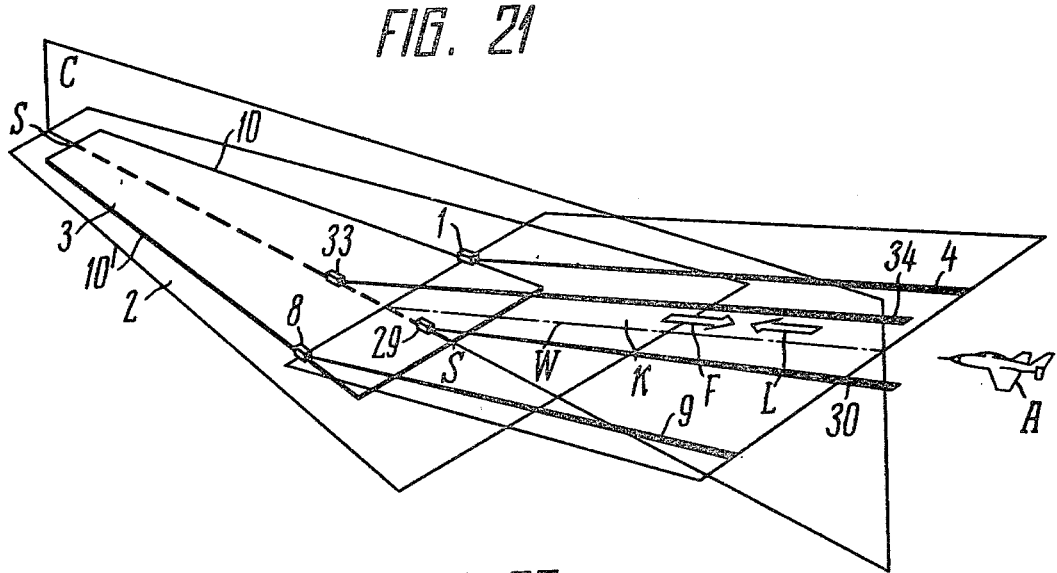
Figure 27:
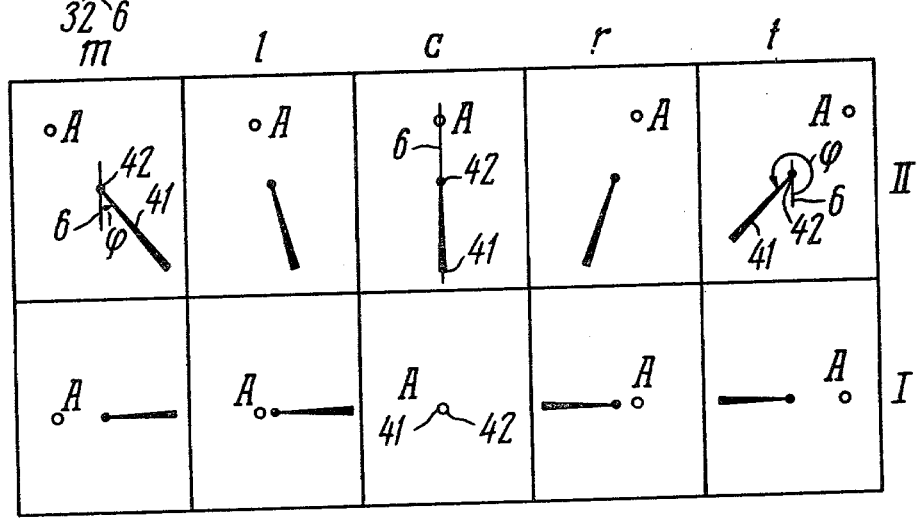
Figure 24:
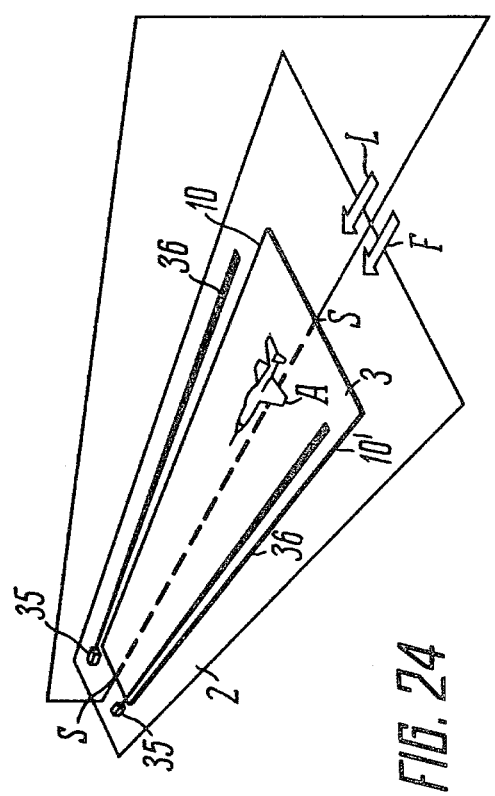
Figure 28:
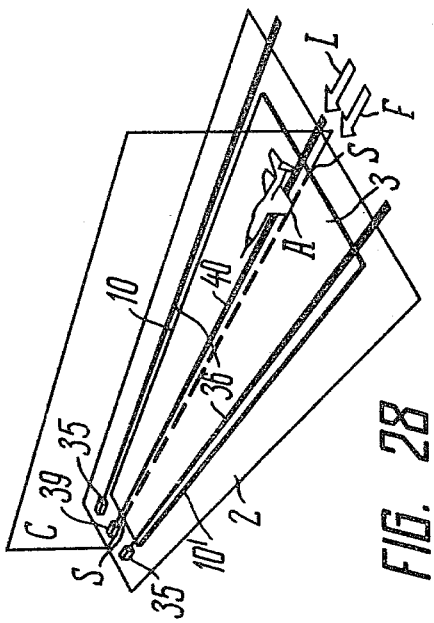
Figure 26:
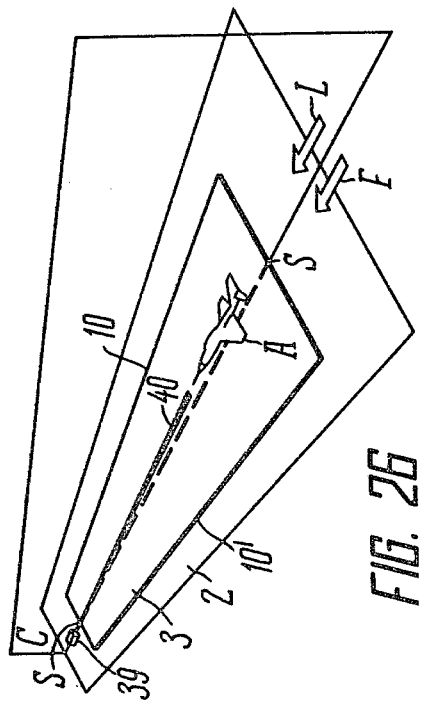
Figure 25:
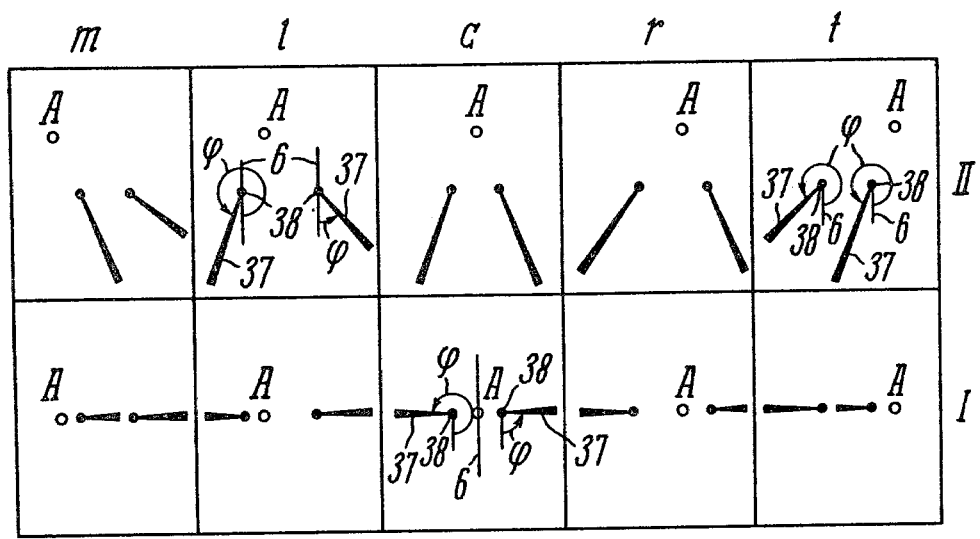
Figure 29:
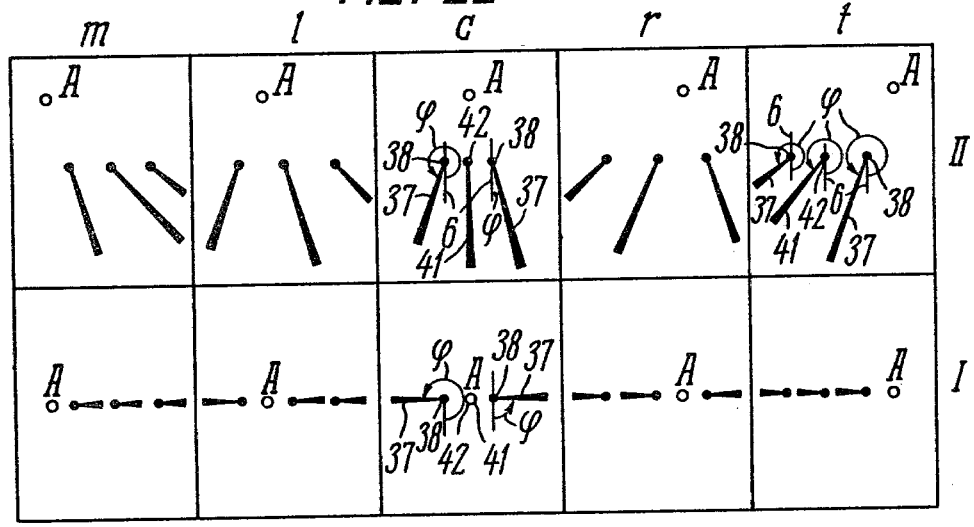
Figure 30:
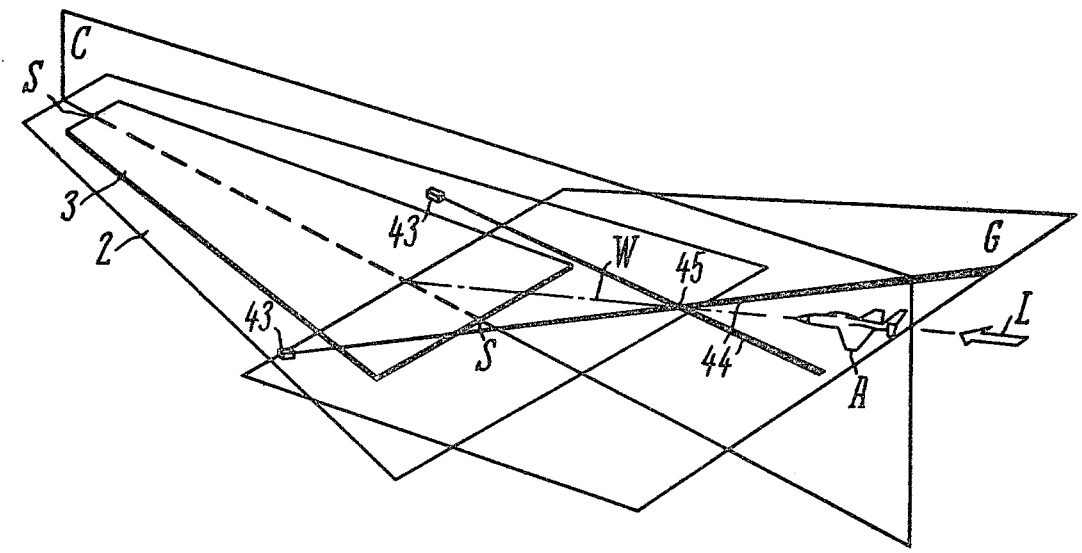
Figure 31:
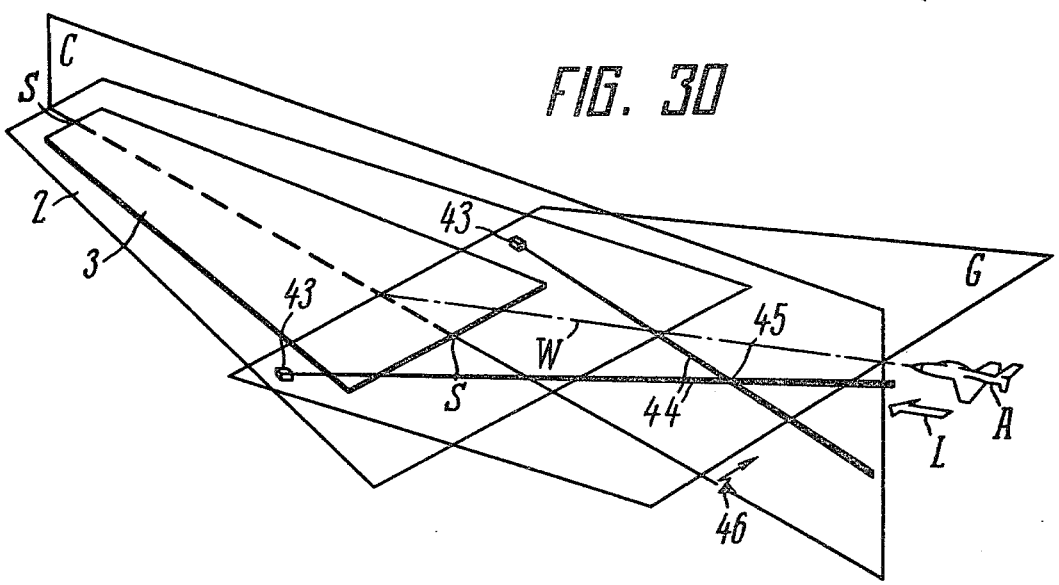
Figure 36:
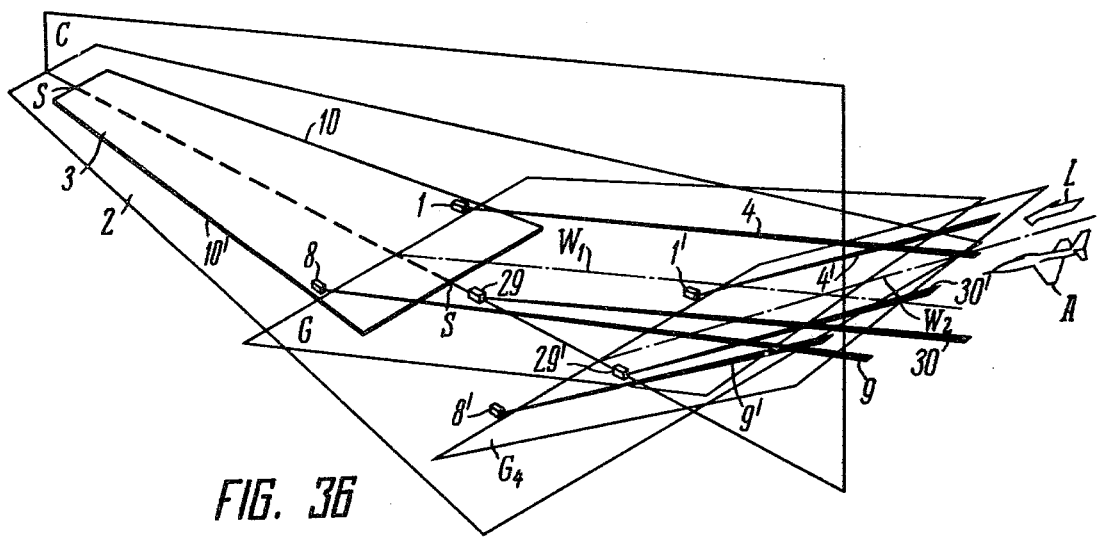
Figures 32, 33:
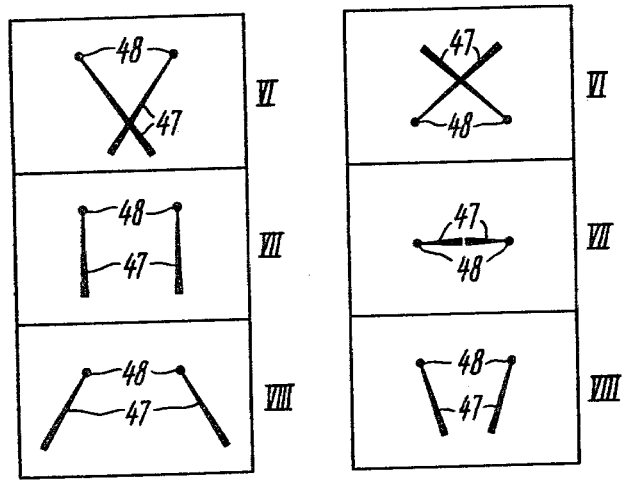
Figure 34:
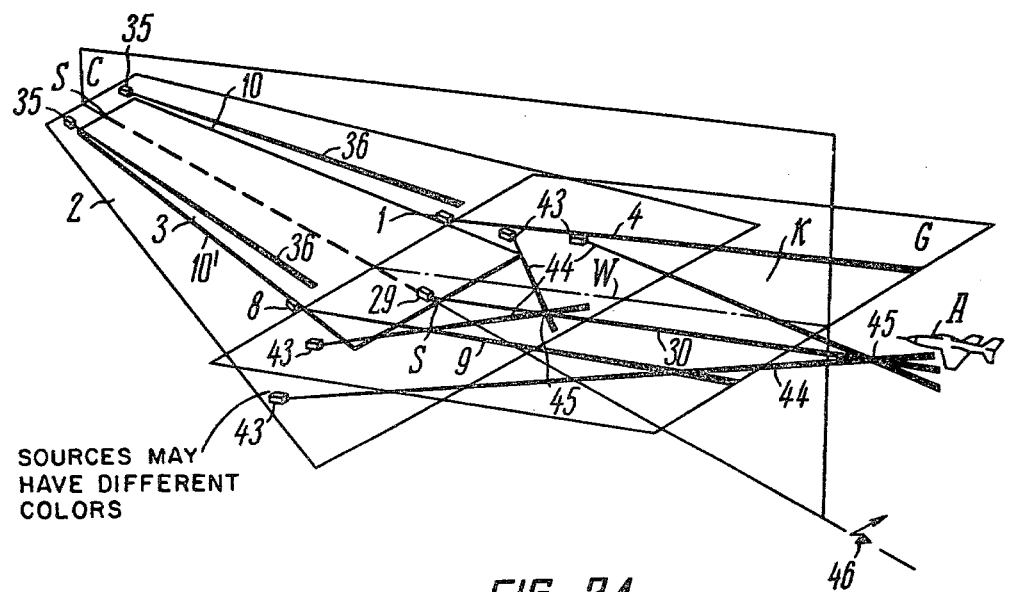
Figure 35:
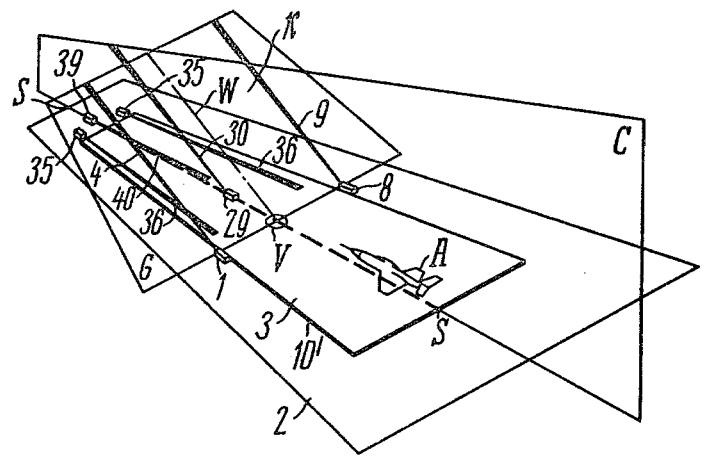
Figure 37:
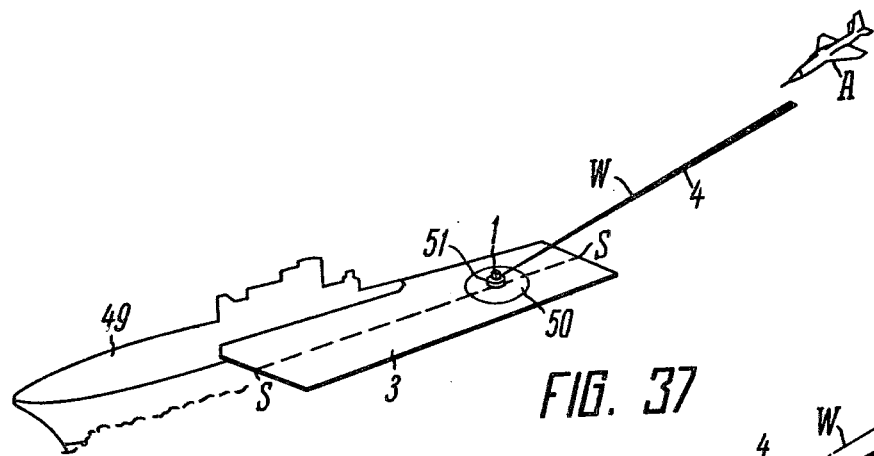
Figure 38:
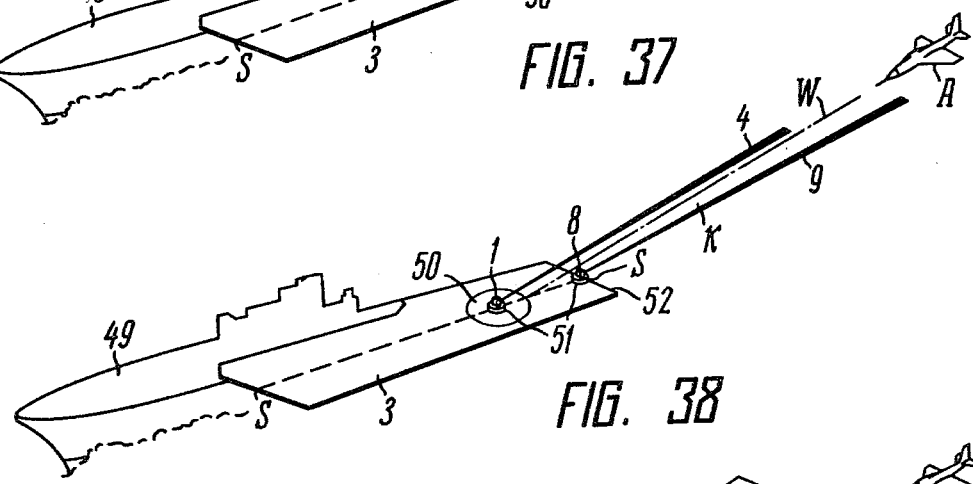
Figure 39:
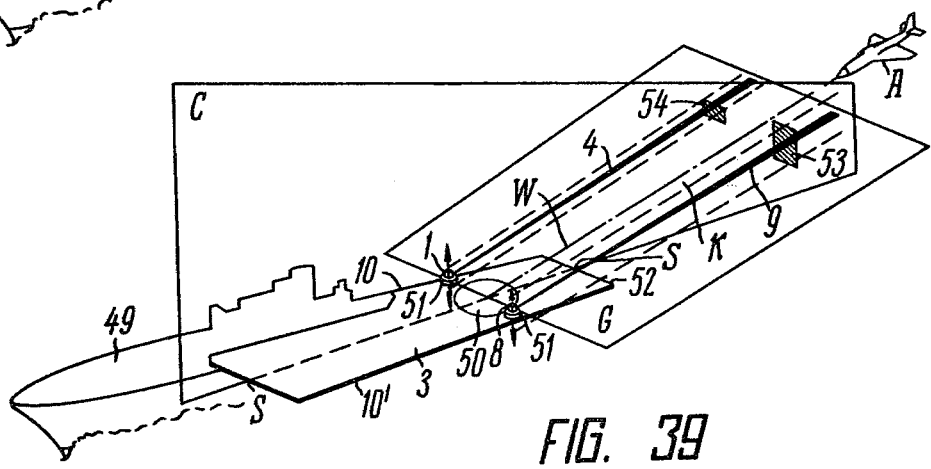
Figure 40:
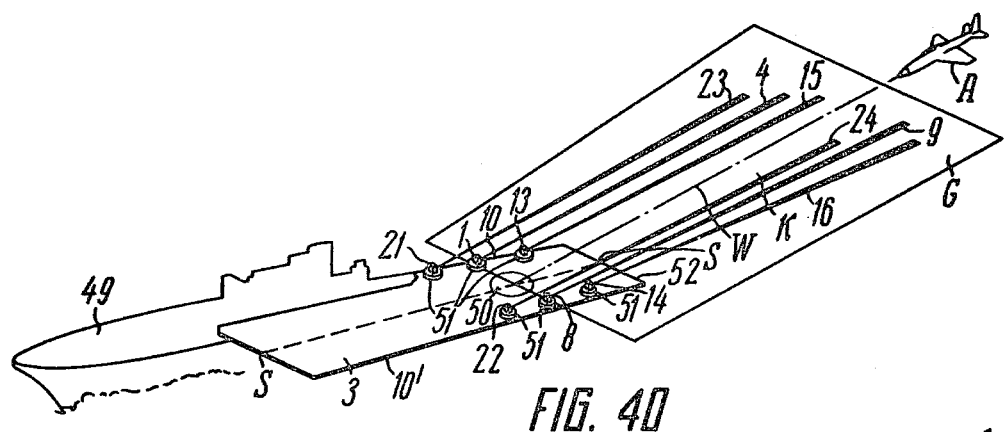
Figure 41:
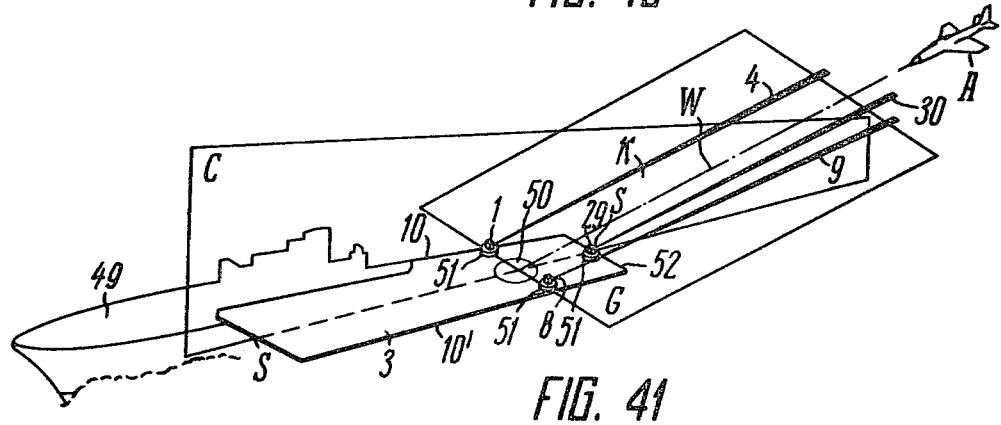
Figure 42:
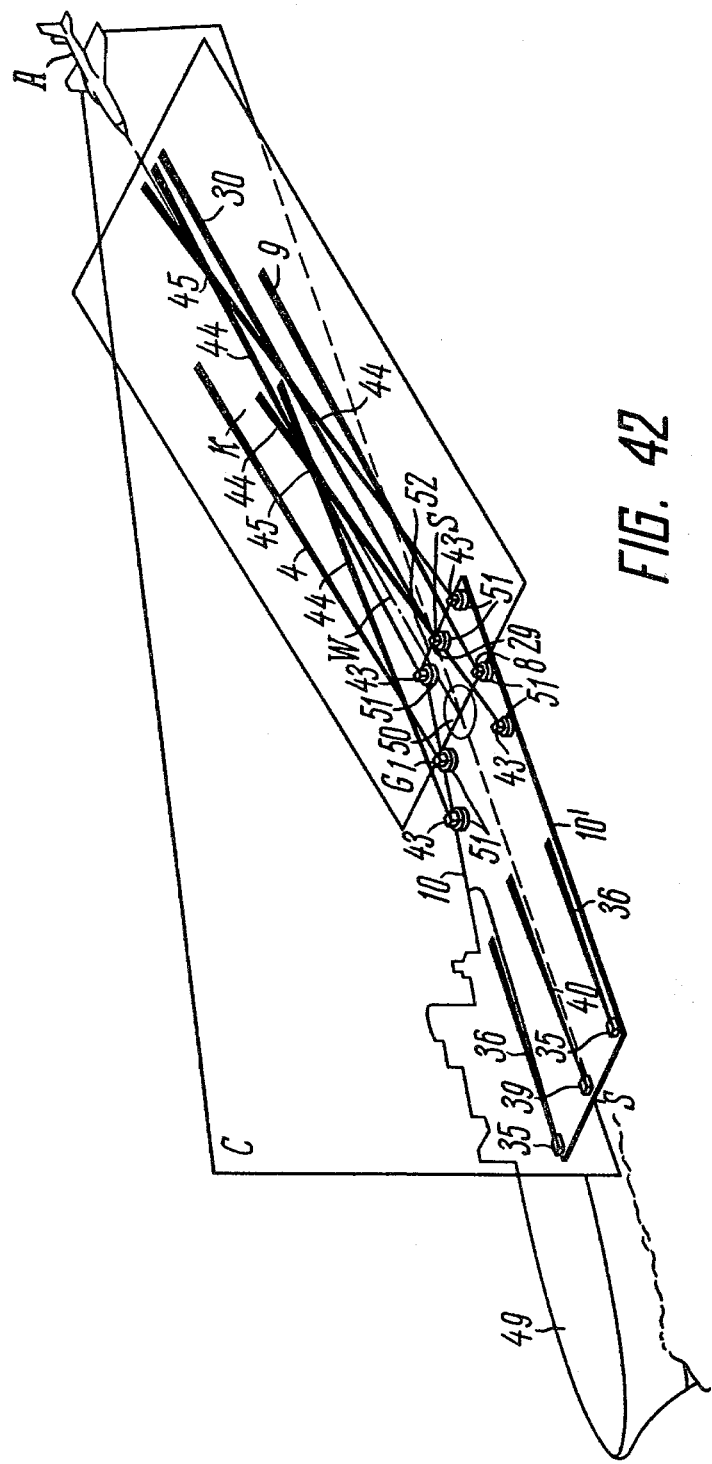
Figures 45, 46:
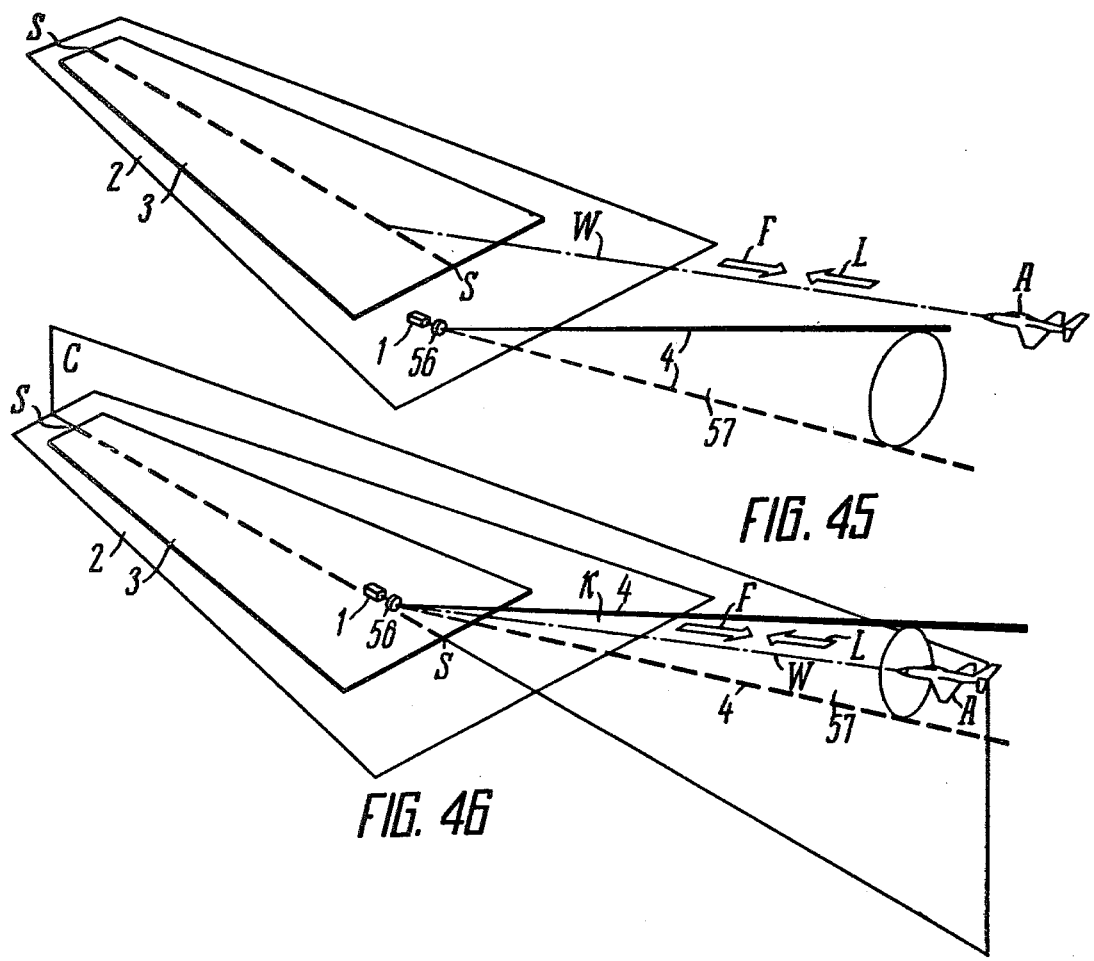
Figure 47:
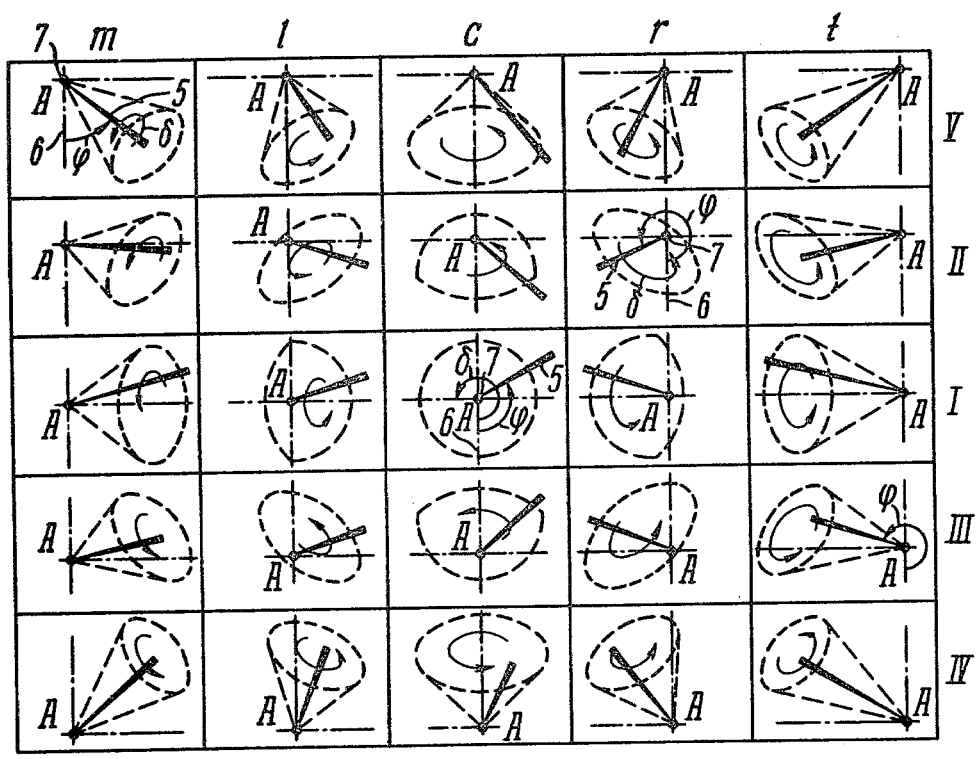
Figure 48:
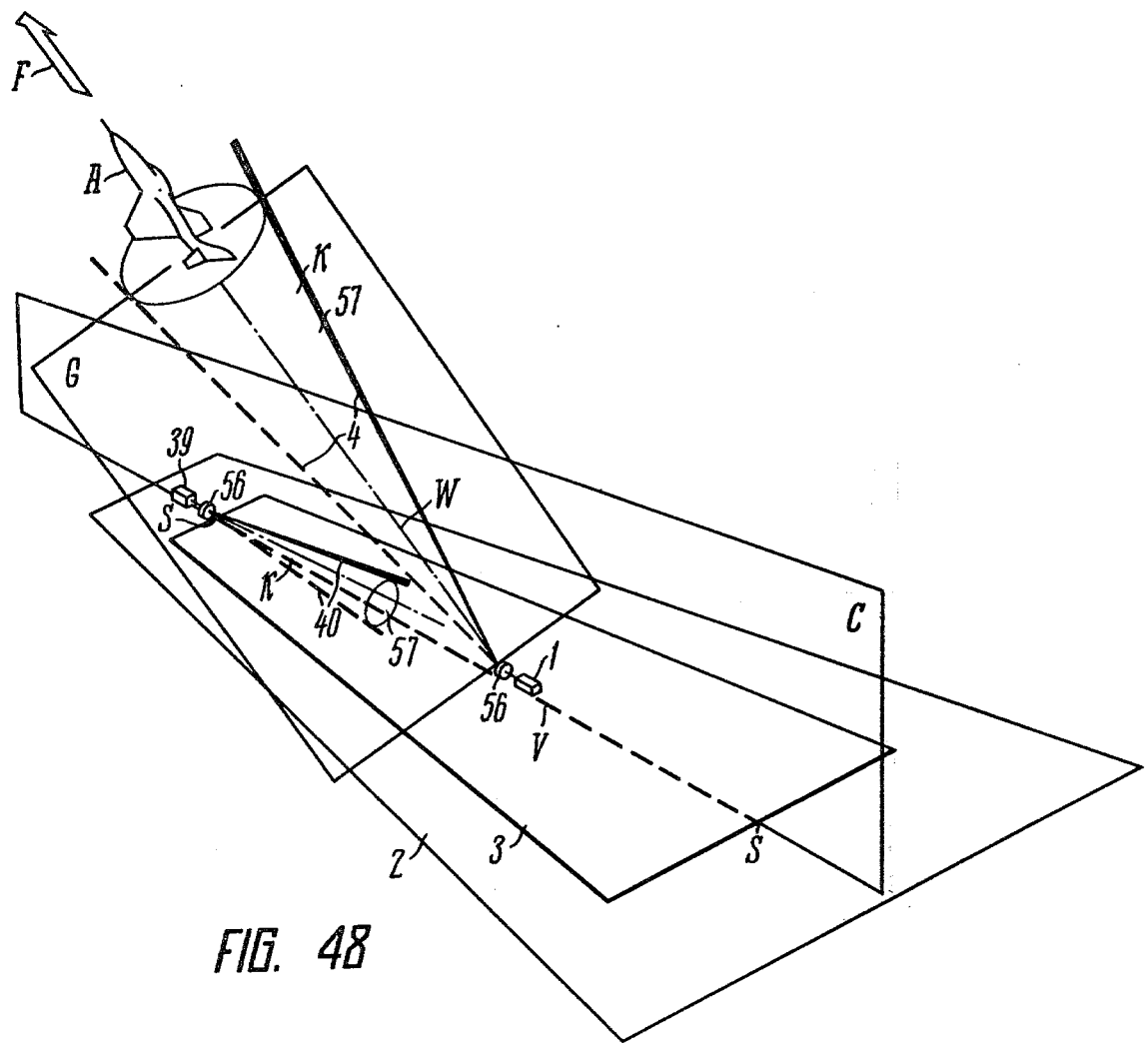
Figure 51:
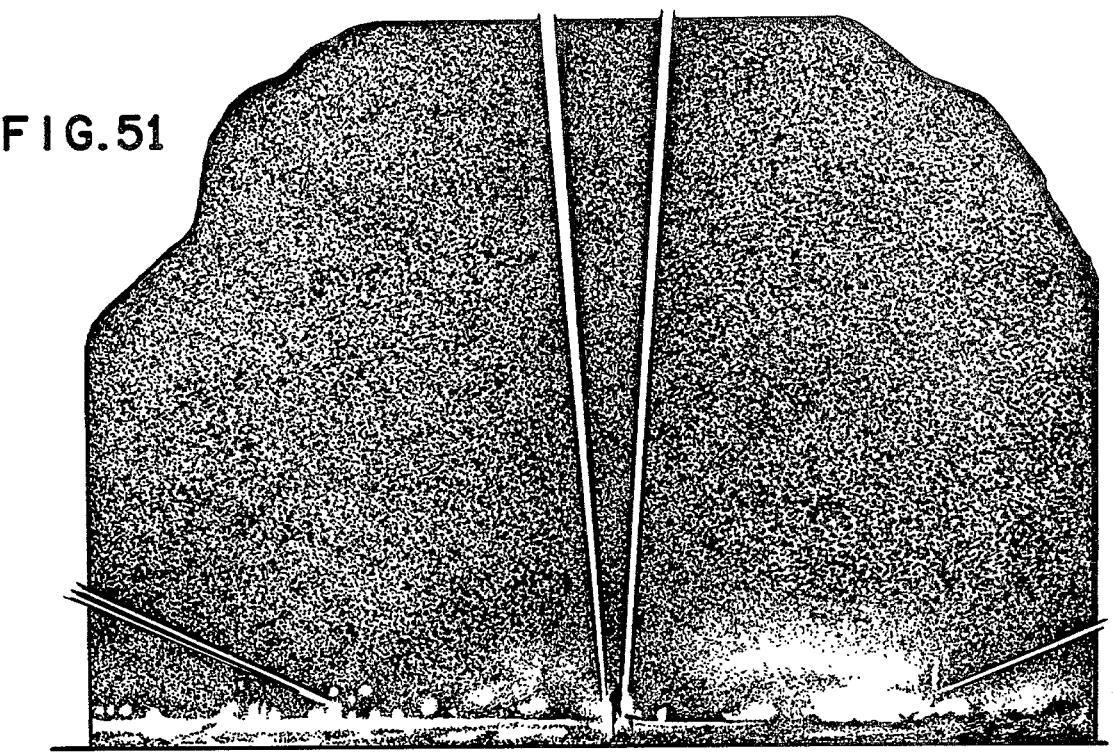
Figure 52:
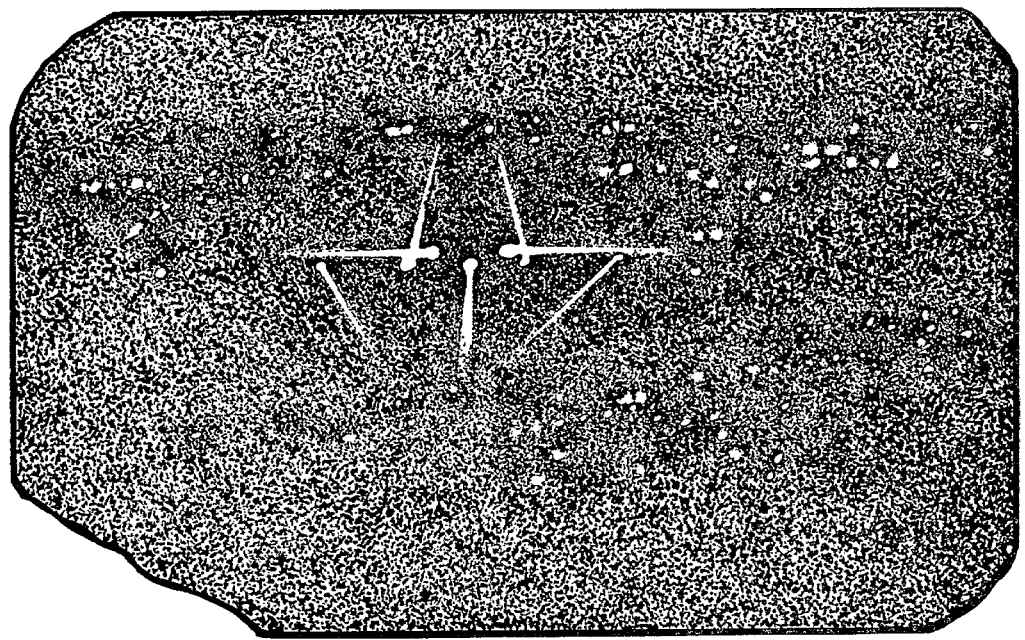

FIG. 23 shows an embodiment of the take-off and landing system with four sources of electromagnetic radiation, two of these sources being arranged in a pair and positioned on the opposite side boundaries of a take-off and landing platform, their beams being oriented in a common glide slope plane, whereas two other sources are positioned on the center line of the take-off and landing platform, their beams being arranged so that one in below and the other above the glide slope plane, in accordance with the invention;

FIG. 24 shows an embodiment of the take-off and landing system with a pair of additional sources of electromagnetic radiation, positioned on a flight platform in the immediate vicinity of the end of the take-off and landing platform (sources of electromagnetic radiation, comprising a course and glide slope group are not shown), in accordance with the invention;

FIG. 25 is a table of distortions of a specified configuration of the symbol produced by the beams of one additional pair of sources of electromagnetic radiation of the take-off and landing system of FIG. 24 for various aircraft attitudes in relation to the surface of the take-off and landing platform, in accordance with the invention;

FIG. 26 shows an embodiment of the take-off and landing system with an additional source of electromagnetic radiation, positioned on a flight platform in the immediate vicinity of the end of the take-off and landing platform (sources of electromagnetic radiation, comprising a course and glide slope group are not shown), in accordance with the invention;

FIG. 27 is a table of distortions of a specified configuration of the symbol produced by the beam of one additional source of electromagnetic radiation of the take-off and landing system of FIG. 26 for various aircraft attitudes in relation to the surface of the take-off and landing platform, in accordance with the invention;

FIG. 28 shows an embodiment of the take-off and landing system with a pair of additional sources and one more additional source of electromagnetic radiation, positioned on a flight platform in the immediate vicinity of the end of the take-off and landing platform (sources of electromagnetic radiation, comprising a course and glide slope group are not shown), in accordance with the invention;

FIG. 29 is a table of distortions of a specified configuration of the symbol produced by the beams of the additional sources of electromagnetic radiation of the take-off and landing system of FIG. 28 for various aircraft attitudes in relation to the surface of the take-off and landing platform, in accordance with the invention;

FIG. 30 shows an embodiment of the take-off and landing system with a pair of second additional asymmetrically arranged sources of electromagnetic radiation, positioned on a flight platform, their beams indicating a marker point (sources of electromagnetic radiation, comprising a course and glide slope group and a landing lights group are not shown), in accordance with the invention;

FIG. 31 shows an embodiment of the take-off and landing system similar to that of FIG. 31, with the sources of electromagnetic radiation being symmetrically arranged, in accordance with the invention;

FIG. 32 is a table of distortions of a specified configuration of the symbol produced by the beams of the second additional sources of electromagnetic radiation of the take-off and landing system of FIGS. 30 and 31 for various aircraft attitudes in relation to the marker point, in case the beams of these sources do not intersect the glide slope plane, in accordance with the invention;

FIG. 33 is a table of distortions of a specified configuration of the symbol produced by the beams of the second additional sources of electromagnetic radiation of the take-off and landing system of FIGS. 30 and 31 for various aircraft attitudes in relation to the marker point, in case these beams intersect with the glide slope plane, in accordance with the invention;

FIG. 34 shows an embodiment of the take-off and landing system in its landing version, comprising all three groups of sources of electromagnetic radiation, a course and glide slope group, a landing lights group and a marker group, in accordance with the invention;

FIG. 35 shows an embodiment of the take-off and landing system in its landing version, comprising two groups of sources of electromagnetic radiation, a course and glide slope group and a landing lights group, in accordance with the invention;

FIG. 36 shows an embodiment of the landing system with three sources of electromagnetic radiation, positioned at the beginning of a take-off and landing platform and three auxiliary sources of electromagnetic radiation, positioned before the take-off and landing platform, in accordance with the invention;

FIG. 37 shows an embodiment of the take-off and landing system comprising one source of electromagnetic radiation, positioned on a carrier landing deck in the immediate vicinity of an estimated touchdown zone, in accordance with the invention;

FIG. 38 shows an embodiment of the take-off and landing system comprising two sources of electromagnetic radiation, one of these sources being positioned on a carrier landing deck in the immediate vicinity of an estimated touchdown zone and the second one, on the stern edge, in accordance with the invention;

FIG. 39 shows an embodiment of the take-off and landing system comprising two sources of electromagnetic radiation, positioned on a carrier landing deck on its side boundaries, symmetrically about its center line, in the immediate vicinity of an estimated touchdown zone, in accordance with the invention;

FIG. 40 shows an embodiment of the take-off and landing system comprising three pairs of sources of electromagnetic radiation, positioned on a carrier landing deck, on its side boundaries, in pairs symmetrically about its center line, in accordance with the invention;

FIG. 41 shows an embodiment of the take-off and landing system comprising a pair of sources of electromagnetic radiation, positioned on a carrier landing deck in the immediate vicinity of an estimated touchdown zone and a third source positioned on the stern edge, in accordance with the invention;

FIG. 42 shows an embodiment of the take-off and landing system comprising all three groups of sources of electromagnetic radiation positioned on a carrier landing deck, in accordance with the invention;

FIG. 43 shows an embodiment of the take-off and landing system comprising two pairs of sources of electromagnetic radiation, provided with a beam turning means, in accordance with the invention;

FIG. 44 shows an embodiment of the take-off and landing system comprising three sources of electromagnetic radiation provided with a beam turning means, in accordance with the invention;

FIG. 45 shows an embodiment of the take-off and landing system comprising one source of electromagnetic radiation, positioned on a flight platform and provided with a beam rotating means, in accordance with the invention;

FIG. 46 shows an embodiment of the take-off and landing system comprising one source of electromagnetic radiation, positioned on the center line of a take-off and landing platform and provided with a beam rotating means, in accordance with the invention;

FIG. 47 is a table of distortions of a specified configuration of the symbol produced by the beam of the source of electromagnetic radiation of the take-off and landing system of FIG. 46 for various aircraft attitudes in relation to an estimated take-off or landing path, in accordance with the invention;

FIG. 48 shows an embodiment of the take-off and landing system in its take-off version, comprising two sources of electromagnetic radiation, provided with beam rotating means, one of these sources being placed in the immediate vicinity of the lift-off point and the other on a flight platform in the immediate vicinity of the end of the take-off and landing platform, in accordance with the invention;

FIG. 49 shows an embodiment of the take-off and landing system in its landing version, comprising two sources of electromagnetic radiation, provided with beam rotating means, one of these sources being placed at the beginning of a take-off and landing platform and the other, on a flight platform in the immediate vicinity of the end of the take-off and landing platform, in accordance with the invention;

FIG. 50 shows an embodiment of the take-off and landing system comprising three sources of electromagnetic radiation, provided with beam rotating means, in accordance with the invention;

FIG. 51 is a picture of the take-off and landing system of FIG. 21;

FIG. 52 is a picture of the symbol produced by the sources of electromagnetic radiation positioned as shown in FIG. 34, in accordance with the invention.

The proposed aircraft take-off and landing system is made up of directed extended references, the number whereof may vary and is dependent upon the functional requirements imposed on the system. Pencil beams of electromagnetic radiation with a small divergence and a wavelength lying within atmospheric windows are employed as such directed extended references. The wavelengths of electromagnetic radiation are selected to suit the purpose of a system and the requirements imposed thereupon. Thus, for example, electromagnetic beams of the superhigh frequency or extremely high-frequency band are employed as directed extended references for arrangement of instrumental nonvisual systems, the sources of electromagnetic radiation being pencil-beam aerials or lasers. Besides, electromagnetic radiation with a wavelength in the near or far infrared region may be employed, as well as in the γ-range of radiation spectrum. Thus, for visual take-off and landing systems, electromagnetic pencil beams with a small divergence in the optical band are employed as directed extended references, the sources of electromagnetic radiation being, for example, projectors or lasers.

In selection of a wavelength of electromagnetic radiation it is extremely important that the selected wavelength should correspond to an atmospheric window. Such a selection permits substantial increase in the efficiency of the take-off and landing system operation at the expense of reduced absorption of electromagnetic energy by the atmosphere. It is a matter of common knowledge that the atmosphere has a number of windows in various frequency bands of the electromagnetic radiation spectrum. Thus, for example, there are several atmospheric windows within the centimetric and millimetric band of the electromagnetic radiation spectrum with a wavelength of 3,000–3,500 mu, as well as 1,000–2,000 mu, wherein the absorption of energy by molecules of the atmosphere and of water aerosols is insignificant in relation to the total amount of scattered energy.

Another example is several atmospheric windows in the far infrared region of the electromagnetic radiation spectrum with a wave band of 10 to 15 mu, as well as several atmospheric windows in the near infrared region from 1 to 6 mu. Some lasers operate on the wavelengths corresponding to these atmospheric windows, e.g. $CO_2$ molecular lasers generating electromagnetic radiation on a wavelength of 10.6 mu or CO molecular lasers with a wavelength of 5.1 mu, which may be also used as sources of electromagnetic radiation to produce directed extended references.

There is a wide atmospheric window within a wavelength range from 0.2 to 0.8–1 mu, wherein the absorption amounts to no more than 8–12 percent of the total attenuation of electromagnetic radiation. This is the so-called optical band. Various projector systems, as well as lasers, generating electromagnetic radiation of a certain colour may be employed as sources of electromagnetic radiation to produce directed extended references in this band.

And finally, there are several atmospheric windows, wherein absorption is minimum, in the ultraviolet region of the electromagnetic radiation spectrum with a wavelength from 0.32 to 0.4 mu, as well as in the region of γ-radiation possessing a high penetrating power.

In case monochromatic electromagnetic radiation is employed to produce directed extended references, proper consideration should be given, in selection of a wavelength of this radiation, to the fine structure of atmospheric windows, since it may turn out that the selected wavelength of electromagnetic radiation does not fit the atmospheric window and electromagnetic radiation on the selected wavelength may be subjected to strong atmospheric absorption. If electromagnetic radiation falls in the strong absorption band, that is out of the atmospheric window, its wavelength should be somewhat altered so that minimum atmospheric absorption of electromagnetic radiation can be achieved. Examples of monochromatic radiation sources are sources of radio-frequency radiation, as well as many lasers, e.g. a helium-neon gas laser generating at one frequency with a wavelength of 0.6328 mu.

Some sources of electromagnetic radiation generate on several wavelengths, part of them falling within atmospheric windows, others lying outside in wavelength regions wherein electromagnetic radiation is absorbed by the atmosphere. An example of sources generating electromagnetic radiation in a multitude of wavelengths simultaneously are projectors producing white light, as well as some lasers.

In some cases, directed extended references may be produced by a combination of several wavelengths of electromagnetic radiation to suit the requirements set to the take-off and landing system. Thus, for example, a visual take-off and landing system intended for reliable operation in dense fog may employ a combination of infrared electromagnetic radiation, e.g. radiation with a wavelength of 10.6 mu or 5.1 mu, with electromagnetic optical radiation, e.g. with a wavelength of 0.6328 mu produced by a helium-neon gas laser or 0.57 mu produced by an argon laser.

Such a combination of electromagnetic radiation with different wavelengths makes it possible to burn through a channel in the fog by means of infrared radiation and send optical radiation along this channel to ensure visual observation of directed extended references.

Directed extended references may be observed or registered by instruments owing to the energy contrast of a directed extended reference against the background of the environment. The beam is as though radiating or glowing. As it has already been mentioned, such radiation or glow is due to scattering of electromagnetic energy on molecules and aerosols of the atmosphere and consists in chaotic changing of direction of electromagnetic radiation propagation when passing through the atmosphere. The beam, in this case, functions as an energy carrier. When an aircraft deviates laterally, the beam is seen as a straight line, its inclination with respect to the course plane indicating the vertical attitude being dependent on the attitude of the aircraft in relation to the beam. The straight line produces a symbol. When there are several beams, the symbol comprises several rectilinear elements, their relative position being an unambiguous indication of the spatial aircraft attitude. When an aircraft is on an estimated take-off or landing path, the symbol produced by the beams acquires a configuration depending on the number of electromagnetic beams and their relative positions. Optimum arrangement of the electromagnetic sources on the take-off and landing platform produces a symbol formed by their beams, characterized by a simple and easy to remember configuration.

The symbol is, therefore, a means to perform aircraft take-off and landing, the degree of the symbol's distortion being a measure of the aircraft's deviation from the estimated take-off or landing path, whereas directed extended references produced by electromagnetic beams serve to form this symbol as an instrumental means.

As has already been mentioned, directed extended references are produced by the beams of electromagnetic radiation generated by sources made up of various means, such as, for example, reflecting surfaces, mirrors, aerial arrays or generators proper, like projectors or lasers.

The generator producing electromagnetic radiation may be placed directly on the flight or take-off and landing platform at the point of origin of a directed extended reference or any other point of the flight platform. In this case, the beam coming out of the generator falls upon a reflecting surface, then, after being reflected therefrom, is directed into the space performing the function of a directed extended reference.

Different sources are employed depending on the wavelength of electromagnetic radiation. Thus, as has been already pointed out, pencil-beam aerials with a beam divergence brought down to 1.5°–2° may serve as such sources in the superhigh frequency (centimetric) and extremely high-frequency (millimetric) band. In the near and far infrared band, for example, lasers may be employed as such sources of electromagnetic radiation, e.g. $CO_2$ gas molecular lasers with a wavelength of 10.6 mu, CO molecular lasers with a wavelength of 5.1 mu or solid-state lasers, e.g. neodymiumdoped glass lasers with a wavelength of 1.06 mu. Gas molecular lasers are characterized by high efficiency reaching 40 percent.

Sources of electromagnetic radiation in the optical band may be projectors radiating white light or provided with filters cutting out a certain part of the spectrum, as well as lasers. Laser sources may be, for example, argon lasers generating green light at some lines, krypton lasers generating red light, as well as forementioned helium neon lasers. In the $\gamma$-band, traditional sources of gamma rays may be employed, e.g. radioactive materials, as well as $\gamma$-lasers being developed at present.

The forementioned examples demonstrate that the proposed take-off and landing system can employ, as sources of electromagnetic radiation, various means producing pencil beams, such as radio antennas, projectors, lasers, etc.

Lasers, as sources of electromagnetic radiation, simplify the problem of producing electromagnetic pencil beams with a small divergence in many respects, since their high directivity is not achieved with the help of special-purpose collimators, e.g. objectives, but is generated inside the laser cavity. Besides, lasers permit production of beams with a very high electromagnetic energy density, in excess of tens of watts per square centimeter of the beam area. At present, lasers operate on various wavelengths of electromagnetic radiation, from the millimetric wave band to the gamma band.

An embodiment of this invention, wherein lasers are employed as sources of electromagnetic radiation in the visual range of the radiation spectrum, is described hereforth for simplicity and ease of understanding. This, however, does not imply that any of the known sources of electromagnetic radiation, including the forementioned ones, cannot be used separately or in combinations, as will be described in more detail in what follows.

Sources of electromagnetic radiation are commonly positioned on the flight platform and, in particular, on the take-off and landing platform in places determined by the functional requirements set to the take-off and landing system.

Figure 1:
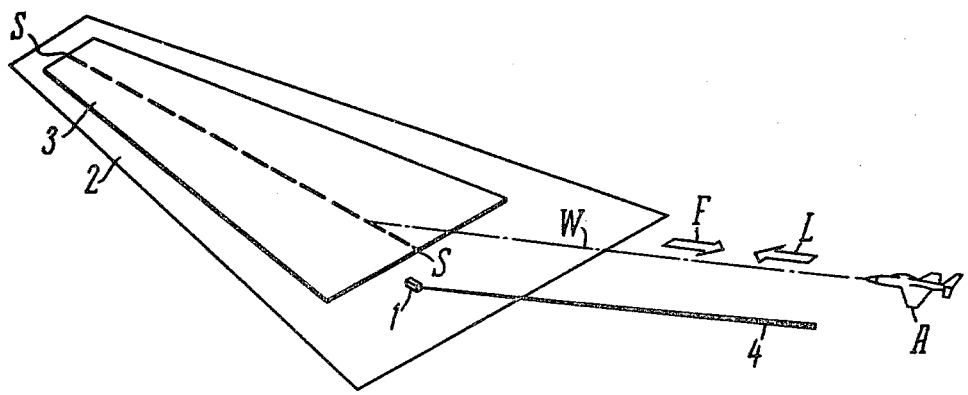
FIG. 1 shows an embodiment of the take-off and landing system with one source of electromagnetic radiation, positioned on a flight platform, in accordance with the invention.

Thus, if a take-off and landing system comprises one source 1 (FIG. 1) of electromagnetic radiation, this source 1 is positioned in any place of a flight platform 2 comprising a take-off and landing platform 3 and its beam 4 indicates the course and glide slope of a take-off or landing path W of an aircraft A. Arrow L points out the direction of landing, whereas arrow F denotes the direction of take-off. Letters SS designate the center line of the take-off and landing platform. The symbol produced by the beam 4 has a configuration being dependent on the position of the source 1 of electromagnetic radiation on the flight platform 2 and distorted in case of any deviations of the aircraft A from the estimated take-off or landing path W. The specified configuration of the symbol and its distortions in case of various deviations of the aircraft A from the estimated take-off or landing path W will be discussed later on with reference to specific embodiments of take-off and landing systems.

The electromagnetic radiation source 1 (FIG. 2), in accordance with one of the embodiments of the take-off and landing system, may be positioned on the take-off and landing platform 3 being a part of the flight platform 2. In case this is the only source 1 of electromagnetic radiation, it is advisable to place it on the center line SS of the take-off and landing platform 3 and orient its beam 4 in space so that it indicates the course and glide slope of the estimated take-off or landing path W and lies in the course plane C.

The table (FIG. 3) of distortions of the specified configuration of the symbol produced by a projection 5 of the electromagnetic beam 4 in various attitudes of the aircraft A (FIG. 2) in relation to the estimated take-off and landing path W is drawn up to provide an illustrative and simple example of the process of determination by this distortion of the direction and degree of deviation of the aircraft A from the estimated take-off and landing path W. The projection 5 is formed by projecting the electromagnetic beam 4 in accordance with the rules of affine-projective geometry onto a sensitive surface of a receiver of electromagnetic radiation carried by the aircraft A or the retina of the pilot's eyes. The pilot perceives this projection 5 of the beam 4 against the background of the sky during take-off of the aircraft A and against the background of the flight platform 2 during its landing.

Figure 2:
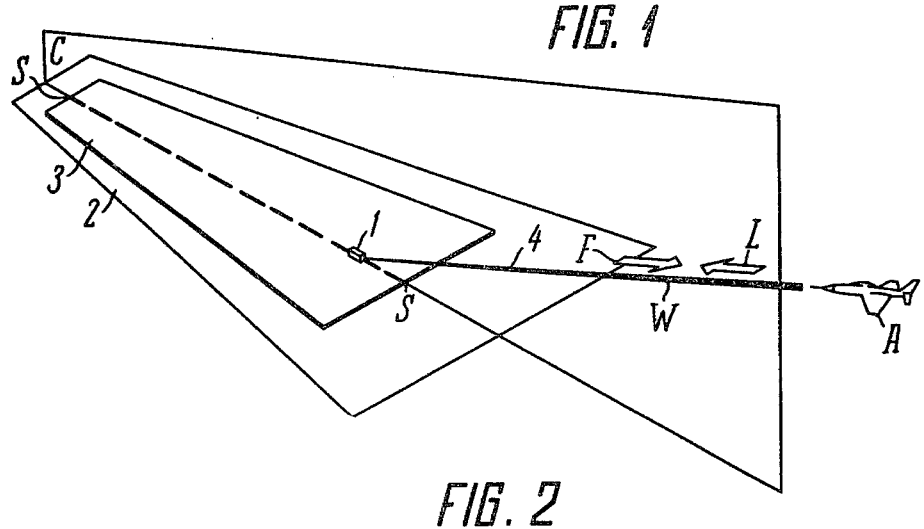
FIG. 2 shows an embodiment of the take-off and landing system with one source of electromagnetic radiation, positioned on the center line of a take-off and landing platform, its beam being oriented in a course plane, in accordance with the invention.
Figure 3:
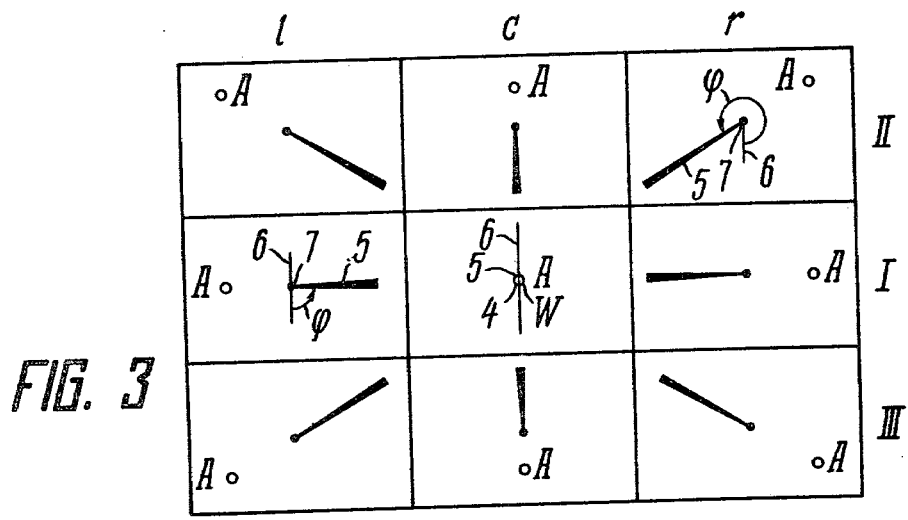
FIG. 3 is a table of distortions of configuration of the symbol produced by the beam of the source of electromagnetic radiation of the take-off and landing system of FIG. 1 for various aircraft attitudes in relation to an estimated take-off or landing path, in accordance with the invention.

This table is a schematic of the relative position of the aircraft A and the projection 5 of the electromagnetic beam 4 producing the symbol in accordance with the take-off and landing system of FIG. 2. This projection 5 is a straight line. The following notation is used in the table (FIG. 3).

I—the aircraft is exactly on the glide slope of the estimated take-off or landing path;

II—the aircraft is above the glide slope of the estimated take-off or landing path;

III—the aircraft is below the glide slope of the estimated take-off or landing path;

c—the aircraft is exactly on the course of the estimated take-off or landing path;

l—the aircraft is to the left of the course of the estimated take-off or landing path;

r—the aircraft is to the right of the course of the estimated take-off or landing path.

The distorted configuration of the symbol corresponding to a certain attitude of the aircraft A in relation to the estimated take-off or landing path W is confined by a square, its coordinates being determined by a letter designating a certain position of the aircraft A in relation to the course of the estimated take-off or landing path W and a digit designating a certain position of the aircraft A in relation to the glide slope of the estimated take-off or landing path. For example, "cI" corresponds to the aircraft A being exactly on the course and glide slope of the estimated take-off or landing path, "rIII" corresponds to the aircraft A being to the right of the course and below the glide slope of the estimated take-off or landing path.

The symbol produced by the beam 4 (FIG. 3) is the projection 5 of this beam looking like a straight line reduced to a dot when the aircraft A (FIG. 2) is on the course and glide slope of the estimated take-off or landing path W, which corresponds to the cI square of the table of distortions of the symbol configuration, that is the aircraft A in this case is directly in the electromagnetic beam 4. Such a symbol configuration, looking like a dot, is the specified configuration for the embodiment of the system, wherein the source I of electromagnetic radiation is placed as in FIG. 2. The distortion of the specified configuration of the symbol formed by the projection 5 of the electromagnetic beam 4 with various deviations of the aircraft A from the estimated take-off or landing path W is determined by an inclination angle $\phi$ of the projection 5 of the electromagnetic beam 4 in relation to a vertical 6. In this case, the projection 5 of the beam 4 is as though turning about a point 7 designating the point in space whereto the beam 4 is directed during take-off of the aircraft A or the point wherefrom the beam 4 leaves the source I of electromagnetic radiation, during its landing. When the aircraft A takes off, the source I of electromagnetic radiation is left behind the aircraft A and cannot be seen by the pilot or detected by the receiver of electromagnetic radiation carried by the aircraft, if it is capable of detecting only "forward" emitted radiation. In case the receiver of electromagnetic radiation is arranged so that it detects radiation behind the aircraft A, the point 7 designates the point wherefrom the beam 4 leaves the source I of electromagnetic radiation.

If the aircraft A takes off or lands using the take-off and landing system of FIG. 2 and deviates from the glide slope of the estimated take-off or landing path W, but staying in the course plane C, the specified symbol configuration corresponding to the cI square is distorted and the projection 5 of the electromagnetic beam 4 coincides with the vertical 6 and is directed downwards from the point 7, which corresponds to the cII square, or upwards from this point 7, which corresponds to the cIII square. Such distortions of the specified symbol configuration correspond to the deviations of the aircraft A from the glide slope of the estimated take-off or landing path W upwards or downwards respectively. The position of the aircraft is here and henceforth designated in the table of distortions of the symbol configuration as point A.

If the aircraft A deviates from the course of the estimated take-off or landing path W, the specified symbol configuration is distorted and the projection 5 of the electromagnetic beam 4, being orthogonal to the vertical 6, is directed to the right of the point 7, which corresponds to the lI square, or to the left of the point 7, which corresponds to the rI square. Such distortions of the specified symbol configuration correspond to the aircraft's deviations from the course of the estimated take-off or landing path to the left or to the right respectively. It is easily comprehended that the projection 5 of the electromagnetic beam 4 from the point 7 is always turned in the opposite direction to the position of the aircraft A deviating from the estimated take-off or landing path W.

The distortion of the specified symbol configuration is, consequently, an indication of the magnitude and direction of the aircraft's deviation from the estimated take-off or landing path W, which is the basis of the proposed take-off and landing system and the fundamental principle of its structure.

Thus, for example, if the projection 5 of the beam 4 is directed downward and to the right of the point 7 (the II square in FIG. 3), this means that the aircraft A has deviated from the estimated take-off or landing path W upward and to the left, etc.

This principle will be further used to determine the position of the aircraft A on the estimated take-off and landing path W by the distortions of the specified configuration of the symbol produced by several beams of the sources of electromagnetic radiation.

In another embodiment of the take-off and landing system, the source 1 (FIG. 4) of electromagnetic radiation may be positioned on the flight platform on one side of the center line SS of the take-off and landing platform 3, which is a part of the flight platform 2, and its beam 4 oriented in the glide slope plane G. The source 1 of electromagnetic radiation may be placed on one side of the center line SS of the take-off and landing platform 3, both on this platform 3 (shown in FIG. 4 as a solid line) and outside the take-off and landing platform 3 (shown in FIG. 4 as a dotted line). The arrow indicates the direction in which the source 1 of electromagnetic radiation can be moved over.

Here and henceforth, the beams of the sources of electromagnetic radiation placed on one side of the center line SS of the take-off and landing platform 3 may both be directed parallel to the course plane C and form a small angle to this plane. This angle may reach several angular minutes or even amount to 1–5°.

Figure 4:
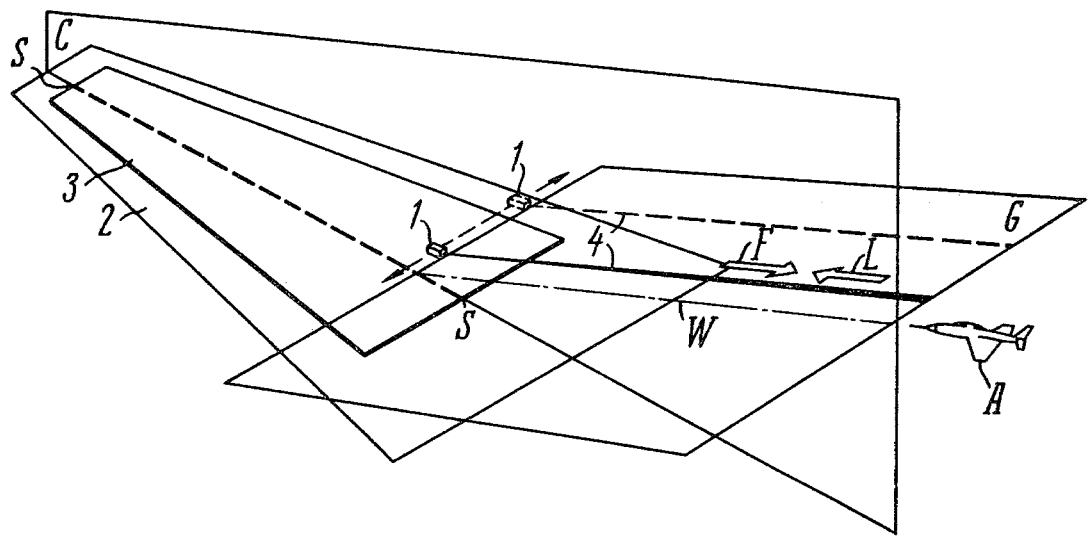
FIG. 4 shows an embodiment of the take-off and landing system with one source of electromagnetic radiation, positioned on one side of the center line of a take-off and landing platform, in accordance with the invention.

In accordance with the principle used for drawing up the table 3 of distortions of the symbol configuration, the specified configuration of the symbol produced by the projection of the electromagnetic beam 4 positioned as in FIG. 4, when the aircraft A is on the estimated take-off or landing path W, looks like a straight line orthogonal to the vertical, that is this straight line is horizontal and the angle $\phi$ equals 90°.

When the aircraft A deviates from the estimated take-off or landing path W, the specified configuration of the symbol is distorted and the angle $\phi$ is changed, decreasing or increasing according to the direction of deviation of the aircraft A from the estimated take-off or landing path W. The distortions of the configuration of the symbol produced by the electromagnetic beam 4, with the aircraft A taking off or landing by the take-off and landing system of FIG. 4, are not shown in figures.

When several sources of electromagnetic radiation are available, these sources may be divided into groups according to their functions: course and glide slope group, landing lights group and marker group.

The course and glide slope groups is formed by the sources with beams indicating the course and glide slope of the estimated take-off or landing path, producing a symbol and form a take-off or landing corridor, wherein the estimated take-off or landing path is situated and the movement of an aircraft is safest. Such a corridor as though prolongs the take-off and landing platform by enabling the pilot to fly the aircraft in relation to the limits of the take-off or landing corridor so that its position corresponds to the optimum position with respect to the estimated take-off or landing path.

Thus, if the take-off and landing system comprises two sources of electromagnetic radiation (FIG. 5) and the first source 1 of electromagnetic radiation is placed on the center line SS of the take-off and landing platform 3, its beam being oriented in the course plane C, in one of its embodiments a second source 8 of electromagnetic radiation may be positioned on one side of the center line SS, its beam 9, in combination with the beam 4 of the first source 1, defining a take-off or landing corridor K.

The source 8 of electromagnetic radiation may be positioned on one side of the center line SS of the take-off and landing platform 3 at any place on the flight platform 2.

Figure 5:
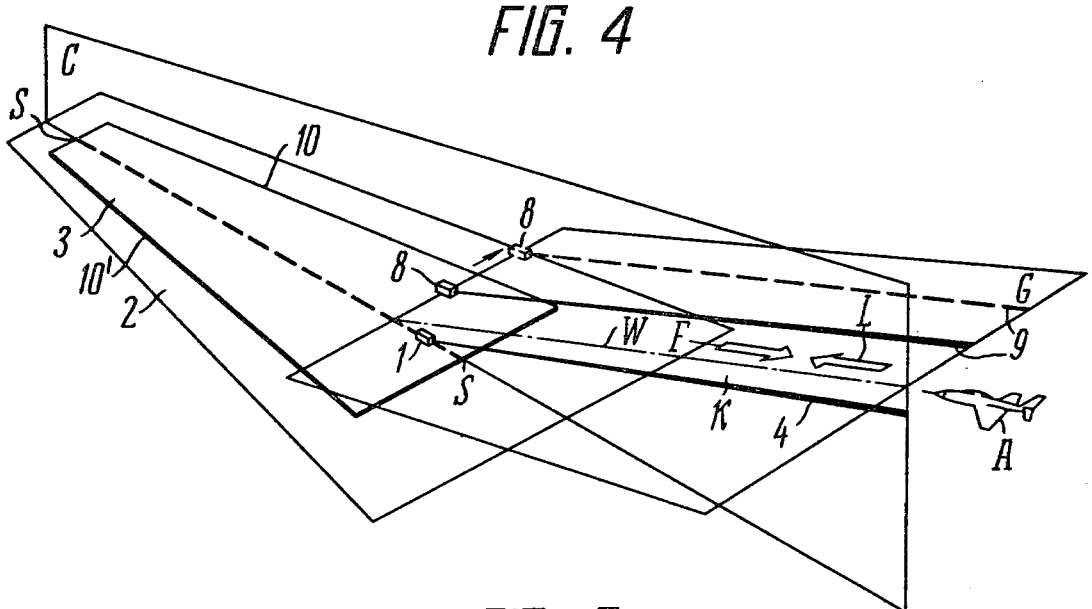
FIG. 5 shows an embodiment of the take-off and landing system with two sources of electromagnetic radiation, one being positioned on the center line of a take-off and landing platform and its beam being oriented in the course plane, and the other being positioned on one side of the center line and its beam being oriented in the glide slope plane, in accordance with the invention.

FIG. 5 shows the position of this source 8 on the flight platform 2 outside the take-off and landing platform 3 by the dotted line, whereas the solid line shows a specific embodiment of the take-off and landing system, when the second source 8 of electromagnetic radiation is positioned on the take-off and landing platform 2 to the right of the course plane C, if viewed in the direction of landing (arrow L), and its beam 9 limits the take-off or landing corridor K from the right and is oriented in the glide slope plane G.

The source 1 of electromagnetic radiation may also be placed at various points on the center line SS of the take-off and landing platform 3, both on and outside the flight platform 2. The dotted line indicates a possible position of this source on the take-off and landing platform, whereas the solid line shows a specific embodiment of the proposed take-off and landing system, when the source 1 is positioned so that its beam 4 is below the glide slope plane G. The arrows indicate possible shifting of the sources 1 and 8.

The beam 4 of the source 1 of electromagnetic radiation is below the glide slope plane G and limits said corridor K from below.

It should be kept in mind, however, that when the first source 1 of electromagnetic radiation is positioned on the center line SS and the second source 8 is aside of this center line SS of the take-off and landing platform 3, the second source 8 may be placed on the other side of the center line, whereas the beam 4 of the first source 1 may be above or below the glide slope plane G or cross this plane G. The source 8 (FIG. 6) of electromagnetic radiation may, for example, be positioned directly on a side boundary 10 of the take-off and landing platform 3, its beam 9 in this case being an indication of this boundary. The estimated take-off and landing path W in all these cases is the line of intersection of the course plane C and the glide slope plane G.

Figure 7:
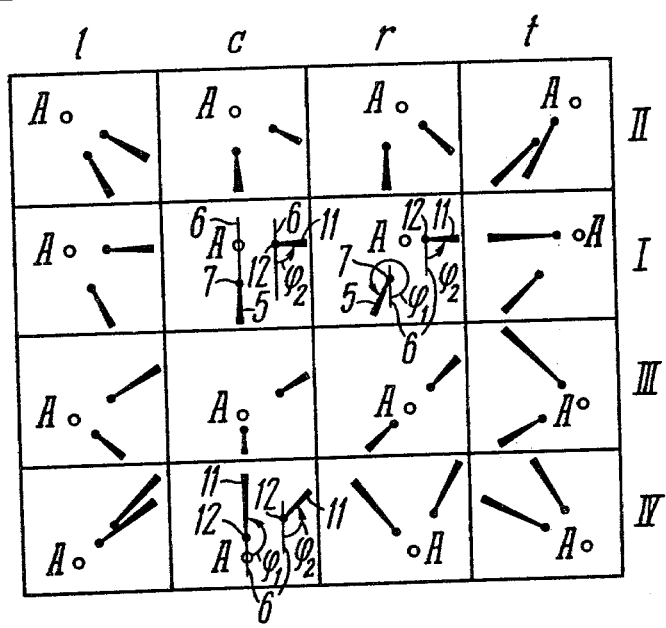
FIG. 7 is a table of distortions of a specified configuration of the symbol produced by the beams of the sources of electromagnetic radiation of the take-off and landing system of FIGS. 5 and 6 for various aircraft attitudes in relation to an estimated take-off or landing path, in accordance with the invention.

The table of distortions of the specified configuration of the symbol (FIG. 7) produced by the projection 5 of the beam 4 and a projection 11 of the electromagnetic beam 9 for various attitudes of the aircraft A (FIGS. 5 and 6) in relation to the estimated take-off or landing path W is drawn up similarly to the table of FIG. 3. The symbol produced by the projections 5 and 11 of electromagnetic beams 4 and 9 looks like two straight lines, the first (5) of them being directed, when the aircraft A (FIGS. 5 and 6) is on the course and glide slope of the estimated take-off or landing path W, downward of the point 7 in a direction opposite to the position of the aircraft A and coinciding with the vertical 6, whereas the second projection 11 is directed to the right of a point 12 in a direction opposite to the position of the aircraft A and orthogonal to the vertical 6. Such a configuration of the symbol is the specified configuration for the aircraft landing by the take-off and landing system made as in FIGS. 5 and 6 and corresponds to the cI square of the table of distortions of the specified symbol configuration (FIG. 7).

In the case of take-off according to this take-off and landing system, the projection 11 of the electromagnetic beam 9 will be on the left side but still orthogonal to the vertical 6.

The point 12 is similar to the point 7. It should be noted that additional points will have absolutely identical functions to those of point 7 and will be determined in similar way.

Figure 6:
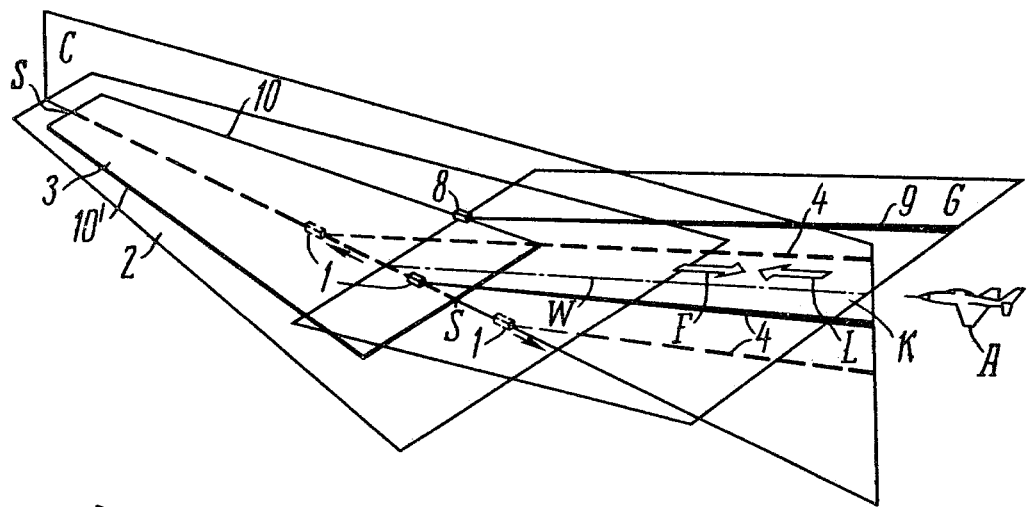
FIG. 6 shows an embodiment of the take-off and landing platform with two sources of electromagnetic radiation, one of these sources being positioned on the center line of a take-off and landing platform and the other, on one side of its center line on the side boundary of this platform, in accordance with the invention.

If the aircraft A, taking off or landing through the use of the embodiment of the take-off and landing system of FIGS. 5 and 6, deviates from the glide slope of the estimated take-off or landing system W, but remains in the course plane C, the specified configuration of the symbol corresponding to the cI square is distorted. When the aircraft A is above the glide slope of the estimated take-off and landing path, the projection 11 of the electromagnetic beam 9 is directed downward and to the right of the point 12, which corresponds to the cII square, whereas, when the aircraft A is below the glide slope of the estimated take-off and landing path W, it is directed upward and to the right of the point 12 (cIII and cIV squares).

The table of FIG. 7 uses, in comparison with that of FIG. 3, the following additional notations:

IV—the aircraft is below the take-off or landing corridor;

t—the aircraft is to the right of the take-off or landing corridor.

The projection 5 of the electromagnetic beam 4, whatever the position of the aircraft A in the course plane C, coincides with the vertical 6 and is directed downward of the point 7 when the aircraft is above or below the glide slope of the estimated take-off or landing path W (cII and cIII squares), it changes its direction for an opposite one (cIV square) when the aircraft A is below the electromagnetic beam 4 (FIGS. 5 and 6).

The change of the direction of the projection 5 of the electromagnetic beam 4 for an opposite one indicates that the aircraft A is below the take-off or landing corridor K but still in the course plane C (cIV square).

If the aircraft A deviates from the course of the estimated take-off and landing path W but stays in the glide slope plane G, the specified symbol configuration corresponding to the cI square is distorted. When the aircraft A is to the left of the course of the take-off or landing path W (lI square), the projection 5 of the electromagnetic beam 4 is directed to the right and downward of the point 7 or to the left and downward of this point (rI and tI squares) when the aircraft A is to the right of the course of this path W and to the right of the take-off or landing corridor K.

The projection 11 of the electromagnetic beam 9, whatever the position of the aircraft A in the glide slope plane G, remains horizontal, that is orthogonal to the vertical 6, and directed from left to the right from the point 12, when the aircraft is to the left or to the right (LI and rI squares) of the course of the estimated take-off or landing path, and changes its direction for an opposite one, when the aircraft is to the right of the take-off or landing corridor (tI square).

Such a change of the direction of the projection II of the electromagnetic beam 9 indicates that the aircraft A is to the right of the take-off or landing corridor K (FIGS. 5 and 6) but stays in the glide slope plane G (tI square in FIG. 7).

If the source 8 (FIG. 6) of electromagnetic radiation is positioned directly on the side boundary 10 of the take-off and landing platform 3, the change of the direction of the projection II of the beam 9 (FIG. 7) for an opposite one indicates that the aircraft A is to the right of this side boundary 10 and outside the take-off and landing platform 3.

If the aircraft A deviated from both the course and glide slope of the estimated take-off or landing path W, the specified symbol configuration is distorted, each position of the aircraft A with respect to the path W having a corresponding direction of the projections 5 and 11 of the beams 4 and 9. The table (FIG. 7) of distortions of the specified symbol configuration is a good evidence to this.

Placing the source 8 (FIG. 6) of electromagnetic radiation on the side boundary 10 of the take-off and landing platform 3 leaves the specified symbol configuration basically unaffected and needs no detailed description.

When the aircraft A takes off using the take-off and landing system of FIGS. 5 and 6, the distortions of the specified symbol configuration are similar to those in the table (FIG. 7) with the only difference that this symbol is a mirror reflection with respect to the vertical 6 passing through the point 7.

The position of the aircraft A in relation to the take-off or landing path W may be determined by the distortions of the specified symbol configuration through the use of the forementioned principle, as well as the direction of the path correction of the aircraft A.

Figure 8:
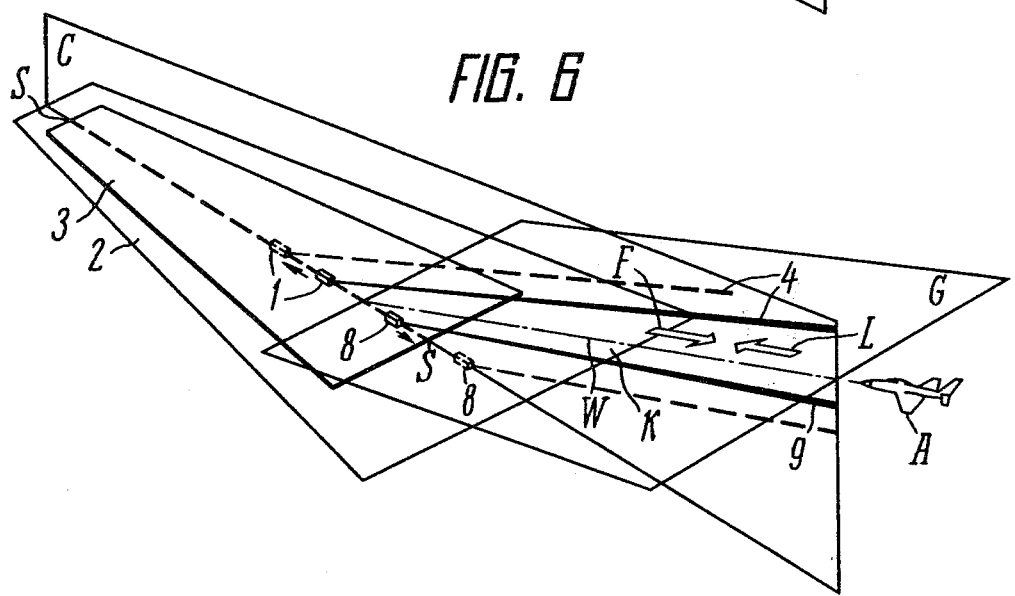
FIG. 8 shows an embodiment of the take-off and landing system with two sources of electromagnetic radiation, positioned on the center line of a take-off and landing platform, their beams being oriented in the course plane, in accordance with the invention.

Another embodiment (FIG. 8) of the take-off and landing system comprises two sources of electromagnetic radiation. The first source I of electromagnetic radiation is positioned on the center line SS of the take-off and landing platform 3, its beam 4 being oriented in the course plane C, and the second source 8 is positioned on the same center line SS at a certain distance from the first one, its beam 9 defining, in combination with the beam 4, the take-off or landing corridor K. FIG. 8 shows a specific embodiment of the take-off and landing system, wherein the second source 8 is positioned ahead of the first source I, if viewed in the direction of landing (arrow L), its beam being also oriented in the course plane C, but the two beams do not intersect. The estimated take-off or landing path W is situated between these beams 4 and 9, and they limit the take-off or landing corridor K from below and from above.

The dotted line shows other alternatives of placing the sources I and 8 on the center line SS of the take-off and landing platform 3. In this case, the source 8 of electromagnetic radiation may also be positioned on the flight platform 2 on the extension of the center line SS of the take-off and landing platform 3. The arrows indicate possible shifts of these sources I and 8.

It should be borne in mind that other alternatives of placing the second source 8 on the center line SS of the take-off and landing platform are possible. The source 8 may be placed behind the first source 1 and the beams 4 and 9 of the sources I and 8 of electromagnetic radiation may intersect.

The table of distortions of the specified configuration of the symbol (FIG. 9) produced by the projection 5 of the beam 4 and the projection 11 of the beam 9 for various positions of the aircraft A (FIG. 8) with respect to the estimated take-off or landing path W is drawn up similarly to the tables of FIGS. 3 and 5. The specified configuration of the symbol for the aircraft's position on the path W is given as before in the cI square and is made up of two projections 5 and 11 of the beams 4 and 9 disposed vertically and extending in opposite directions from the points 7 and 12.

If the aircraft A, taking off or landing according to the forementioned embodiment of the take-off and landing system of FIG. 8, deviates from the glide slope, but still keeps to the course plane C, the specified configuration of the symbol is not distorted and it is only when the aircraft comes above or below the take-off or landing corridor K that one of the projections 5 or 11 of the beams 4 or 9 changes its direction for an opposite one, coinciding with the vertical 6. This corresponds to cV or cIV squares of the table of distortions of the specified symbol configuration (FIG. 9).

Figure 9:
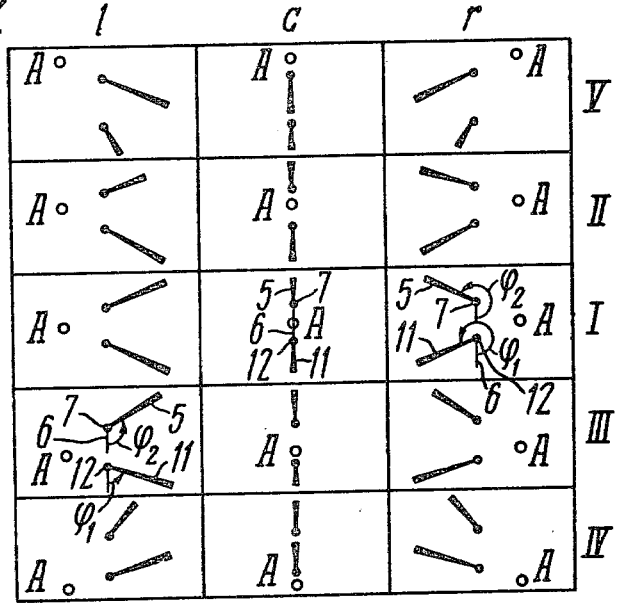
FIG. 9 is a table of distortions of a specified configuration of the symbol produced by the beams of the sources of electromagnetic radiation of the take-off and landing system of FIG. 8 for various aircraft attitudes in relation to the take-off or landing path, in accordance with the invention.

The table of FIG. 9 uses the following additional notations in comparison with those of FIGS. 3 and 7:

V—the aircraft is above the take-off or landing corridor.

If the aircraft A deviates from its course, but still keeps on the glide slope of the estimated take-off or landing path W, the specified configuration of the symbol is distorted and, when the aircraft A is to the left of the course (lI square), one of the projections 11 is directed to the right and downward of the point 12 and the second projection 5, to the right and upward of the point 7. When the aircraft A is to the right of the course (rI square) the projections 5 and II occupy a position symmetrical about the vertical 6.

If the aircraft A is to the left of the course of the estimated take-off or landing path W (this corresponds to l squares of FIG. 9) and deviates from the glide slope of this path W, the symbol configuration is distorted so that when the aircraft A is above the glide slope angles $\phi_1$ and $\phi_2$ become smaller (lIII and lIV) squares) than angles $\phi_1$ and $\phi_2$ when the aircraft is on the glide slope of the path W (lI square), or, in contrast, greater when the aircraft A is below the glide slope of the estimated take-off or landing path W (lIII and lIV squares).

It is easily comprehended that the symbol, in this case, is distorted so that, when the aircraft A is on the glide slope of the estimated path W, the projections 5 and II of the beams 4 and 9 are symmetrical to each other with respect to the straight line orthogonal to the vertical 6, and this symmetry is upset when the aircraft A is above or below the glide slope of the estimated path W.

In case the aircraft A is to the right of the course of the path W (this corresponds to r squares in FIG. 9) and deviates from the glide slope of this path W, the symbol configuration is symmetrical to the forementioned one with respect to the vertical 6.

As before, the position of the aircraft A in relation to the estimated take-off or landing path W may be determined through the use of the forementioned principle by the distortions of the specified symbol configuration, as well as the direction of its path correction.

If the take-off and landing system comprises two sources of electromagnetic radiation positioned on one side of the center line of the take-off and landing platform, the beam of one of these sources is oriented in its own glide slope plane and indicates that glide slope. The second source may be positioned on the same side of the center line of the take-off and landing platform or on its opposite side, and the beam of this source of electromagnetic radiation is oriented in its own glide slope plane and indicates that plane. In combination, these beams of both sources limit the take-off or landing corridor from the sides.

Finally, these glide slope planes may coincide.

Figure 10:
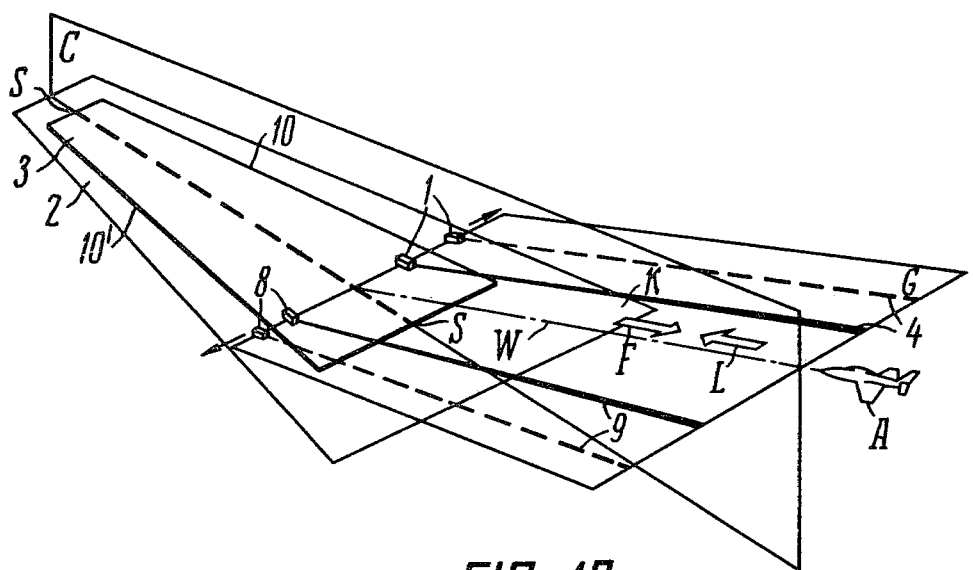
FIG. 10 shows an embodiment of the take-off and landing system with one main pair of sources of electromagnetic radiation, positioned on a take-off and landing platform, their beams being oriented in a common glide slope plane, in accordance with the invention.

An embodiment of the proposed take-off and landing system wherein the sources of electromagnetic radiation are positioned on either side of the center line SS and their beams oriented in a common glide slope plane is illustrated in FIG. 10.

A first source 1 is placed on one side of the center line SS of a take-off and landing platform 3, whereas a second source 8 is placed on the other side of the center line SS of this platform 3, and their beams 4 and 9 are oriented in a glide slope plane G and indicate that plane G. The sources 1 and 8 of electromagnetic radiation constitute the main pair of sources. The beams 4 and 9 of the sources 1 and 8 limit a take-off or landing corridor K from both sides. An estimated take-off or landing path W is the intersection line of a course plane C and the glide slope plane G and lies within said corridor K.

The sources 1 and 8 of electromagnetic radiation may be positioned on either sadi of the center line SS of the take-off and landing platform 3 at any point of a flight platform 2.

FIG. 10 shows the position of these sources 1 and 8 on the flight platform 2 outside the take-off and landing platform by a dotted line, and a specific embodiment, wherein the sources 1 and 8 are placed directly on the take-off and landing platform 3, by a solid line.

There may be other alternatives of placing the sources 1 and 8 of electromagnetic radiation, e.g. when these sources are positioned symmetrically with respect to the center line SS or on side boundaries 10 and 10' (FIG. II) of the take-off and landing platform 3, their beams 4 and 9 indicating these boundaries.

It should be kept in mind, however, that one of the sources of electromagnetic radiation, e.g. the source I, may be positioned directly on the take-off and landing platform 3 and another, outside this platform on the fligh platform 2.

The beams 4 and 9 of the sources I and 8 of electromagnetic radiation positioned on one side of the center line SS of the take-off and landing platform 3 may both be directed parallel to the course plane C and form a small angle to this plane. This angle may amount to several angular minutes and reach 1–5°. Such an orientation of the beams 4 and 9 at small angles to the course plane C permits the width of the take-off or landing corridor to become variable, in particular, wider as the distance from the surface of the take-off and landing platform 3 increases.

Figure 12:
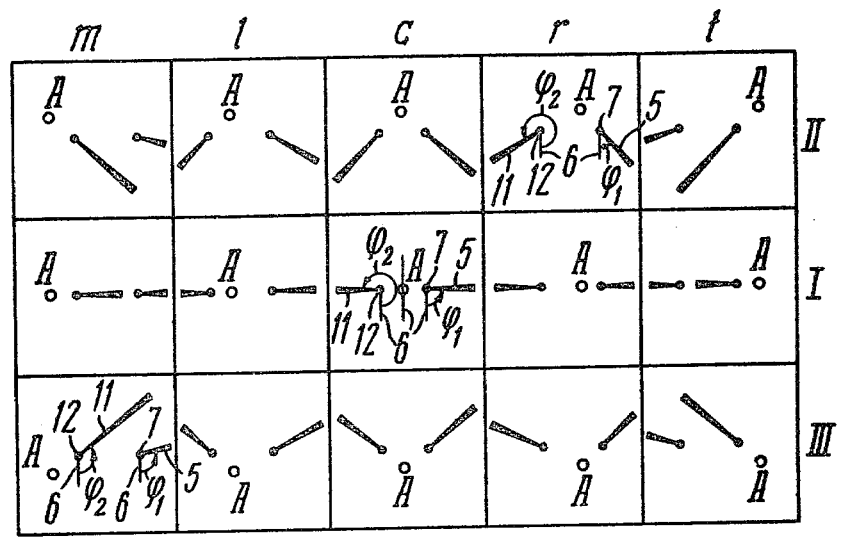
FIG. 12 is a table of distortions of a specified configuration of the symbol produced by the beams of the sources of electromagnetic radiation of the take-off and landing system of FIGS. 10 and 11 for various aircraft attitudes in relation to an estimated take-off or landing path, in accordance with the invention.

The table of distortions of the specified cofiguration of the symbol (FIG. 12) produced by projections 5 and II of the beams 4 and 9 for various positions of the aircraft A (FIGS. 10 and II) with respect to the estimated take-off or landing path W is drawn up similarly to the previously discussed table (FIGS. 3, 7 and 9). For simplicity's sake, FIG. 12 illustrates the distortions of the specified symbol configuration for the case of symmetrical positioning of the sources I and 8 with respect to the center line SS of the take-off and landing platform.

The specified symbol configuration for the aircraft's position on the path W is given as before in the cI square and is made up of the projections 5 and II of the beams 4 and 9 orthogonal to the vertical 6 and extending from arbitrary points 7 and 12 in opposite directions, that is the symbol has a specified configuration of two horizontal lines disposed on a straight line.

If the aircraft A takes off or lands through the use of the forementioned embodiments of the take-off and landing system of FIGS. 10 and II and deviates from the glide slope, still staying in the course plane C, the specified symbol configuration is distorted so that, when the aircraft is above the glide slope of the path W (cII square of FIG. 12), the projections 5 and II are directed downward and to the right and downward and to the left, respectively, of the arbitrary points 7 and 12. When the aircraft A is below the glide slope of the path W the projections 5 and II are directed upward and to the right and upward and to the left, respectively, of the arbitrary points 7 and 12 (cIII square of FIG. 12). In this case, the projections 5 and II of the beams 4 and 9 are disposed symmetrically with respect to the vertical 6.

If the aircraft deviates from the course of the estimated take-off or landing path W, still staying in the glide slope plane G, the specified symbol configuration (cI square) is not distorted, and only when the aircraft A comes out of the take-off or landing corridor to the left (mI square) or to the right (tI square), one of the projections II or 5 of the beams 9 or 4 changes its direction for an opposite one, remaining horizontal.

The table of FIG. 12 uses an additional notation, as compared to that of FIGS. 3, 7 and 9:

m—the aircraft is to the left of the take-off or landing corridor.

In case the sources I and 8 (FIG. II) of electromagnetic radiation are installed on the side boundaties 10 and 10' of the take-off and landing platform 3, such a reversal of the direction of the projections II and 5 of the beams 9 and 4 indicates that the aircraft A is to the left or to the right of the side boundary 10' or 10 and is outside the limits of the take-off and landing platform 3.

If the aircraft A deviates from the course, being, for example, above the glide slope of the estimated take-off or landing path W (II squares), the specified symbol configuration is distorted as in the table of FIG. 12. The specified symbol configuration is similarly distorted when the aircraft A deviates from the course, being below the glide slope of the estimated take-off and landing path W (III squares). In both instances, the symmetry of the projections 5 and II of the beams 4 and 9 with respect to the vertical 6 is upset.

It is worth while to dwell once more on the above described tables (FIGS. 2, 3, 7, 9 and 12) and point out some common features of symbol distortions to further simplify the description of the tables of distortion of the specified symbol configuration for various deviations of the aircraft A from the estimated take-off or landing path W.

As is apparent from the tables (FIGS. 2, 3, 7, 9 and 12), in case the beam 4 (FIGS. 2, 5, 6 and 8) is oriented in the course plane C, the change of the aircraft A position with respect to the glide slope of the estimated take-off or landing path W, if it is still in the course plane C, involves no change in position of the projection 5 of the beam 4, except when the aircraft A comes out of the boundaries of the corridor K. In this case, the projection 5 of the beam 4 changes its position for an opposite one.

The change of the aircraft's position in the course plane, consequently, involves no angular turn of the projection 5 of the beam 4 situated in the same course plane. The projection 5 is, in this case, at all times coincident with the vertical 6.

The process is much the same in case the aircraft A changes its position in relation to the course of the estimated take-off or landing path W without leaving the glide slope plane G. In this case, the projections II (FIG. 7) as well as 5 and II (FIG. 12) of the beams 9 (FIGS. 5 and 6) as well as 4 and 9 (FIGS. 10 and II) do not alter their horizontal position orthogonal to the vertical 6 and only when the aircraft A leaves the take-off or landing corridor K, they change their direction for an opposite one (tI square of FIG. 7 and mI, tI squares of FIG. 12).

When the aircraft A deviates from the course and glide slope of the estimated take-off or landing path W at the same time, the position of the projections 5 or II of the beams 4 and 9 changes, including two turns about the arbitrary points 7 and 12, a turn due to the aircraft's changing its position in relation to the course and a turn due to a change in position in relation to the glide slope of the estimated take-off or landing path W.

Let us consider several embodiments of the proposed take-off and landing system when it comprises several pairs of sources of electromagnetic radiation.

Thus, if the take-off and landing system comprises two pairs (FIG. 13) of sources of electromagnetic radiation, sources I and 8 constituting the main pair of sources are positioned on either side of a center line SS of a take-off and landing platform 3, their beams 4 and 9 being directed in a glide slope plane $G_1$ of their own. Two other sources 13 and 1 are also positioned on either side of the center line SS of the take-off and landing platform 3, their beams 15 and 16 being directed in a glide slope plane $G_2$ of their own. Beams 4, 9, 16 and 15 of the sources 1, 8, 14 and 13 limit a take-off or landing corridor K from all sides.

The sources I and 8, 13 and 14 of electromagnetic radiation, placed on either side of the center line SS of the take-off and landing platform 3 may be sited in any place of a flight platform 2.

Figure 13:
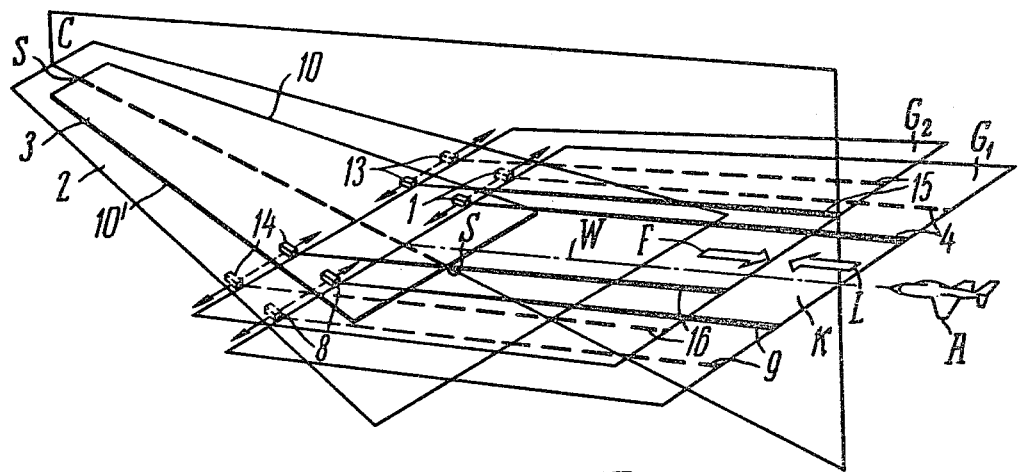
FIG. 13 shows an embodiment of the take-off and landing system with two pairs of sources of electromagnetic radiation, positioned on a take-off and landing platform on either side of its center line, their beams being oriented in pairs in glide slope planes different for each pair, in accordance with the invention.

FIG. 13 shows the location of these sources on the flight platform 2 outside the take-off and landing platform 3 by a dotted line and a specific embodiment, wherein these sources I, 8, 13 and 14 are positioned on the take-off and landing platform 3, by a solid line. There are other alternatives of positioning these sources, e.g. when some of them are sited on the take-off and landing platform 3 and some, outside it on the flight platform 2, or when the sources I and 8, 13 and 14 of electromagnetic radiation are installed in pairs symmetrically with respect to the center line SS of the take-off and landing platform 3. In one more embodiment (FIG. 14), the sources 1, 8, 13 and 14 of electromagnetic radiation are positioned on side boundaris 10' and 10 of the take-off and landing platform 3.

In this case the beams 4, 9, 15 and 16 of these sources 1, 8, 13 and 14 delineate the side boundaries 10 and 10' of this platform 3. Besides, in some embodiments, the glide slope planes $G_1$ and $G_2$ may be parallel. These alternative embodiments are not shown since they do not have any marked influence on the specified configuration of the symbol produced by electromagnetic beams and on distortions of this specified symbol configuration caused by deviations of the aircraft A from the estimated take-off or landing path W.

Figure 14:
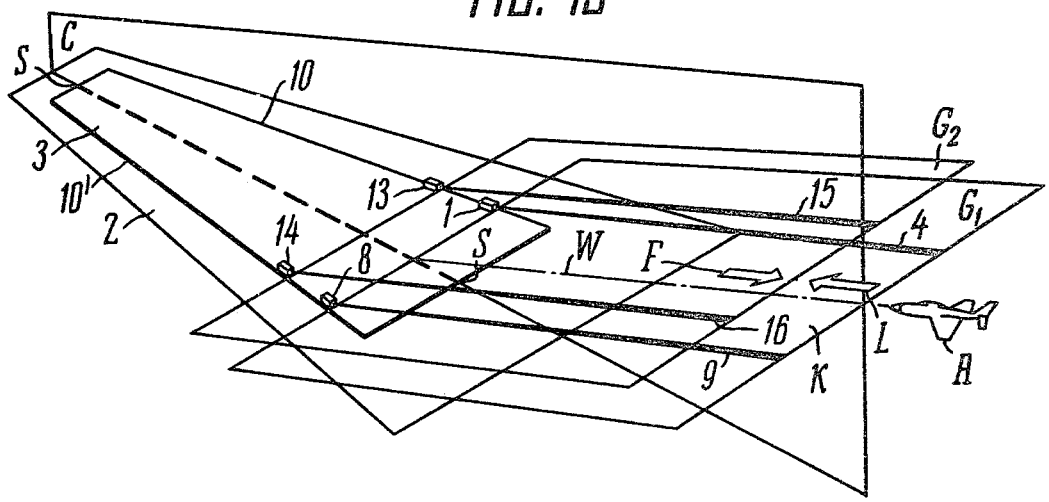
FIG. 14 shows an embodiment of the take-off and landing system with two pairs of sources of electromagnetic radiation, positioned on the side boundaries of a take-off and landing platform, two on each side, in accordance with the invention.

For simplicity's sake, let us assume the estimated take-off or landing path W of the embodiment of the take-off and landing system of FIGS. 13 and 14 to be situated between the glide slope planes $G_1$ and $G_2$, equidistant from each of them and lying in the course plane. In principle, though, this path W may be preset arbitrarily and even lie in one of the planes $G_1$ or $G_2$.

The specified symbol configuration, when the aircraft A is on the extimated take-off or landing path, is given, as before, in the cI square and made up of four projections 5, II, 17 and 18 of the beams 4, 9, 15 and 16 of electromagnetic radiation being symmetrical, in pairs, both about the vertical 6 and about the horizontal, that is the line orthogonal to the vertical 6 (here and henceforth the horizontal is not shown). These projections 5, II, 17 and 18 of the beams 4, 9, 15 and 16 diverge in a fan-like fashion from the point A designating the location of the aircraft A originating from arbitrary points 7, 12, 19 and 20.

When the aircraft A deviates (FIGS. 13 and 14) from the course and glide slope of the estimated take-off or landing path W, the distortion of the specified configuration of the symbol produced by the projections 5, II, 17 and 18 of the electromagnetic beams 4, 9, 15 and 16 may be determined according to the aforementioned rules. A graphic illustration of this is furnished by the table of distortions of the symbol configuration of FIG. 15. The distortions of the symbol configuration are an indication of the direction and magnitude of corrections of a current flight path of the aircraft A.

Another embodiment of the proposed take-off and landing system with several pairs of sources of electromagnetic radiation is one (FIG. 16) comprising three pairs of sources of electromagnetic radiation.

Sources I and 8 constitute the main pair of sources of electromagnetic radiation and are positioned on either side of a center line SS of a take-off and landing platform 3, and their beams 4 and 9 are oriented in their own glide slope plane $G_1$.

Two other sources 13 and 14 constitute a second pair of sources of electromagnetic radiation and are also positioned on either side of the center line SS of the take-off and landing platform 3, and their beams 15 and 16 are oriented in their own glide slope plane $G_2$.

Finally, two more sources 21 and 22 constitute a third pair of sources of electromagnetic radiation and are positioned similarly to the previous ones on either side of the center line SS of the take-off and landing platform 3, and their beams 23 and 24 are oriented in their own glide slope plane $G_3$. The glide slope planes $G_2$ and $G_3$ are situated on either side of the glide slope plane $G_1$ of the main pair of sources.

The beams 15 and 16 of the sources 13 and 14 limit a take-off or landing corridor K from above, whereas the beams 23 and 24 of the sources 21 and 22 of electromagnetic radiation limit this corridor K from below. The take-off or landing corridor K is limited, on one side, by the beams 4, 15 and 23 of the sources 1, 13 and 21 and by the beams 9, 16 and 24 of the sources 8, 14 and 22 on the other side. The sources 1, 13 and 21 installed on one side of the conter line SS and the sources 8, 14 and 22 installed on the other side of this center line SS of the take-off and landing platform 3 may be positioned in any place of a flight platform 2.

Figure 16:
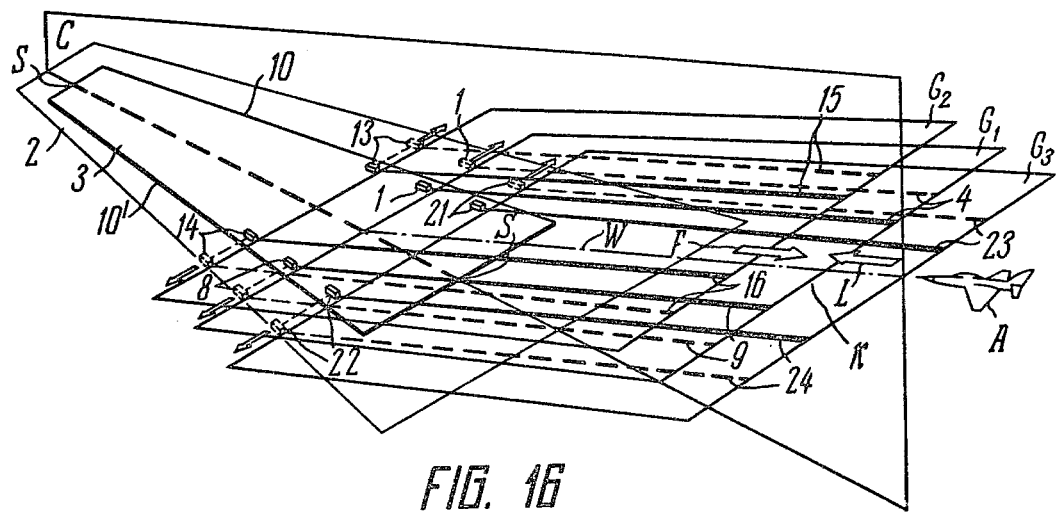
FIG. 16 shows an embodiment of the take-off and landing system with three pairs of sources of electromagnetic radiation, positioned on a take-off and landing platform on either side of its center line, their beams being oriented in pairs in glide slope planes different for each pair, in accordance with the invention.

FIG. 16 shows the position of these sources on the flight platform 2 outside the limits of the take-off and landing platform 3 by a dotted line and a specific embodiment, wherein these sources 1, 13, 21 and 8, 14, 22 are placed on the take-off and landing platform 3, by a solid line. The arrows, like before, indicate possible shifts of these sources.

There are other alternative embodiments wherein these sources are sited differently, e.g. when some of them are installed on the take-off and landing platform 3 and some outside, on the flight platform 2, or when these sources are positioned in pairs symmetrically about the center line SS of the take-off and landing platform 3. In one more embodiment (FIG. 17), the sources I, 13, 21 and 8, 14, 22 of electromagnetic radiation are positioned respectively on side boundaries 10 and 10' of the take-off and landing platform 3. In this case, their beams 4, 15, 23 and 9, 16, 24 delineate additionally the side boundaries 10 and 10' of this platform. Besides, in another embodiment, the glide slope planes $G_1$, $G_2$, and $G_3$ may run parallel.

As far as the beams 4, 15 and 23 of the sources 1, 13 and 21 of electromagnetic radiation and the beams 9, 16 and 24 of the sources 8, 14 and 22 are concerned, they may be oriented in the glide slope planes $G_1$, $G_2$ and $G_3$ either parallel to the course plane C or form a small angle to this plane, permitting the take-off or landing corridor K to widen when receding from the surface of the take-off and landing platform 3. The angles between these beams and the course plane C may be equal to several angular minutes and even several angular degrees.

All this variety of embodiments are not shown, since they do not have any marked influence on the specified configuration of the symbol produced by the beams of the sources of electromagnetic radiation, as well as on the distortions of the specified symbol configuration caused by deviations of the aircraft A from the estimated take-off and landing path W.

Figure 17:
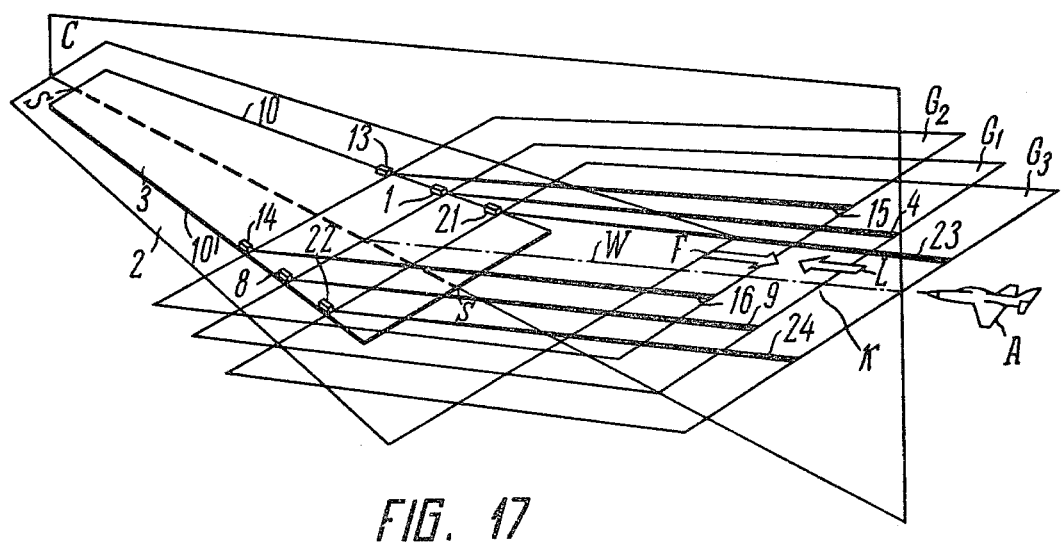
FIG. 17 shows an embodiment of the take-off and landing system with three pairs of sources of electromagnetic radiation, positioned on the side boundaries of a take-off and landing platform, three on each side, in accordance with the invention.

The estimated take-off or landing path W for the embodiment of the proposed take-off and landing system, shown in FIGS. 16 and 17, is the line of intersection of the glide slope plane $G_1$ and the course plane C.

The specified symbol configuration (FIG. 18), when the aircraft A is on the estimated take-off or landing path W (FIGS. 16 and 17), is given, as before, in the cI square and made up of six projections 5, II, 17, 18, 25 and 26 of the electromagnetic beams 4, 9, 15, 16, 23 and 24 symmetrical in pairs both to the vertical 6 and to the horizontal, that is the line orthogonal to the vertical 6. These projections diverge in a fan-like fashion from the point A corresponding to the location of the aircraft A originating from arbitrary points 7, 12, 19, 20, 27 and 28. Since the aircraft A is on the estimated take-off or landing path W and in the glide slope plane $G_1$, the projections 5 and II of the beams 9 and 4 look like horizontal lines extending along a straight line. The projections 17 and 18 of the beams 15 and 16 are directed upward and in different directions. Thus, the projections 17 of the beam 15 is directed upward and to the right, whereas the projection 18 of the beam 16 is pointed upward and to the left. The difference between angles $\phi_3$ and $\phi_4$ is 360°, that is the angles are equal if reckoned in different directions, one in the negative and the other in the positive direction.

The projections 25 and 26 of the beams 23 and 24 are in perfect analogy with the forementioned ones with the only difference that they are directed downward and in opposite directions.

If an aircraft takes off or lands through the use of the forementioned embodiment of the proposed take-off and landing system (FIGS. 16 and 17) and deviates from the glide slope of the estimated take-off or landing path W, still staying in the course plane C, the specified symbol configuration (cI square of FIG. 18) is distorted so that the symmetry about the horizontal is upset, whereas it is preserved in relation to the vertical 6, that is in relation to the direction of deviations of the aircraft A from the estimated take-off or landing path W (c squares).

If the aircraft A takes off or lands and deviates from the course of the estimated path W, still staying in the glide slope plane $G_1$, the specified symbol configuration (cI square of FIG. 18) is distorted so that the symmetry about the vertical 6 is upset and the symmetry about the horizontal is preserved (I squares).

If the aircraft A deviates simultaneously from the course and glide slope of the estimated take-off or landing path W, the specified configuration of the symbol is distorted with the symmetry about the vertical 6 and the horizontal being upset at the same time. This can be seen from the table of distortions of the symbol configuration of FIG. 18.

Figure 18:
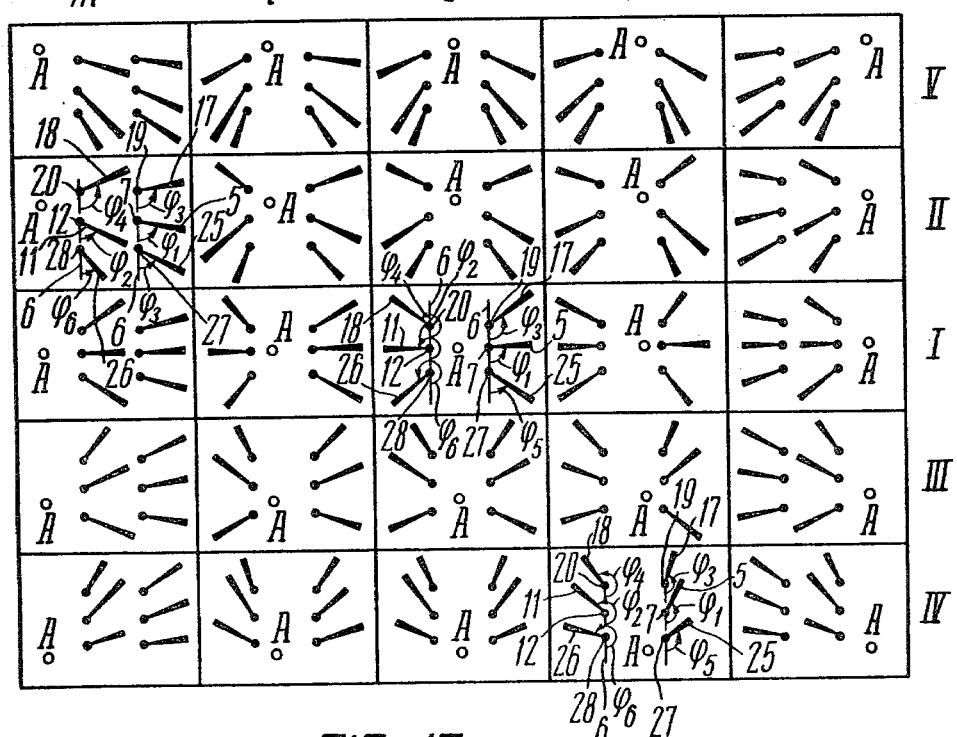
FIG. 18 is a table of distortions of a specified configuration of the symbol produced by the beams of the sources of electromagnetic radiation of the take-off and landing system of FIGS. 16 and 17 for various aircraft attitudes in relation to an estimated take-off or landing path, in accordance with the invention.

Changes in the direction of some projections may help to determine if the aircraft A is outside the limits of the take-off or landing corridor K. One more simple rule may be used here and it is illustrated in FIG. 18. If all the projections 5, II, 17, 18, 25 and 26 of the beams 4, 9, 15, 16, 23 and 24 extend predominantly in the same direction, e.g. to the left and downward (tV square) of the arbitrary points 7, 12, 19, 20, 27 and 28, that means that the aircraft A is on a side opposite to the take-off or landing corridor, to the right and upward of this corridor K in the above cited example, etc.

If, in this case, the sources 1, 8, 13, 14, 21 and 22 are installed on the side boundaries 10 and 10' of the take-off and landing platform 3, as shown in FIG. 17, deviations of the aircraft A from the take-off or landing corridor K to the right or to the left indicates that the aircraft is respectively to the left or right of the take-off and landing platform 3.

The proposed take-off and landing system may have other embodiments. Thus, for example, it may comprise, apart from one or several pairs of sources of electromagnetic radiation, one more source to be installed as in the embodiment of FIG. 2, that is on the conter line of the take-off and landing platform.

An example of this embodiment is a system (FIG. 19) comprising two sources I and 8 of electromagnetic radiation, constituting the main pair, positioned on either side of a center line SS of a take-off and landing platform 3, their beams 4 and 9 being oriented in a glide slope plane G, and a third source 29 positioned on the center line SS of the take-off and landing platform 3, its beam 30 being oriented in a course plane C. The source 29 may be installed in any place of the center line SS of the take-off and landing platform 3, or ahead of this platform on the extension of its center line SS, its beam 30 being below or above the glide slope plane G, or crossing this glide slope plane G. The solid line indicates the location of the source 29 with its beam directed above the glide slope plane G, and the dotted line indicates an alternative location of this source 29 when its beam is below the glide slope plane G. The arrows show possible shifts of all the three sources I, 8 and 29 of electromagnetic radiation.

There is another embodiment of the take-off and landing system (FIG. 20) comprising, for example, five sources of electromagnetic radiation. For simplicity, a case is considered when two sources I and 8 of electromagnetic radiation constitute the main pair of sources and are installed on either side of a center line SS of a tale-off and landing platform 3 on its side boundaries 10 and 10' with beams 4 and 9 being oriented in their own glide slope plane $G_1$. Two other sources 13 and 14 constitute a second pair and are also installed on either side of the center line SS of the take-off and landing platform 3 on its side boundaries with beams 15 and 16 being oriented in their own glide slope plane $G_2$. Finally, a fifth source 29 is installed on the center line SS of the take-off and landing platform 3, its beam being oriented in a course plane C. The source 29 may be installed in any place on the center line SS, as well as ahead of this platform 3 on the extension of the center line SS, and its beam 30 may be positioned above the glide slope planes $G_1$ and $G_2$ (indicated by a solid line in FIG. 20), below the planes $G_1$ and $G_2$ (indicated by a dotted line in FIG. 20), in one of the planes $G_1$ or $G_2$, or cross these planes $G_1$ and/or $G_2$. The arrow indicates the direction of possible shifts of the source 29 of electromagnetic radiation.

There are other embodiments of the proposed take-off and landing system, e.g. when it comprises seven sources of electromagnetic radiation, that is three pairs of these sources positioned as in FIG. 16 and a seventh source placed on the center line SS of the take-off and landing platform 3, etc. These embodiments are not shown.

The specified symbol configuration produced by the beams of the sources of electromagnetic radiation, as well as distortions of this configuration for various deviations of the aircraft A from the estimated take-off or landing path W in accordance with the above described embodiments of the take-off and landing system (FIGS. 19 and 20) are not shown because of their simplicity.

Figure 19:
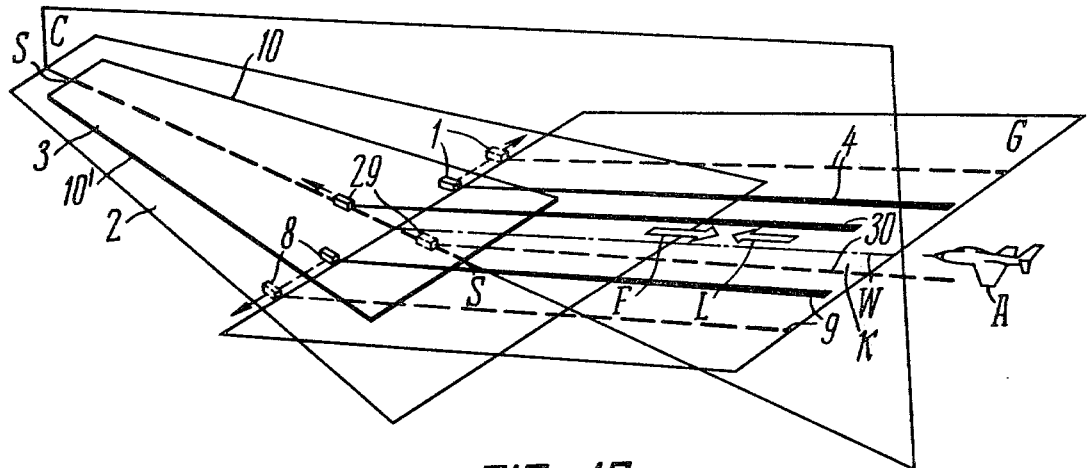
FIG. 19 shows an embodiment of the take-off and landing system with the main pair of sources of electromagnetic radiation positioned on either side of the center line of a take-off and landing platform and a third source positioned on its center line, in accordance with the invention.

FIG. 21 shows an embodiment of the take-off and landing system of FIG. 19, wherein the sources I and 8 of electromagnetic radiation are installed on the side boundaries 10 and 10' of the take-off and landing platform 3 and the source 29 is installed on the center line SS of this platform 3 so that its beam 30 is below the glide slope plane G produced by the beams 4 and 9 of the sources I and 8.

The beams 4, 9, 30 of the sources I, 8 and 29 of electromagnetic radiation may be directed in parallel or form the take-off or landing corridor K widening with distance from the take-off and landing platform 3.

In this case, the beams 4 and 9 of the sources I and 8 may form a small angle to the course plane C of the order of several angular minutes or even 1°–5°, and the beam 30 of the source 29 may be directed at the same angle to the glide slope plane G.

The take-off or landing corridor K is formed by the beams 4, 9 and 30 of the sources 1, 8 and 29, the beams 4 and 9 being the side limits of the corridor K and, simultaneously indications of the boundaries 10 and 10' of the take-off and landing platform 3, whereas the third beam 30 limits this corridor from below.

The specified symbol configuration (cI square of FIG. 22) when the aircraft A is on the extimated take-off or landing path W (FIG. 21), is made up of three projections 5, II and 31 of the electromagnetic beams 4, 9 and 30 looking like two horizontal lines and one vertical line. The projections 5 and II of the beams 4 and 9 are positioned horizontally along one straight line, whereas the projection 31 of the beam 30 is positioned vertically and coincides with the vertical 6, so that the specified symbol configuration has a T shape. The specified symbol is symmetrical about the vertical 6.

Figure 22:
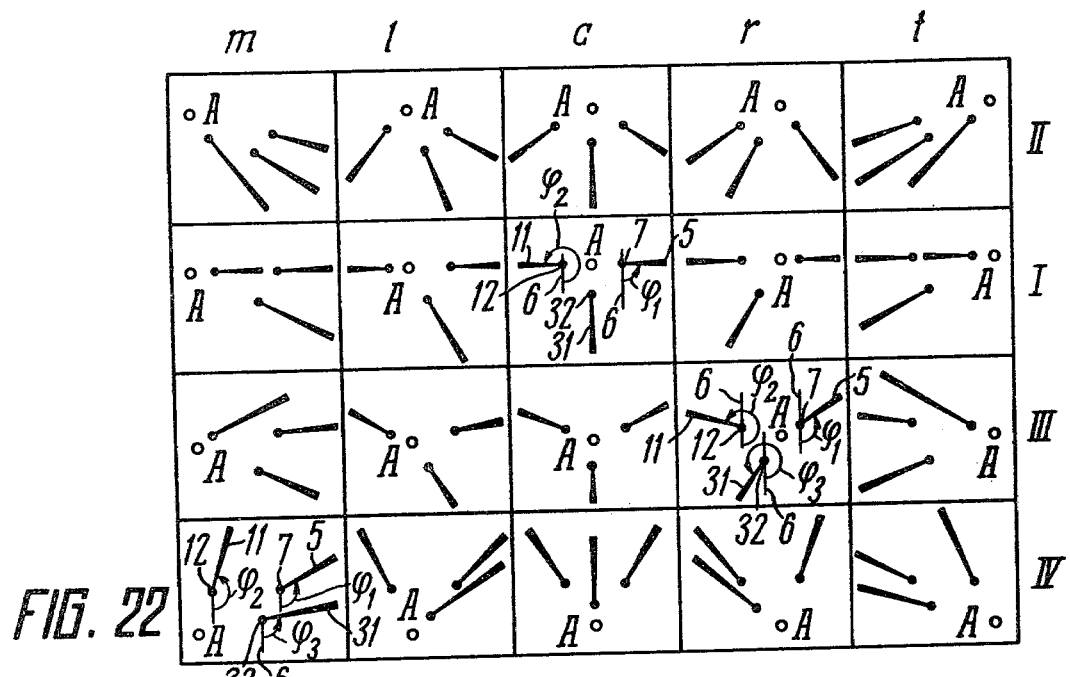
FIG. 22 is a table of distortions of a specified configuration of the symbol produced by the beams of the sources of electromagnetic radiation of the take-off and landing system of FIG. 21 for various aircraft attitudes in relation to an estimated take-off or landing path, in accordance with the invention.

If an aircraft takes off or lands through the use of the above described embodiment of the take-off and landing system (FIG. 21) and deviates from the glide slope of the estimated take-off or landing path W, still staying in the course plane C, the specified symbol configuration is distorted, and the projections 5 and II of the beams 4 and 9 are deflected from the horizontal direction, turning to each other in relation to arbitrary points 7 and 12 (c squares of FIG. 22). The vertical position of the projection 31 of the beam 30 is retained, and only when the aircraft A is below the take-off or landing corridor K (cIV square), the projection 31 of the beam 30 changes its direction for an opposite one.

If an aircraft takes off or lands and deviates from the course of the estimated path W, still staying in the glide slope plane G, the specified symbol configuration is distorted so that the projection 31 of the beam 30 deflects from the vertical 6, turning about the arbitrary point 32 (I squares). The horizontal position of the projections 5 and II of the beams 4 and 9 is retained, and only when the aircraft A is to the left (mI square) or to the right (tI square) of the take-off or landing corridor K, one of these projections II or 5 respectively changes its position for an opposite one.

Distortions of the specified symbol configuration in case of other deviations of the aircraft A from the estimated path W are shown in FIG. 22. The fact that the aircraft A is outside the limits of the take-off or landing corridor K may be determined with the help of the simple rule mentioned above. According to this rule, the aircraft A is in the opposite direction from the take-off or landing corridor K in relation to some common direction wherein all the projections 5, II and 31 of the beams 4, 9 and 30 extend. When, for example, all projections in the tIV square are directed upward and to the left, this means that the aircraft A is downward and to the right of the estimated path W.

The symbol (FIG. 22) formed by the three beams 4, 9 and 30 has a configuration asymmetric with respect to the horizontal which makes determination of the "up-/down" direction easier because each embodiment provides for a particular arrangement of the beam 30 with respect to the glide slope plane D. In the embodiment of FIG. 21, this beam is always below the glide slope plane G and the projection 31 of the beam 30 is always below the projections 5 and II.

There is another embodiment of the take-off and landing system (FIG. 23), comprising four sources of electromagnetic radiation, two of them I and 8 forming the main pair of sources and are installed on either side of a center line SS of a take-off and landing platform 3, whereas two others 29 and 33 are installed on the center line SS on either side of a glide slope plane G. Beams 4 and 9 of the sources I and 8 of electromagnetic radiation are oriented in the glide slope plane G and indicate that plane, whereas beams 30 and 34 of the sources 29 and 33 are oriented in a course plane C and indicate the course of the estimated take-off or landing path W.

The beams 4 and 9 limit a take-off or landing corridor K from the sides and the beams 30 and 34 limit it from below and from above, respectively. As has been mentioned before, the sources I and 8 may be positioned both on a flight platform 2 and on the take-off and landing platform 3. FIG. 23 illustrates the position of these sources I and 8 on side boundaries 10 and 10' of the take-off and landing platform 3.

The specified symbol configuration produced by projections of the beams 1, 8, 30 and 34 of electromagnetic radiation looks like two horizontal and two vertical lines running into one another and may be easily obtained by superimposing the specified symbol configuration of FIG. 9 over that of FIG. 12 (cI squares). On the whole, the symbol looks like the sign "+". Distortions of the specified symbol configuration may be easily obtained by superimposing respective squares of FIGS. 9 and 12. Because of its simpliciry, the table of distortions of the specified symbol configuration for this embodiment of the take-off and landing system (FIG. 23) is not shown.

Figure 15:
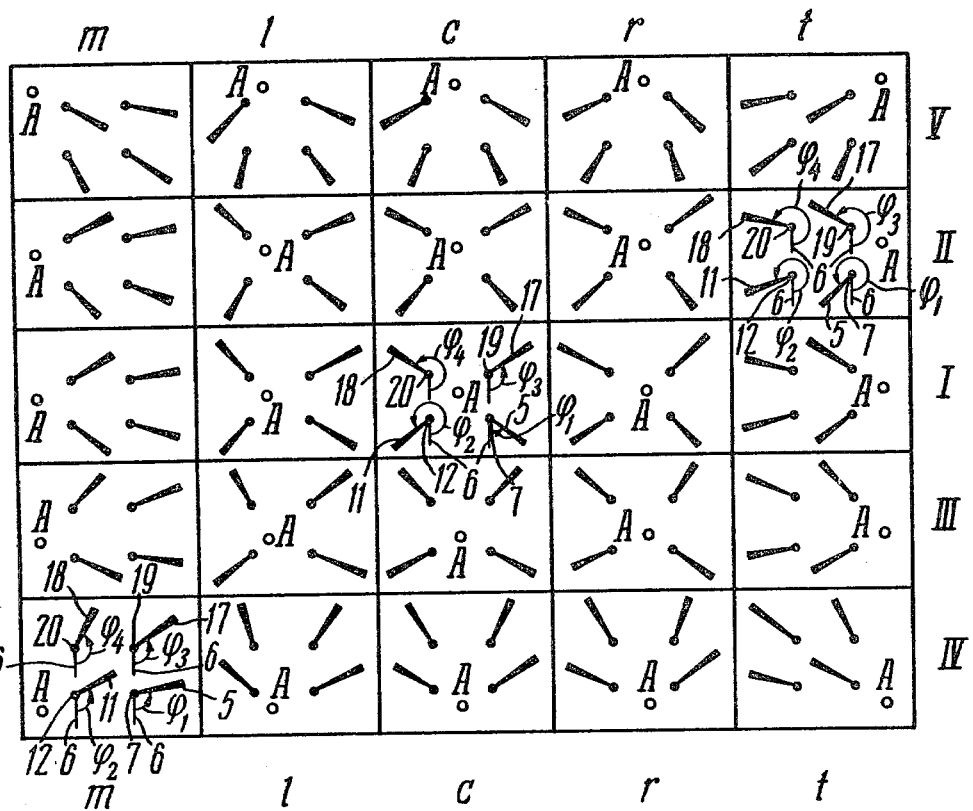
FIG. 15 is a table of distortions of a specified configuration of the symbol produced by the beams of the sources of electromagnetic radiation of the take-off and landing system of FIGS. 13 and 14 for various aircraft attitudes in relation to an estimated take-off or landing path, in accordance with the invention.

The above described embodiments of the proposed take-off and landing system comprise sources of electromagnetic radiation functionally constituting a course and glide slope group. The beams of these sources of electromagnetic radiation produce a symbol of a specified configuration and form a take-off or landing corridor wherein a take-off or landing path lies. The distortions of the specified symbol configuration indicate that an aircraft deviates from the course and glide slope of the estimated take-off or landing path, as well as is outside the limits of the take-off or landing corridor. Being outside the corridor is determined by predominant orientation of electromagnetic beam projections in some common direction, which measn that the aircraft is in the opposite direction from the take-off or landing corridor (FIGS. 15, 18, 22).

Besides, this symbol formed by electromagnetic beams permits detection of the aircraft's bank and determination of its magnitude. The bank of an aircraft may be determined by that the symbol turns as an entity, without distortion of its configuration, about an axis passing through the point A which is the location of the aircraft (FIGS. 12, 15, 18 and 22). The symbol turns in the direction opposite to the aircraft bank.

Moreover, in fact the symbol remains stationary: it is the aircraft that banks, but it is percepted on board the aircraft as a turn of the symbol.

The bank is much more easily and vividly perceived when the specified symbol configuration has horizontal projections indicating the line of horizon (FIGS. 12, 18, 22).

It should be pointed out that no localizer and glide slope transmitter system employed currently in the world, including the Instrument Landing System, incorporates this feature and, because of its design features, provides no information as to aircraft's bank. To determine the bank of an aircraft, the pilot has to consult instruments, the gyro horizon in particular.

The take-off or landing corridor produced by the beams of the sources of electromagnetic radiation of the course and glide slope group perform one more vital function substantially facilitating the process of flying an aircraft. This resides in the fact that the take-off or landing corridor as though prolongs the take-off and landing platform, permitting the pilot to control the attitude of the aircraft with respect to the take-off or landing corridor so that it satisfies the conditions of maximum safety. This is very easily done if the system is made up of collimated pencil beams of electromagnetic radiation within the optical band. In this case, the pilot is able to see the boundaries of the take-off or landing corridor due to stereoscopic vision effects. The beams visible in space play the part of approach and lead-in lights usually positioned on the ground as an extension of a runway, but play it more effectively since they are situated in space. This peculiarity of the take-off or landing corridor is of particular value for aircraft landing on a carrier deck, which is to be dealt in detail later, since in this case no analogy to ground approach and lead-in lights can be drawn.

The forementioned embodiments of the proposed take-off and landing system cannot by far exhaust the variety of possible alternatives. The described sources of electromagnetic radiation positioned on a take-off and landing platform may be supplemented by any number of sources required for creating more complex symbols and more strict limiting of a take-off or landing corridor.

The proposed take-off and landing system has other embodiments wherein the side boundaries and the center line of the take-off and landing platform are indicated by the beams of the sources of electromagnetic radiation installed on the side boundaries and the center line of this platform specifically for this purpose. These sources form the landing lights group and serve to orient an aircraft with respect to the side boundaries and the center line of the take-off and landing platform at the last stage of landing, immediately before touchdown, during the landing run, as well as during the take-off run, and in the course of climbing.

The description of take-off and landing systems equipped with additional sources of electromagnetic radiation constituting the landing group will omit the sources constituting the course and glide slope group to avoid encumbering the figures.

If the proposed take-off and landing system (FIG. 24) comprises one pair of additional sources of electromagnetic radiation, these sources 35 are installed on a flight platform 2 in the immediate vicinity of the end of a take-off and landing platform 3 on either side of its center line SS on the extension of side boundaries 10 and 10' of this platform 3. Beams 36 of the sources 35 of electromagnetic radiation are directed parallel to the surface of the take-off and landing platform 3 along the side boundaries 10 and 10' of this platform 3.

The beam 36 of the sources 35 should be directed so that they are level with the receiver of electromagnetic radiation carried by an aircraft or level with the pilot's eyes. If the wavelength of electromagnetic radiation employed to produce the beams 36 lies in the invisible band, the symbol formed by these beams 36 is detected only by special receivers aboard the aircraft, and the system becomes purely instrumental. If, however, the wavelength is selected within the visible band of the electromagnetic radiation spectrum, the beams 36 can be perceived visually. It should not be ignored, however, that radiation in the visible band can be detected by instrumental means, that is the system may be made as both visual and instrumental.

The specified symbol configuration (FIG. 25), when an aircraft A is on the surface of the take-off and landing platform 3 is presented, as before, in the cI square and is formed by projections 37 of the electromagnetic beams 36 looking like two horizontal lines at an angle of 90° to the vertical 6.

Unlike in previous descriptions, "I" stands for the position of the aircraft A on the surface of the take-off and landing platform 3 (FIG. 24) and "II" designates its position above the surface of the take-off and landing platform 3.

When an aircraft is to the right (rI square) or left (lI square) of the center line SS of the take-off and landing platform 3, the specified symbol configuration is not distorted.

If an aircraft takes off or lands and is above the surface of the take-off and landing platform 3, still staying in the course plane C, the specified symbol configuration is distorted but remains symmetrical about the vertical 6 (cII square).

If the aircraft A is at the same time to the left or right of the course plane C, the symmetry of the symbol configuration is also upset. The fact that the aircraft A is outside the boundaries 10 or 10' of the take-off and landing platform 3 may be determined by a common orientation of the projections 37 originating at arbitrary points 38 (tII and mII squares). Such orientation of the projections 37 is characteristic of deviations of the aircraft A in a direction opposite to the common direction of these projections 37.

In principle, another arrangement of the sources 35 of electromagnetic radiation is possible, e.g. at the beginning of a take-off and landing platform. In this case, an aircraft moves along the beam 36 and not toward the beam 36, as in FIG. 24.

Another embodiment (FIG. 26) of the take-off and landing platform 3 designation comprises an additional source 39 on a flight platform 2 in the immediate vicinity of the end of the take-off and landing platform 3 on its conter line SS. A beam 40 of the source 39 is directed parallel to the surface of the take-off and landing platform 3, lies in a course plane C and indicates the conter line SS of this platform 3.

The distortions of the specified configuration of the symbol produced by a projection 41 of the electromagnetic beam 40 originating at an arbitrary point 42 are illustrated in FIG. 27. It is simple and graphic and needs no detailed description. It should be noted, however, that, if the beam 40 of the source 39 is below the level of an airborne receiver of electromagnetic radiation or of the pilot's eyes, the symbol produced by the beam 40 when the aircraft A is on the surface of the take-off and landing platform 3 on its center line SS and looks like in the cII square.

One more embodiment of the take-off and landing system (FIG. 28) comprises three sources of electromagnetic radiation, constituting the landing lights group, two (35) of these sources being installed on a flight platform 2 in the immediate vicinity of the end of a take-off and landing platform 3 on either side of its center line SS on its side boundaries 10 and 10', whereas the third source (39) is positioned on the flight platform 2 in the immediate vicinity of the end of the take-off and landing platform 3 on its center line SS. Beams 36 and 40 of these sources 35 and 39 are directed parallel to the surface of the take-off and landing platform 3. The beams 36 of the sources 35 are directed along the side boundaries 10 and 10' of the take-off and landing platform 3, whereas the beam 40 of the source 39 is directed along the center line SS of this platform 3.

The symbol produced by the beams 36 and 40 is presented in FIG. 29. It is simple and easy to memorize and is a combination of the two symbols of FIGS. 25 and 27.

In some cases, the purposes of additional designation of the take-off and landing platform boundaries may require installation of any number of sources of electromagnetic radiation along its sides. This may be due to uneven surface of a take-off and landing platform or a plurality of taxiways on a ground airfield. In such cases, the beams of sources of electromagnetic radiation serve as additional indications of the boundaries of the take-off and landing platform. If, for example, the surface of a take-off and landing platform rises smoothly at first, then lowers somewhere from the middle, and the end of the platform cannot be seen from its beginning, an additional pair of sources of electromagnetic radiation is installed on its side boundaries at the highest point, their beams serving as additional indicators of the side boundaries of the take-off and landing platform.

It should be emphasized that the described group of sources of electromagnetic radiation, constituting the landing lights group, may be installed in combination with any of the forementioned take-off and landing systems illustrated, for example, in FIGS. 1, 2, 4, 5, 6, 8, 10, 11, 13, 14, 16, 17, 19, 20, 21, 23.

The beams of the sources of electromagnetic radiation, constituting the landing lights group, produce a symbol similar to the one produced by the beams of the sources constituting the course and glide slope group. This makes piloting of an aircraft using a take-off and landing system much easier, when the proposed take-off and landing system is made as visual, and simplifies designing airborne receivers, when this system is made as instrumental, permitting development of uncomplicated and reliable automatic equipment for operation at all stages of the aircraft take-off and landing. Besides, the above-described take-off and landing system remains the same both for take-off and landing of an aircraft.

The proposed take-off and landing system, as has already been mentioned before, may comprise one more group of sources of electromagnetic radiation, constituting a group of marker sources, intersections of their beams being indications of various marker points, e.g. the flare initiation point or the point designating an assigned distance to the take-off and landing platform. Such an addigned distance may be the distance to one of the homing stations, e.g. the inner, middle or outer marker locators.

Similarly to the description of take-off and landing systems comprising the landing lights group, the figures show only the sources with beams indicating marker points to avoid encumbering the drawings.

A pair of additional sources 43 (FIG. 30) is installed on a flight platform 2 and their beams 44 are directed so as to intersect at an assigned distance in spece and form a marker point 45.

This point 45 may be situated both in a course plane C and near this plane, as well as on an estimated take-off or landing path W.

An embodiment featuring a symmetrical location of these sources 43 is illustrated in FIG. 31. The marker point 45 in this case designates the assigned distance to a homing station 46 and is positioned a bit lower than the estimated take-off or landing path W in the course plane C.

The specified exmbol produced by projections of the beams 44 of the sources 43 of electromagnetic radiation may have two different configurations. If the sources 43 are situtated below the glide slope plane G (FIG. 31) and their beams 44 do not intersect this plane G, the specified symbol configuration presented in FIG. 32 in the square designated as VII is formed by two projections 47 of the beams 44 originating at arbitrary points 48 and directed vertically downward.

The following notations are used in FIG. 32.

VI—the aircraft is beyond the distance to the marker point 45 indicating the assigned distance, e.g. the flare initiation point of the aircraft A or the point designating one of the homing stations;

VII—the aircraft is at the assigned distance from the take-off and landing platform, corresponding to the flare initiation or to the moment the aircraft is overhead one of the homing stations;

VIII—the aircraft is closer to the runway than the marker point.

If the aircraft A is beyond the distance to the marker point 45, the distortion of the symbol configuration looks like that in the VI square of FIG. 32. The projections 47 of the beams 44 intersect.

If the aircraft A is closer to the take-off and landing platform than the marker point 45, the projections 47 diverge without intersecting (the VIII square of FIG. 32).

In case the beams 14 of the sources 43 intersect the glide slope G, the specified symbol configuration (FIG. 33) is different (VII square). In this case, the symbol is formed by the two projections 47 of the beams 44 originating at the arbitrary points 48 and directed horizontally toward each other. If the proposed take-off and landing system is made as a visual one, the pilot can notice the moment of passing the marker point by a short flash.

The distortion of the specified symbol configuration, when the aircraft A is farther or closer to the take-off and landing platform than the marker point 45, is given in VI and VIII squares.

If the system uses electromagnetic radiation in the visual band, the pilot is able to see the intersection point in space and judge by the distortion of the symbol about the distance to this point, which considerably simplifies piloting the aircraft.

The symbol produced by the beams of the marker group sources is similar to that produced by the beams of the sources of electromagnetic radiation of the forementioned qroups. And when the system is made instrumental, the same aircraft equipment may be employed to detect the symbol. It simplifies the process of automatic landing and is an important advantage of the proposed system over the existing ones.

The group of marker sources of electromagnetic radiation permits designation of various marker points, which cannot be designated by any other means, e.g. in inaccessible mountainous regions and over the sea surface in the case of landing on a carrier deck.

Marker points are as a rule employed for aircraft landing, but may be also used for distance monitoring during take-off.

A group of marker sources may be installed in combination with any one of the forementioned take-off and landing systems, comprising the course and glide slope group and the landing lights group.

FIG. 34 illustrates by way of example an embodiment of the take-off and landing system, comprising all three groups of sources of electromagnetic radiation, in particular, the course and glide slope group of FIG. 21, the landing lights group of FIG. 24 and the merker group of FIG. 31. FIG. 34 shows two marker points 45.

One of them, which is nearer to the take-off and landing platform is the flare initiation point, and the other point 45 designates the assigned distance to the homing station 46. All these groups of sources and the symbol produced by the beams of each of the groups are described in detail earlier. The symbol produced by the beams of the sources of electromagnetic radiation positioned as in FIG. 34 is the totality of the symbols produced by the beams of each group of sources independently.

If the take-off and landing system is made visual, that is electromagnetic radiation in the visual band is used, the beams of the sources making up different groups may be of different color.

Thus, for example, the beams 4 and 9 (FIG. 34) may be red and helium-neon lasers are used as the sources I and 8 of electromagnetic radiation, the beam 30 is green, its source being an argon laser. Finally, the beams 36 may be dark red, their sources 35 being krypton lasers, and the beams 44 designating the marker points 45 are orange or yellow, their sources 43 being lasers generating in the orange or yellow region. For simplicity, however, all beams with be assumed to be of one color, e.g. red or orange, produced by one type of lasers used as sources of electromagnetic radiation.

To increase the renge of the system in dense fog, all or some beams may be produced by a combination of several wavelengths of electromagnetic radiation. For example, the beams 4, 9 and 30 (FIG. 34) may be formed by combining electromagnetic radiation of the visible and infrared ranges. In this case, the infrared radiation forms a channel in the fog and creates conditions for passing visible radiation, ensuring introduction of more rigid take-off and landing minima.

The use of aircraft receivers operating in the visible band of electromagnetic radiation permits displaying the distortion of the specified symbol configuration on an instrument installed in the pilot's cockpit, as well as making up automatic equipment. In this case, the system becomes instrumental and remains visual at the same time.

The visual embodiment of the proposed take-off and landing system. However, when no equipment is installed aboard the aircraft, is still a reliable instrumental means ensuring manual take-off and landing. The instrument ensuring high accuracy of determination of the aircraft's position in space with respect to the estimated take-off or landing path W is the symbol produced in space by visible electromagnetic beams. The proposed take-off and landing system possesses a very high degree of accuracy in determination of aircraft's deviations from the estimated take-off or landing path surpassing the accuracy of currently employed radio localizer and glide slope transmitter systems in some cases by as many as a hundred or even thousand times. The degree of distortion of the specified symbol configuration permits determination of aircraft deviations from the assigned take-off or landing path W within the range of several centimeters.

That is why even the visual embodiment of the proposed take-off and landing system may be regarded as an instrumental means of a very high degree of accuracy. It should be once more emphasized that no equipment is in this case installed in the aircraft.

There are two embodiments of positioning the sources of electromagnetic radiation, constituting the course and glide slope group in accordance with the proposed take-off and landing system, on a flight platform. In a take-off version of the system, the sources are placed near the aircraft lift-off point and, in its landing version, these sources are positioned in the immediate vicinity of the beginning of a take-off and landing platform. As has been mentioned above, in all the foregoing figures, the arrow L indicates the direction of landing of the aircraft A and the arrow F indicates the direction of its take-off. None of these fifures point the exact location of sources on the center line SS of the take-off and landing platform, but it should be kept in mind that, in the take-off version, they are to be located in near the lift-off point and, in the landing version, in the beginning of the take-off and landing platform.

The take-off version of the proposed take-off and landing system is illustrated in FIG. 35, wherein letter V denotes the lift-off point of the aircraft A. Letter W, in this case, designates an estimated take-off path, K stands for a take-off corridor. The glide slope plane G is in this case the take-off path plane.

Beams 4, 9, 30 of sources I, 8 and 29 of electromagnetic radiation indicate the course and glide slope of the estimater take-off path W.

The landing version of the proposed take-off and landing system is illustrated in FIG. 34 described above. The beams 4, 9 and 30, in this case, indicate the course and glide slope of a landing path W and a corridor K formed by these beams is the landing corridor.

To cut down the landing distance and reduce noise in the airfield area during aircraft landings, as well as to ensure landing of VTOL aircraft and helicopters, the estimates landing path may be made as a broken line comprising separate legs inclined differently in relation to the horizon. The glide slope planes, indicated by the beams of the sources of electromagnetic radiation, of each leg of the landing path are respectively directed at different angles to the horizon. Such a path, for example, may have one bend.

For simplicity, FIG. 36 shows an example of an embodiment of the take-off and landing system ensuring aircraft landing along a concave estimated landing path with one bend. Three sources I, 8 and 29 of electromagnetic radiation are installed on a flight platform 2 in the immediate vicinity of the beginning of the take-off and landing platform 3, and three auxiliary sources I', 8' and 29' are situated before the take-off and landing platform. The auxiliary sources I', 8' and 29' are positioned, in this example, like the sources 1, 8 and 29.

To avoid encumbering the figure, it shows the sources of electromagnetic radiation forming the course and glide slope group only.

Beams 4 and 9 of the sources I and 8 of electromagnetic radiation are oriented in a glide slope plane G, whereas beams 4' and 9' of the sources I' and 8' are oriented in another glide slope plane $G_4$, this plane $G_4$ being tilted at a greater angle in comparison with the plane G. The planes $G_4$ and G of glide slopes intersect. The estimated landing path is the line of intersection of the glide slope planes G and $G_4$ and a course plane C. This path consists of two legs, the leg $W_2$ being inclined at a greater angle to the surface of the take-off and landing platform 3 and the leg $W_1$ inclined at a smaller angle to the surface of the take-off and landing platform 3.

The specified symbol configuration produced by projections of beams 4, 9 and 30 and 4', 9' and 30', as well as distortions of this specified configuration for various deviations of the aircraft from the estimated landing path at its both legs $W_2$ and $W_1$ are given in FIG. 22.

It should be remembered that the auxiliary sources of electromagnetic radiation installed on a flight platform before the take-off and landing platform may be arranged differently, unlike to sources placed in the immediate vicinity of the beginning of the take-off and landing platform. Moreover, the number of these sources may be different. For example, the sources of electromagnetic radiation positioned in the immediate vicinity of the beginning of the take-off and landing platform may be arranged as in FIGS. 5, 15 or 20, whereas the auxiliary sources positioned before the take-off and landing platform may be arranged as in FIGS. 2, 11, 17 or 21. In this case, the pecified symbol configuration changes when the aircraft passes from one leg of the path ot another.

The proposed take-off and landing system in any one of its various embodiments may be installed on flight platforms of various ground airfields, water surface or ship landing decks. Depending on the functional requirements set to a take-off and landing system installed on a take-off and landing platform being a ship landing deck, one or several sources of electromagnetic radiation are placed so that their beams produce a symbol and indicate the course and glide slope of an estimated take-off or landing path and carry additional information as to the deck's motions not only at the points of their installation but as a whole. The principles of symbol production and determination of an aircraft's position with respect to an estimated take-off or landing path by the distortion of this symbol configuration have been dealt with in detail hereinabove.

The figures given below show only those sources which form the course and glide slope group to avoid encumbering the drawings, and explanations are supplied pertaining to the additional information on ship deck motions carried by the beams of the sources of electromagnetic radiation comprising the course and glide slope group. Only at the end, there is a detailed description of an embodiment of the take-off and landing system installed on the landing deck of a ship.

Here, chief emphasis is laid on the performance of landing on a ship landing deck, since this process is the most complicated and critical.

If the take-off and landing system is made as in FIG. 2, a source I of electromagnetic radiation (FIG. 37) is installed on a center line SS of a landing deck 3 of a ship 49, in the immediate vicinity of an estimated touchdown zone 50 of an aircraft A on the surface of the deck 3. A beam 4 of the source I indicates motions of the deck in the touchdown zone 50 resulting from rolling and pitching, yawing and up-and-down motions of the ship 49 caused by the rough sea. If the source I is installed on a gyro-stabilized platform 51, angular motions of the beam 4 caused by angular motions of the hull of the ship 49 and its deck 3 resulting from rolling, pitching and yawing are eliminated, but not the linear motions of the beam 4 caused by those motions of the hull of the ship 49 and its up-and-down motion on waves. Since such motions are the most dangerous in the process of landing of the aircraft A on the deck 3, due to changes in the position of the estimated landing path W they cause, availability of information free of redundant data is a great assistance in piloting the aircraft A during landing with higher safety.

The information on linear motions of the surface of the landing deck 3 of the ship 49 in the immediate vicinity of the estimated touchdown zone 50 of the aircraft A are perceived by the distortions of the specified configuration of the symbol. The estimated landing path W and the beam 4 change their position with respect to the aircraft A due to linear motions of the landing deck 3, which may be regarded as a change in position of the aircraft A with respect to the estimated landing path W when it is stationary. In this case, the specified symbol configuration illustrated in FIG. 3 for this embodiment of the proposed system, is distorted through deviations of the aircraft A from the estimated path W and through the change in position of the path W in space. The distortion of the specified symbol configuration is an indication of the magnitude and direction of deviations of the aircraft A from the estimated path, as well as of the direction of correction of its current flight path. The motions of the deck 3 of the ship 49 are periodic oscillations with a period of several seconds and can be detected by periodic distortions of the symbol configuration, which facilitates the process of landing, particularly at the last stage, immediately before the aircraft A touches the deck 3.

The proposed take-off and landing system positioned on a take-off and landing platform being the landing deck 3 of the ship 49 (FIG. 38) may have other embodiments, e.g. the one presented in FIG. 8. In this case, a first source I of electromagnetic radiation is installed on a center line SS of the landing deck 3 of the ship 49 in the immediate vicinity of an estimated touchdown zone 50 on the surface of the deck 3. A second source 8 is placed on a stern edge 52 of the landing deck 3. A beam 4 of the source I indicates the motions of the landing deck 3 in the touchdown zone 50, whereas a beam of the source 8 indicates the motions of the stern edge 52 of the landing deck 3. The causes of these motions have been dealt with in detail above. It should be pointed out that the magnitude of motions of the stern edge 52 is significantly greater as compared to the magnitude of those of the deck 3 in the immediate vicinity of the touchdown zone 50, because the stern edge 52 is considerably farther from the center of gravity of the ship 49. It is common knowledge that angular motions take place around the center of gravity of a system, in particular, a ship.

In the course of landing, the aircraft A flies overhead the stern edge 52 of the landing deck 3, and, for safety reasons, it is necessary to know how the stern edge 52 moves. Besides, the beams 4 and 9 of the sources I and 8, while moving together in space, serve as an indication of the inclination of the landing deck 3 along its center line SS, that is an indication of longitudinal angular motions of this deck 3.

The sources I and 8 may be installed on gyro-stabilized platform 51 eliminating angular motions of the beams 4 and 9 in space.

Information on linear motions of the surface of the landing deck 3 of the ship 49 in the immediate vicinity of the touchdown zone 50 on the deck 3, as well as its stern edge 52, is perceived aboard the aircraft A by distortions of the specified symbol configuration. Distortions of the specified symbol configuration of FIG. 9 permit determination of the magnitude and direction of deviations of the aircraft A from the estimated take-off or landing path moving, as has been already mentioned above, in space.

In this case, a projection II of the beam 9 changes its position within the structure of the symbol configuration more than a projection 5 of the beam 4. It is this change that characterizes the motions of the stern edge 52. Besides, distortions of the symbol configuration are indicative of the displacement of a landing corridor K in space. The position of the aircraft A with respect to the estimated path W and landing corridor K is determined exactly as has been described earlier.

The proposed take-off and landing system installed on the deck 3 of the ship 49 (FIG. 39) may be arranged as in the embodiment of FIG. II. In this case the sources I and 8 of electromagnetic radiation constitute the main pair and are positioned on the opposite side boundaries 10 and 10' of the landing deck 3 in the immediate vicinity of the touchdown zone 50 of the aircraft A on the landing deck 3. The beams 4 and 9 of these sources I and 8 are oriented, as has been mentioned before, in the common glide slope plane G. They indicate the course and glide slope of the estimated landing path W and, in addition, motions of the landing deck 3 in the touchdown zone 50.

Motions of the landing deck 3, caused by instability of the ship 49 on the rough surface of the sea, cause motions of the sources I and 8 installed on the deck 3. As has been mentioned before, if the sources I and 8 are mounted on the gyro-stabilized platform 51, angular motions of these sources I and 8 and the beams 4 and 9 are eliminated, but linear motions of these sources I and 8 equal to those of the landing deck 3 in the places of their location continue. Linear motion of the sources I and 8 result in linear displacements in space of the beams 4 and 9 produced by these sources. Considering that the source 8 positioned on the outer side boundary 10' of the landing deck 3 is farther from the ship's center of gravity than the source I, linear motions of this source 8 caused by rolling of the ship are greater than those of the source I. Consequently, displacement of the beam 9 in space is greater than that of the beam 4. FIG. 39 shows the displacement of the beam 9 by a dotted line and an arbitrary zone 53 wherein the beam 9 moves remaining parallel to itself. Similarly shown is an arbitrary zone 54, wherein the beam 4 of the source I of electromagnetic radiation also moves remaining parallel to itself. Parallelism of movements of the beams 4 and 9 in space is due to gyro-stabilization. Since the beams 4 and 9 indicate the glide slope plane, displacement of these beams in space indicates displacement of the glide slope plane and, in particular, its angular displacement being indicative of the heel of the landing deck 3 at the points of location of the sources I and 8. The table of distortions of the specified symbol configuration for this embodiment (FIG. 39) with the sources I and 8 of electromagnetic radiation is illustrated in FIG. 12.

As has already been mentioned above, the motions of the landing deck 3 (FIG. 39) result, ultimately, in displacement of the estimated landing path W in space. Changes in position of the aircraft A with respect to the estimated landing path W causes distortions of the specified symbol configuration indicative of the magnitude and direction of deviations of the aircraft A with respect to the estimated landing path W. Considering that the heeling of the landing deck 3 brings about different linear motions of the sources I and 8, the symbol produced by the beams 4 and 9 of these sources I and 8 turns angularly as a whole. Such turns of the symbol are indications of the heel of the landing deck 3 in the immediate vicinity of the touchdown zone of the aircraft A on the landing deck 3 and its magnitude.

Other embodiments of the proposed take-off and landing system may be installed on a take-off and landing platform being the landing deck of a ship, e.g. the embodiment of FIG. 14. In this case, the sources of electromagnetic radiation constituting the main pair are positioned on the opposite boundaries of the landing deck in the immediate vicinity of the aircraft touch down zone on the landing deck, whereas two other sources constituting the second pair are also positioned on the opposite boundaries of the landing deck between the stern edge and the main pair of sources. The beams of the sources of electromagnetic radiation of the second pair indicate the near limit of the aircraft touchdown zone on the landing deck. This embodiment is not shown because of its simplicity, the arrangement of the sources being easily understtod from FIG. 14.

It should be pointed out that FIG. 14 illustrates an example of arrangement of the sources of electromagnetic radiation, wherein the second pair of sources is positioned behind the main pair. In contrast, their position on a ship landing deck should be reversed. Distortions of the symbol configuration caused by deviations of an aircraft from an estimated landing path are similar to those of FIG. 15. Besides, as has been described above, angular turns of the symbol as a whole are indicative of the heel of the landing deck. Considering that the second pair of sources is farther from the ship's center of gravity than the main one, the displacement of the beams of this pair in space has a different amplitude as compared to that of the beams of the main pair. This causes distortions of the symbol. As has already been mentioned above, motions of a landing deck are in fact periodic oscillations with a frequency of several seconds, that is why the specified symbol configurations is also distorted with a certain periodicity, which is representative of the motions of a ship landing deck.

Another embodiment (FIG. 40) of the proposed take-off and landing system installed on the landing deck 3 of the ship 49 comprises sources of electromagnetic radiation arranged as in FIG. 17. In this case, the sources I and 8 of electromagnetic radiation constituting the main pair are positioned on the opposite boundaries 10 and 10' of the landing deck 3 in the immediate vicinity of the touchdown zone 50 of the aircraft A on the landing deck 3. The sources 13 and 14 constituting the second pair are also positioned on the side boundaries 10 and 10' of the landing deck 3 between the stern edge 52 and the main pair of sources I and 8, and, finally, the sources 21 and 22 constituting the third pair of sources are positioned on the side boundaries 10 and 10' of the landing deck 3, like the sources of the first and second pairs, on the other side of the sources I and 8 of the main pair in relation to the sources 13 and 14. The beams 15 and 16 of the sources 13 and 14 of electromagnetic radiation indicate the near limit of the touchdown zone 50 and the beams 23 and 24 of the sources 21 and 22 indicate the far limit of the touchdown zone 50 of the aircraft A on the landing deck 3.

Referring to FIG. 17, the embodiment of the take-off and landing system is different from that of FIG. 40 in the arrangement of the sources, the positions of the sources 13 and 14 being interchanged with those of the sources 21 and 22.

Motions of the landing deck 3, caused by instability of the ship 49 on the rough surface of the sea, bring about motion of all sources mounted on the deck 3. In this case, if all sources are mounted on the gyro-stabilized platforms 51, each pair of beams, e.g. the beams 4 and 9 of the sources I and 8, carry the information on the heel of the landing deck 3, as described above.

Since all the sources of electromagnetic radiation are positioned at different distances from the center of gravity of the ship 49, the sources 13, 1 and 21 being placed along the side boundary 10 of the landing deck 3 and the sources 14, 8 and 22 being placed along the opposite side boundary 10', the beams 15, 4, 23 and 16, 9, 24 of each group of three sources indicate longitudinal angular motions of the side boundaries 10 and 10' and all together indicate the longitudinal angular motions of the landing deck 3. A similar arrangement has been mentioned above, when the embodiment of FIG. 38, comprising two sources of electromagnetic radiation on a landing deck of a ship, was described.

The table of distortions of the specified symbol configuration for the embodiment of FIG. 40 is given in FIG. 18 and was described in detail above. Motions of the landing deck and the sources of electromagnetic radiation installed thereupon cause periodic distortions of the specified symbol configuration indicative of the heel and longitudinal angular motions of the ship landing deck.

One more embodiment (FIG. 41) of the proposed take-off and landing system installed on the landing deck 3 of the ship 49 comprises sources of electromagnetic radiation arranged as in FIG. 21.

The sources I and 8 of electromagnetic radiation are positioned on the opposite boundaries 10 and 10' of the landing deck 3 in the immediate vicinity of the touchdown zone 50 of the aircraft A on the landing deck 3 exactly as illustrated in FIG. 39 and described above. The third source 29 is placed on the stern edge 52 of the landing deck 3 on its center line SS, its beam 30 being directed in the course plane C. The sources 1, 8 and 29 may be mounted on the gyro-stabilized platforms 51.

The beams 4 and 9 of the sources 1 and 8 of electromagnetic radiation carry additional information about the heel of the landing deck 3, as described above, whereas the beam 30 of the source 29 indicates up-and-down motions of the stern edge 52 of the landing deck 3 and, in combination with the beams 4 and 9 of the sources 1 and 8, indicates longitudinal angular motions of the landing deck 3.

These motions are perceived aboard the aircraft A as periodic distortions of the specified symbol configuration illustrated for this arrangement of the sources 1, 8 and 29 in FIG. 22 and described in detail above.

Referring now to FIG. 42, an embodiment of the proposed take-off and landing system comprises the sources of the course and glide slope group, landing lights group and marker group. The sources 1, 8 and 29 constituting the course and glide slope group are positioned exactly as shown in FIG. 41, their beams 4, 9 and 30 carrying the same information as described in detail above, that is indicating the deviations of the aircraft A from the estimated take-off or landing path W. These sources are mounted on the gyro-stabilized platforms 51.

The sources 35 and 39 constituting the landing lights group are positioned at the end of the landing deck 3 opposite to its stern edge 52. The beams 36 of the source 35 are directed along the side boundaries 10 and 10' of the landing deck 3 and indicate these boundaries, whereas the beam 40 of the source 39 is directed along the center line SS of the landing deck 3 and indicates this center line. All requirements to installation of these sources 35 and 39, as well as to orientation of their beams 36 and 40, are given in detail above. The sources 35 and 39 are mounted directly on the landing deck without gyro-stabilized platforms. In this case, their beams 36 and 40 remain stationary in relation to the landing deck 3 and indicate all motions of this landing deck 3.

These motions of the landing deck 3 are perceived aboard the landing aircraft as distortions of the specified symbol configuration illustrated in FIG. 29. The periodicity of these distortions is an indication of the motions of the landing deck 3, its heel and longitudinal angular motions, as described above.

The sources 43 constituting the marker group are installed on the side boundaries 10 and 10' of the landing deck 3. In the illustrated example, two of them (43) are placed in the immediate vicinity of the sources I and 8, and their beams 44 intersect and indicate the flare initiation point 45. Two other sources 43 are positioned, in particular, on the stern edge 52 of the landing deck 3. Their beams 44 intersect and indicate the point 45 designating the assigned distance to the stern edge 52 which is the beginning of the landing deck 3. In this case, the point 45 produced by the beams 44 of the sources 43 positioned on the stern edge 52 of the landing deck 3 is farther from the stern edge of the landing deck than the flare initiation point 45 produced by the beams 44 of the sources 43 installed in the immediate vicinity of the sources 1 and 8. The sources 43 are also mounted on the gyro-stabilized platforms 51.

The beams of the sources of electromagnetic radiation, taken together, form a symbol composed of three simple symbols produced by the beams of each group of sources, their specified configuration having been described above, as well as the information carried by the distortions of this specified configuration of symbols.

It should be kept in mind that said sources of electromagnetic radiation may be arranged differently, e.g. the sources 43 with the beams 44 indicating, on intersection, the flare initiation point 45 may be positioned both behind and before the sources 1 and 8, specifically, on the stern edge 52. Besides, all the sources constituting the marker group, as well as the sources 1 and 8 of the course and glide slope group, may be installed on deck structures of the ship 49 or directly on the landing deck 3.

It should be once more emphasized that the proposed take-off and landing system solves a number of problems of landing an aircraft on a ship landing deck, which are impossible to solve with the help of traditional principles, and eliminates many a shortcoming inherent in landing systems being currently used.

First of all, as has been mentioned above, the landing corridor, formed by the beams of the sources of electromagnetic radiation, constituting the course and glide slope group, extends the take-off and landing platform, in this case the landing deck of a ship, and flying an aircraft in this corridor increases the landing safety.

If electromagnetic radiation producing the beams being directed extended references is selected in the visible spectrum, the beams become visible and perform the functions of the approach and lead-in lights, which are impossible to install in sea conditions. No currently known system has such potentialities. Besides, visible beams are spatially situated near an aircraft and surround it from all sides, thus increasing the pilot's confidence.

The proposed take-off and landing system features high accuracy and makes it easy to detect motions of a landing deck with an accuracy of several centimeters and, which is particularly important, to see these motions, both angular and linear.

Owing to peculiarities of human vision, the pilot is able to notice not only the motion itself, but the tendency of these motions, too, that is it becomes very easy to predict the next motion, to get ready for these motions and to operate flying controls in advance.

Besides, designation of some points in space, which are marker points, permits a very high degree of accuracy in indicating to the pilot the assigned distance to the beginning of the landing deck, as well as the flare initiation point.

Since approaching a marker point is determined by distortions of the symbol configuration, it is not only the moment of reaching the assigned distance that can be seen, but also the process of approaching a specified marker point. And, finally, if the system is visual, the process of approaching a specified distance can be monitored visually and the pilot can get ready in advance for certain operations, e.g. for initiation of flaring the aircraft immediately before landing.

This effect cannot be provided by any of existing systems, which is another important advantage of the proposed system.

Finally, the unified symbol structure provides a means for easy automation of the landing process as a whole.

Beams of electromagnetic radiation in the above described embodiments of the take-off and landing system indicate the course and glide slope of an estimated take-off or landing path shown for simplicity as a straight line. As has been already mentioned above, the estimated landing path usually is not rectilinear but broken for the sake of shortening landing distance and is composed of several legs. Referring now to FIG. 36, the embodiment of the take-off and landing system possesses such an estimated landing path.

The take-off or landing distance may also be reduced by performing take-off or landing along a curvilinear path. A curvilinear estimated take-off or landing path may be assigned by changing the inclination of the path produced by electromagnetic beams with respecto to the horizon.

Turning now to FIG. 43, the embodiment of the proposed take-off and landing system provides for aircraft take-off or landing along a curvilinear take-off or landing path. The sources 1, 8, 13 and 14 of electromagnetic radiation are installed exactly as in the embodiment of FIG. 14 and provided with a means 55 for turning the beams 4, 9, 15 and 16. Possible extreme positions of the beams 4, 9, 15 and 16 are shown by a dotted line, whereas the solid line indicates an intermediate position of these beams 4, 9, 15 and 16.

The means 55 for turning the beams 4, 9, 15 and 16 can synchronously change the position of these beams in space. In this case, the position of the beams 4 and 9 in the glide slope plane $G_1$ is retained, as well as of the beams 15 and 16 in the plane $G_2$, and these planes $G_1$ and $G_2$ continuously change their inclination with respect to the horizon. The planes $G_1$ and $G_2$ are the steepest when the aircraft A is far away from the take-off and landing platform 3 and the flattest when it is close to the platform 3. Instantaneous position of the estimated take-off or landing path W' at each instant of time coincides with the curvilinear estimated take-off or landing path W. Referring to FIG. 43, the instantaneous position of the estimated take-off or landing path W' is shown by two dot-dash lines.

Any of the known devices may be used as the means 55 for turning a beam, e.g. reflecting surfaces, mirrors, prisms, etc. which change their position and turn the beams tracing the estimated take-off or landing path by indicating its course and glide slope at every instant.

The specified symbol configuration, as well as distortions of this configuration look like those of FIG. 15. Deviations of the aircraft A from the estimated take-off or landing path W are determined by distortions of the specified symbol configuration as described above.

Referring now to FIG. 44, one more embodiment of the proposed take-off and landing system provides for aircraft take-off and landing along a curvilinear path. The sources 1, 8 and 29 are installed exactly as in FIG. 21 and provided with a means 55 for turning the beams 4, 9 and 30. As a result the beams 4 and 9 of the sources 1 and 8 turn retaining their position in the glide slope plane G and indicate at every instant a new position of this plane G. The beam 30 of the source 29 turns in the course plane C. In combination, the beams 1, 8 and 30 indicate at each instant of time the course and glide slope of an aircraft, thus tracing the estimated take-off or landing path W of the air craft A.

The specified symbol configuration, as well as distortions of this configuration look like that in FIG. 22. Deviations of the aircraft A from the estimated take-off or landing path W are determined by distortions of the symbol configurations as described above.

Not only the sources of the course and glide slope group may be provided with means for turning their beams indicating, as described above, at each instant of time the course and glide slope of the aircraft A flight part and tracing the curvilinear estimated take-off or landing path W, but also the second additional sources constituting the marker group too. Such a group of marker sources is shown in FIGS. 30 and 31. The beams 44 of the sources 43 produce, as described above, the intersection point 45, so-called marker point situated in the course plane C at the assigned distance and indicate that distance. If now each of the sources 43 is provided with a beam turning means, the beams 44 start turning and the point 45 designating the assigned distance starts moving in space indicating a different distance at each instant of time. This embodiment of the proposed take-off and landing system is not shown because of its simplicity, but it can be easily understood since only the beam turning means 55 of FIGS. 43 and 44 are added to the above described embodiment of FIGS. 30 and 31. The beams 44 of the sources 43 are turned vertically so that at each instant of time the point 45 is at the same distance from the estimated landing path W in the course plane C. When the estimated landing path W is a straight line, e.g. as shown in FIGS. 21 or 34, the marker point 45 moves in a plane parallel to the glide slope plane G.

The specified symbol configuration produced by the beams 44 of the sources 43 of electromagnetic radiation and distortions of this configuration are described in detail above and illustrated in FIGS. 32 and 33. The turning speed of the beams 44 is preset so that the marker point 45 moves in space at a preset speed equal to the speed of movement of the aircraft A along the estimated landing path W with allowance being made for the wind component.

When the aircraft A moves along the estimated landing path at the preset speed with proper allowance for the wind component and if the glide-slope speed is equal to the speed of movement in space of the marker point 45, the specified symbol configuration produced by the beams 44 remains unaltered during the entire flight of the aircraft A along the estimated path W.

If the speed of movement of the aircraft A along the estimated path W is less than the speed of movement of the point 45 in space, the specified symbol configuration is distorted and looks like that in the VI square of FIGS. 32 or 33.

If the speed of movement of the aircraft A along the estimated path W is greater than the speed of movement of the point 45, the specified symbol configuration becomes like that in the VIII square of the same figures.

The above described way of positioning marker sources in combination with the course and glide slope group of sources, e.g. the system of FIG. 21, permits, as shown in FIG. 34, piloting the aircraft A along the course and glide slope of an estimated landing path by the symbol produced by the beams of the sources of the course and glide slope group and controlling the speed of the aircraft by the symbol produced by the beams of the sources of the marker group.

In this case, the proposed take-off and landing system provides the pilot with a comprehensive information on the spatial attitude of the aircraft and additionally indicates deviations of the speed of the aircraft A from the assigned landing speed with proper allowance for the wind speed, something no modern landing system can provide. This feature of the proposed system permits sharp reduction in the number of instruments required for pilot's orientation, in fact bringing them down to one instrument displaying the information on the distortions of the specified configuration of symbols produced by the beams of the course and glide slope group and the marker sources group. If the system is made visual, the pilot receives visual information by watching the outside space.

Examples of other embodiments of the proposed take-off and landing system ensuring take-off and landing along a curvilinear path can be multiplied.

There are other methods of creating a symbol ensuring the determination of an aircraft's attitude in relation to an estimated take-off or landing path, e.g. symbols which may be called kinematic in contrast to the above described ones which may be called static symbols.

An example of the proposed take-off and landing system producing a kinematic symbol is the embodiment of FIG. 45.

A source I of electromagnetic radiation is positioned similarly to the sources I of Fir. I but is different from it in that the source I of electromagnetic radiation is provided with a means 56 for rotating its beam 4. As a result, this beam 4 describes a predetermined conical surface 57 and produces a symbol looking like a turning straight line. The predetermined conical surface may be closed, like in FIG. 45, or open, when the beam 4 moves backward, or, in some cases, be a plane.

Referring now to FIG. 46, the embodiment of the proposed take-off and landing system comprises the source I positioned as in FIG. 2 and provided with a means 56 for rotating the beam 4. As a result, the beam 4 describes a predetermined conical surface 57. In this embodiment, the predetermined conical surface 57 is closed and shaped as a circular cone. The axis of rotation of the beam 4 at each instant of time coincides with the estimated take-off or landing path W which may be curvilinear in a general case. Referring to FIG. 46, the estimated take-off or landing path W is a straight line.

The rotating beam 4 of electromagnetic radiation, besides, forms the take-off or landing corridor K, wherein the estimated take-off or landing path W lies.

The means 56 for rotating the beam 4 may be various devices, in principle the same as for turning the beam, e.g. reflecting surfaces, mirrors, prisms, etc. which rotate the beam by changing their position, and it describes the conical surface 57.

The means 56 may rotate the beam 4 and also turn it in the vertical plane G so that the axis of rotation at each instant of time coincides with the estimated take-off or landing path W.

The symbol produced by the beam 4 has a specified configuration of a rotating straight line shown in FIG. 47. The specified symbol configuration is given, as before, in the cI square, is produced by the rotating projection 5 of the electromagnetic beam 4, and looks like a straight line rotating at a constant angular speed. Rotation is performed around an arbitrary point 7 coinciding with the point A indicating the location of the aircraft A. Arrow δ shows the sense of rotation of the projection 5 of the beam 4.

Referring to FIG. 47, the same notations are used as in FIG. 3.

If the aircraft A deviates from the estimated take-off or landing path W and is situated to the left of the course, still staying in the glide slope plane G, the symbol configuration is distorted and becomes a straight line rotating at a variable angular speed. These distortions of the symbol configuration can be found in the 1I square (FIG. 47). The angular speed of rotation of the projection 5 around the arbitrary point 7 is minimum, when the beam 4 is at a maximum distance from the aircraft A, and grows as the beam 4 approaches the aircraft A. If the aircraft A goes out of the limits of the take-off or landing corridor K formed by the rotating beam 4, the symbol configuration is distorted to such an extent that the projection of the beam 4 starts making oscillatory motions instead of rotating ones (e.g. the mI square of FIG. 47), remaining in a direction opposite to the deviation of the aircraft A from the estimated take-off or landing path.

The table (FIG. 47) of distortions of the specified symbol configuration vividly demonstrates how the symbol is distorted depending on the direction and degree of deviation of the aircraft A from the estimated take-off or landing path W and requires no detailed description owing to its simplicity.

It is easy to determine the direction and degree of deviation of the aircraft A from the estimated take-off or landing path W and define the direction of correction of a current flight path of the aircraft A by the change of the angular speed of rotation of the projection 5 of the electromagnetic beam 4.

Referring now to FIG. 48, the embodiment of the proposed take-off and landing system producing a rotating symbol is conceived as a take-off system.

The source I of electromagnetic radiation is positioned on the center line SS of the take-off and landing platform 3 and provided with a means 56 for rotating the beam 4. The axis of rotation of the beam 4 at each instant of time coincides with the extimated take-off path W. The source I is placed in the immediate vicinity of the lift-off point V of the aircraft A.

An additional source 39 of electromagnetic radiation is positioned at the end of the take-off and landing platform 3 on its center line SS and also provided with a means 56 for rotating the beam 40. The beam 40 rotates about an axis 58 parallel to the surface of the take-off and landing platform 3, that is parallel to the center line SS. As a result of this rotation, two conical surfaces 57 are formed, one being produced by the beam 4 and the other by the beam 40. These conical surfaces 57 form the take-off corridor K.

Referring to FIG. 49, the embodiment of the proposed take-off and landing system producing a rotating symbol is conceived as a landing system.

The source I of electromagnetic radiation is positioned on the center line at the beginning of the take-off and landing platform 3 and provided with a means 56 for rotating the beam 4. The axis of rotation of the beam 4 at each instant of time coincides with the estimated landing path W. The second additional source 39 is installed at the end of the take-off and landing platform 3 on its center line SS and equipped with a means 56 for rotating of the beam 40. The axis 58 of rotation of the beam 40 is parallel to the center line SS of the take-off and landing platform 3. Two conical surfaces 57 produced by the beams 4 and 40 form the landing corridor K. The specified symbol configuration produced by the projections of each of the beams 4 and 40 of the sources I and 39 of electromagnetic radiation, as well as distortions of this configuration are shown in FIG. 47 and described in detail above. Deviation of the aircraft A from the estimated take-off or landing path W can be determined by the distortions of the specified symbol configuration produced by the projection of the electromagnetic beam 4, whereas deviation of the aircraft A from the center line SS of the take-off and landing platform 3 can be determined by the distortions of the specified symbol configuration produced by the projection of the beam 40 of the source 39 of electromagnetic radiation positioned at the end of the take-off and landing platform 3.

If the proposed take-off and landing system comprises several sources of electromagnetic radiation and these sources are provided with beam rotating means, the conical surfaces formed by the rotating beams may intersect forming an equisignal zone coinciding with the estimated take-off and landing path W.

Referring now to FIG. 50, the embodiment of the take-off and landing system comprises three sources 1, 8 and 29 of electromagnetic radiation arranged as in the embodiment of the take-off and landing system of FIG. 21. All these sources 1, 8 and 29 are provided with means 56 for rotating of the beams 4, 9 and 30 and, as a result, their beams 4, 9 and 30 rotate and form the conical surfaces 57 which intersect and form an equisignal zone 59 (shown by hatching in FIG. 50). The estimated take-off or landing path W lies within the equisignal zone 59.

The take-off and landing system may, in addition to the sources of electromagnetic radiation of FIG. 50 constituting the course and glide slope group, comprise sources constituting the landing lights group, their beams being indications of the center line and boundaries of the take-off and landing platform, as well as the group of marker sources. It is dealt with in detail above. Referring to FIG. 50, these sources of electromagnetic radiation are not shown to avoid overcrowding the figure.

The specified symbol configuration produced by the projections of the beams 4, 9 and 30 is more complicated in comparison to that of FIG. 22 related to the take-off and landing system of FIG. 21.

This symbol configuration, however, is not difficult to imagine, as well as its distortions, by simple superimposition of the symbol configurations of FIGS. 22 and 47. In this case, the projections 5, 11 and 31 (FIG. 22) of the beams 4, 10 and 30 also rotate according to the rules laid down above in the description of the table of distortions of the specified symbol configuration of FIG. 47.

The above-mentioned symbol, conventionally called kinematic, and produced by projections of rotating beams offers the pilot accurate and reliable information on the spatial attitude of the aircraft with respect to an estimated takeoff or landing path. Take-off and landing systems comprising sources of electromagnetic radiation provided with beam rotating means permit development of a simple automatic aircraft take-off and landing system. Their automation is easy because a kinematic symbol carries additional information on deviations of an aircraft from an estimated take-off or landing path. This information is a derivative expressed as variations of the angular speed of rotation of projections of the beams constituting a symbol. If the wavelength of electromagnetic radiation producing the symbol is selected in the optical spectrum, the system becomes also visual. Since electromagnetic beams are pencil beams, they ensure development of a highly accurate take-off and landing system surpassing the accuracy of the known localizer and glide slope transmitter systems hundreds of times.

In case the proposed take-off and landing system comprises complete sets of sources of electromagnetic radiation of all groups, that is the course and glide slope group, the landing lights group and the marker group, the beams of sources of electromagnetic radiation of the course and glide slope group may have a wavelength different from that of the sources of electromagnetic radiation constituting the landing lights group and the sources of the marker group to simplify automatic equipment and to make it more reliable. Multichannel receiving equipment is installed aboard an aircraft, each of the channels being intended for its own group of sources and thus increasing the equipment's immunity to mutual inteferences resulting from the influence of radiation of one group of sources on other groups.

If the selected wavelength of radiation lies in the optical spectrum, another and a very important problem is solved. This is the problem of visual monitoring the aircraft's spatial attitude in the process of take-off or landing. In case take-off or landing is performed automatically, the pilot is able to follow the operation of the automatic equipment by watching variations of the symbol configuration, produced by the beams of sources of electromagnetic radiation, and interfere expeditiously in the process of aircraft control in the event of great errors in automatic flight control, or even switch promptly to manual flying in the event of an automatic equipment failure. This enables a significant increase in reliability and safety of aircraft take-off and landing, a sharp decrease in the number of aircraft accidents, and ensures a reliable stand-by for the system by including the pilot into aircraft control, because the reliability of a crew, according to US data, is 10–100 times higher than that of an individual radio command channel. It is the more so because the system retains its exceptional accuracy even in the case of manual control.

If, in this case, the beams 44 (FIGS. 30 and 31) of the sources 43 making up the group of markers designate a number of marker points 45, each of them indicating a definite distance to the take-off and landing platform, and these beams are produced by electromagnetic radiation in the visible spectrum, the marker points 45 become visible in space at a considerable range and the pilot is able to watch the process of his aircraft approaching to these points 45 and to get ready for certain operations. For example, observation of the flare initiation point 45 permits exact indication of a point in space, wherein the pilot is to flare the aircraft out and change over to level flight.

As has already been mentioned, to increase the coverage of the system under conditions of reduced visibility in fog, electromagnetic radiation producing pencil beams with a small divergence is to be selected in the far or near infrared band. Specifically, sources of electromagnetic radiation may be molecular $CO_2$ lasers generating in the wavelength of 10.6 mu. Infrared radiation converts atmospheric moisture from drops to vapor, burns channels in fog and in this way moves back the limit of the beam overall attenuation. The coverage of the system, in this case, grows manyfold. Such sources should be installed first of all to delineate the estimated take-off and landing path, that is to employ them as the sources of the course and glide slope group. For example, referring to FIG. 34, such sources of electromagnetic radiation should be the sources 1, 8 and 29. If, in this case, as has been mentioned above, the beams of electromagnetic radiation are a combination of electromagnetic radiation with wavelengths in the infrared band and the visible spectrum, the system becomes visual. Infrared radiation burns through the fog and forms a channel wherein the visible beam is directed.

The accuracy of the proposed take-off and landing system and its coverage also depend upon the directivity of electromagnetic beams; they grow with increase in the directivity of the beams producing directed extended references. The coverage of the system grows with increase in the directivity of beams primarily due to the increase in the distance from the take-off and landing platform to the point where the electromagnetic beams overlap.

Owing to their divergence, electromagnetic beams gradually grow in diameter as they recede from the source and at a certain distance their diameters become so large that they overlap.

Thus, if pencil electromagnetic beams with a divergence of about 5° are employed, the distance to the point of overlapping is of the order of 1 km and grows sharply, when the divergence is decreased. Such distance reaches 200 km with a beam divergence of five angular minutes.

Secondly, with increase in the directivity of electromagnetic beams, the energy density of electromagnetic radiation also increases in the beam and, consequently, the density of scattered energy increases, too. This allows employment of less sensitive receivers aboard an aircraft and facilitates separation of a useful signal against the background of the environment. The accuracy of the system also grows with increase in the directivity of electromagnetic beams owing to a decrease in the cross section of directed extended references produced by these electromagnetic beams.

The directivity of electromagnetic beams, as mentioned above, can be achieved either by using sources of electromagnetic radiation, producing beams with small divergence, e.g. lasers, or by using various collimators, e.g. lenses, mirrors, etc.

The directivity of electromagnetic beams is dependent on the wavelength and grows with its decrease. That is why the thinnest pencil beams are produced by sources of electromagnetic radiation in the gamma range, primarily, gamma-ray masers.

Laser and maser generated beams are best suited to meet the above requirements. Divergence of laser or maser beams amounts to several angular minutes and in many a case approaches the natural diffraction divergence. Besides, laser (maser) beams exhibit high density of electromagnetic energy that no other electromagnetic source can provide. Finally, lasers (masers) generate, as a rule, in a narrow electromagnetic spectrum making the selection of a wavelength of electromagnetic radiation to lie within an atmospheric window undoubtedly easier. Lasers (masers) operate on one or several wavelengths and laser (maser) emission possesses and extremely high spectral density facilitating isolation of a useful signal against the background of environment.

The process of discrimination of directed extended references against the background of the environment is facilitated when electromagnetic beams producing these references can be modulated. To this end, sources of electromagnetic radiation are equipped with modulators. These modulators may be provided either for all sources of electromagnetic radiation, included in a take-off and landing system, or for sources of one of the groups, e.g. the course and glide slope or marker group, or for some sources of a group, e.g. sources of the main pair, according to the above described embodiments of the take-off and landing system.

Modulation of electromagnetic radiation may be either frequency or amplitude modulation. When the proposed take-off and landing system is made as visual, modulation may be just periodic shutting down of a beam with the result that it disappears periodically.

Such flickering of a beam with a certain frequency significantly facilitates the process of visual beam search and detection, because it attracts the pilot's attention.

The frequency of flickering of the order of 1 Hz increases the pilot's confidence in the favorable outcome the take-off or landing because of its sedative effect on the pilot.

Faster frequency of flickering causes anxiety, whereas slower frequency is depressing.

Variations of the time interval between flickers may serve to transmit various information to the aircraft, e.g. airfield code, magnetic landing heading, etc.

All embodiments of the proposed aircraft take-off and landing system, as has already been pointed out, are based on a novel principle different from the fundamental principles of all currently employed take-off or landing systems, including the radio localizer and glide slope transmitter systems.

This principle consists in employment of directed extended references produced by electromagnetic pencil beams with a small divergence, intended, primarily, to form a symbol of a specified configuration to be perceived aboard an aircraft owing to scattering of energy of electromagnetic radiation in the atmosphere.

The foregoing proves that the known and currently used methods of performing aircraft take-off and landing cannot ensure the process of aircraft take-off or landing with the aid of the proposed take-off and landing system and a new simple and reliable method is to be developed to provide for the entire process of take-off or landing at all stages.

The process of take-off or landing with the aid of the proposed take-off and landing system, whatever embodiment is used of the large variety, starts with the moment an aircraft is brought into the coverage of extended directed references produced by pencil beams of sources of electromagnetic radiation, capture of these directed extended references, and a symbol being formed by said beams.

Such entering the coverage of directed extended references, that is the coverage of a take-off and landing system, is necessary for performing both take-off and landing. In the case of take-off, entering the coverage of the system consists in taxiing the aircraft to the departure line on a take-off and landing platform, then capture is effected of the symbol produced by the beams of additional sources of electromagnetic radiation positioned at the end of the take-off and landing platform, in accordance with the systems of FIGS. 24, 26, 28, 35.

If, in this case, the wavelength of electromagnetic radiation producing the beams is selected in the visible spectrum, the pilot is able to see the beams delineating the side boundaries 10 and 10' or the center line SS of the take-off and landing platform 3, and places the aircraft A so that it is on the center line SS of the take-off and landing platform. In this case, the symbol formed by the beams 36 and 40 of the additional sources 35 and 39 positioned as in one of FIGS. 24, 26 or 28 acquires a specified configuration. From this moment on, the aircraft A is ready to take off with the aid of the proposed take-off and landing system.

In the case of landing, the aircraft A is lead into the coverage of the proposed take-off and landing system by anone of the known methods of bringing an aircraft out to the landing heading at an assigned flight level with the aid of any known short-range navigation facilities. The aircraft may, for example, be led out from the rectangular course, or directly by signals of airfield homing radio stations, radars, or by ground control, etc. After the aircraft is led out to the landing heading at an assigned flight level and at an assigned range from the take-off and landing platform, it comes within the coverage of the sources of the course and glide slope group installed as in anyone of the embodiments of the take-off and landing system. The airborne receiving equipment captures the system and a symbol is produced in the instrument; it is one of the above described symbols with a configuration determined by the arrangement of sources on the flight platform. If the wavelength of electromagnetic radiation producing beams is selected within the visible spectrum, the pilot is able to see the beams and the symbol. From this moment on the aircraft is ready for landing with the aid of the proposed take-off and landing system.

It should be once more pointed out that the system may be embodied as a take-off system and as a landing system.

The proposed take-off and landing system is henceforth referred to as "the system" meaning both the take-off and landing versions, but keeping in mind the difference in the arrangement of sources in the two embodiments.

The foregoing suggests that the processes of bringing an aircraft into the coverage of directed extended references, both for take-off and landing, have much in common. However, the process of bringing an aircraft into the coverage of directed extended reference for landing is undoubtedly more complicated and demands greater skill and effort.

If the proposed system comprises one source (e.g. the source 1 of FIG. 2) of electromagnetic radiation, its beam 4 producing a symbol and indicating the course and glide slope of the estimated take-off and landing path W, the process of bringing the aircraft A into the coverage of this beam for take-off consists in the aircraft A reaching the lift-off point V, the source 1 being installed in the immediate vicinity of this point. This happens in the process of the take-off run of the aircraft A from the departure line, wherefrom the aircraft starts moving, to the lift-off point V wherein the aircraft A reaches the lift-off speed. As the aircraft A reaches the lift-off point V, it enters the coverage of a directed extended reference.

In this case, taxiing on the take-off and landing platform is performed with the aid of any known airfield facilities currently in use, e.g. airfield light equipment. It should be, however, kept in mind that capture of a directed extended reference occurs either at the departure line or in the process of approaching the lift-off point V.

As the aircraft approaches the lift-off point (this point is shown in FIG. 35 illustrating an embodiment of the proposed system made as a take-off system), the symbol (FIG. 3) produced by the beam 4 gradually acquires the specified configuration (cI square) and signifies that the aircraft is on the estimated take-off path W.

If an aircraft lands through the use of a system comprising one source of electromagnetic radiation, e.g. as in FIG. 2, after acquisition of the beam of this source, the magnitude and direction of deviation of the aircraft A from the course and glide slope of the estimated landing path are determined by the distortions of the specified symbol configuration produced by the beam 4 and shown in FIG. 3. If, in this case, the symbol has the configuration shown in the lIII square, for example, it means that the aircraft is to the left and below the estimated landing path. And to bring the aircraft to this estimated landing path, it is necessary to maneuver in space so as to move the aircraft upwards and to the right, watching the symbol regain its proper configuration. The maneuver can be considered completed when the symbol acquires the configuration shown in the cI square.

After the symbol acquires the specified configuration the aircraft is piloted by strictly keeping to this configuration of the symbol.

The aircraft, in this case, flies along the estimated landing path W, tracking very closely the heading and glide slope.

If the proposed system comprises two or more sources of electromagnetic radiation, some of them, as mentioned above, form the course and glide slope group (FIGS. 4, 5, 6, 8, 10, 11, 13, 14, 16, 17, 19, 20, 21, 23) and the others, the landing lights group (FIGS. 24, 26, 28), and the group of markers (FIGS. 30 and 31).

Let us first consider the process of piloting an aircraft with the aid of the course and glide slope group of sources only. This is justified by the fact that an aircraft usually is not piloted using all groups of sources at a time.

If the proposed system comprises two or more sources of electromagnetic radiation, the beams of these sources, as mentioned above, form a take-off or landing corridor by limiting it from different sides (e.g. FIGS. 8, 10, 11, 13, 14, 16, 17, 19, 20, 21, 22).

In this case, before the aircraft is piloted along the estimated take-off or landing path, it is necessary to determine the magnitude and direction of deviation of the aircraft from the take-off or landing corridor by distortions of the symbol specified configuration, to perform maneuvers to enter this corridor, then correct the aircraft path so that the symbol acquires the specified configuration and only then fly the aircraft along the take-off or landing path W by keeping the specified symbol configuration.

For example, if an aircraft takes off through the use of the proposed system made as a take-off system (FIGS. 14, 17 or 21), the distorted symbol configuration during the take-off run at first corresponds to the cV square (FIGS. 15 and 18) when the aircraft A is on the center line SS of the take-off and landing platform 3 outside the take-off corridor W, or to the squares IV or rV when the aircraft A is, respectively, to the left or right of the center lines SS of the take-off and landing platform 3 also outside the take-off corridor K. As the aircraft A approaches the lift-off point V, it is first brought into the take-off corridor K (II squares of FIGS. 15, 18 and 22) and then approaches the lift-off point V. If the aircraft A enters the take-off corridor K moving to the left of the center line SS of the take-off and landing platform 3, the distortion corresponds to the lII square, when moving to the right of the center line, it corresponds to the rII square. Corrections of the aircraft's path are to make the symbol acquire the specified configuration corresponds to the cI square. At this moment, the path of the aircraft A coincides with the estimated take-off path and the aircraft A starts climbing along this estimated take-off path.

If the aircraft A lands through the use of the same systems (FIGS. 14, 17, 21), the process of bringing the aircraft A into the landing corridor K is similarly performed making use of the distortions of the specified symbol configuration of FIGS. 15, 18 and 22 and, when the specified configuration is obtained, the aircraft A starts descending along the estimated landing path W. Let us consider by way of example a case when distortions of the symbol configuration correspond to the mIV square. In this case, the aircraft A is to the left and below the landing corridor K. The maneuver to bring the aircraft A into the landing corridor K is performed so that the aircraft A starts moving upward and to the right. The symbol gradually acquires the configuration corresponding to the lIII square, which means that the aircraft A is below the glide slope and to the left of the course of the estimated landing path. Then, the symbol gradually approaches its specified configuration (the cI square) and the aircraft A approaches to the estimated landing path W.

When the aircraft A is piloted along the estimated take-off or landing path W, its deviations from this path are also determined by distortions of the specified symbol configuration.

Various embodiments of the proposed system feature symbols of different configurations depending on the arrangement of sources on the flight platform 2.

Figure 11:
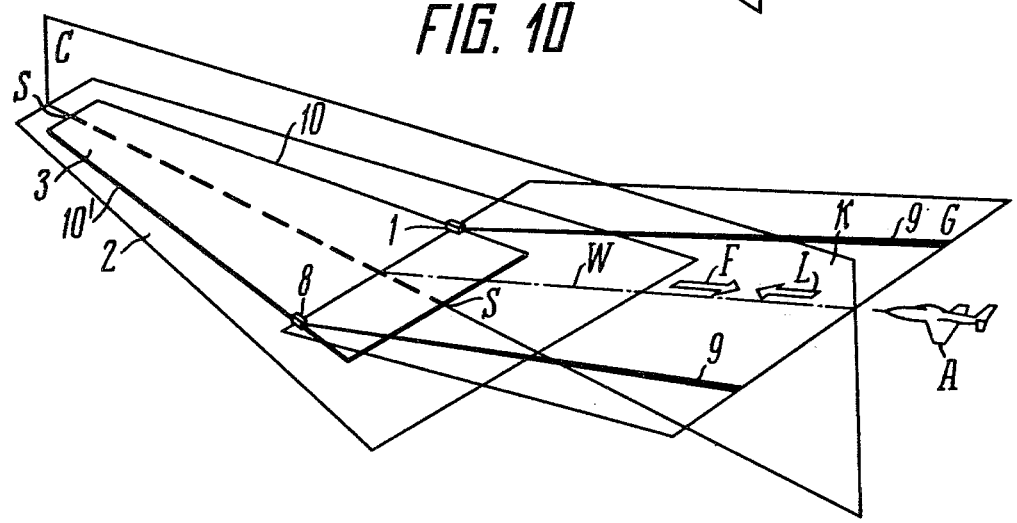
FIG. 11 shows an embodiment of the take-off and landing system with one main pair of sources of electromagnetic radiation, positioned on the side boundaries of a take-off and landing platform, in accordance with the invention.
Figure 20:
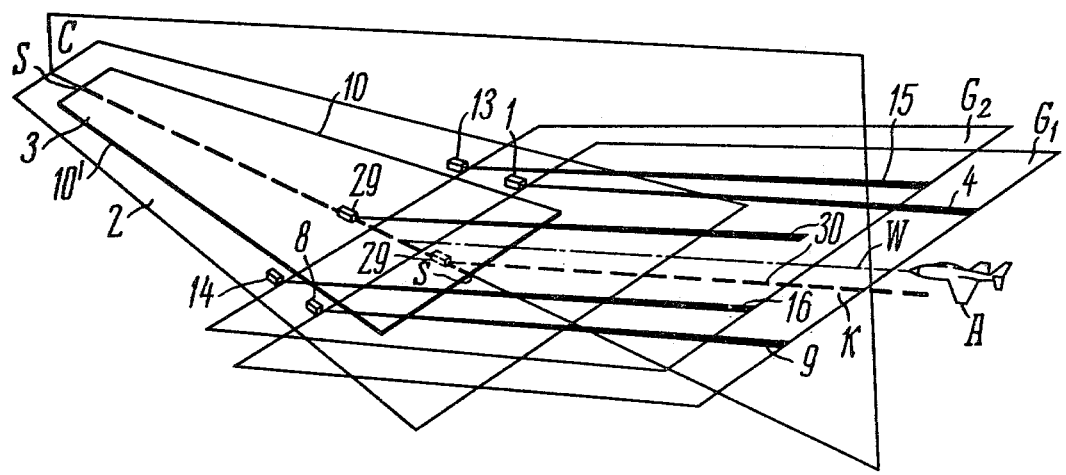
FIG. 20 shows an embodiment of the take-off and landing system with two pairs of sources of electromagnetic radiation, positioned in pairs on either side of the center line of a take-off and landing platform and a fifth source positioned on its center line, in accordance with the invention.

Some embodiments of the proposed system comprise sources positioned on the center line SS of the take-off and landing platform 3 (FIGS. 2, 5, 6, 8, 19, 20, 21, 23). Other embodiments comprise no such sources, but use sources of electromagnetic radiation arranged on either side of the center line SS of the take-off and landing platform 3 (FIGS. 10, 13 and 16) arbitrarily or symmetrically about this center line SS (FIGS. 11, 14, 17). There exist embodiments comprising both sources placed on the center line SS of the take-off and landing platform 3 and sources arranged symmetrically on the opposite sides of this center line SS (FIGS. 20, 21 and 23).

When the system comprises one or several sources 1, 8 or 29 (FIGS. 2, 5, 6, 8 or 21) of electromagnetic radiation positioned on the center line SS of the take-off and landing platform 3, the beams 4, 9 or 30 of these sources 1, 8 or 29 produce projections which, in turn, produce symbol components positioned vertically, when the aircraft A is in the course plane C (e.g. the projections 5 of FIGS. 3, 7, 9 or the projection 31 of FIG. 22). In this case, if the aircraft A deviates from the course plane C, these components of a symbol deflect from the vertical and make a certain angle with this vertical (e.g. the lI or rI squares of FIGS. 3, 7, 9, 22).

Deflection of symbol's vertical components from the upright position is an easy and simple indication of not only the deviation of the aircraft A from the course of the estimated take-off or landing path W, but also an indication of the direction and magnitude of this deviation. Respective tables of distortions of the specified configuration of a symbol are a vivid illustration of this.

If a symbol is produced by the beams 4, 9, 15, 16, 23, 24 (FIGS. 10, 11, 13, 14, 16, 17) of the sources 1, 8, 13, 14, 21, 22 of electromagnetic radiation arranged symmetrically about the center line SS of the take-off and landing platform 3, deviations of the aircraft A result in upsetting the symmetry of the specified symbol configuration, e.g. FIGS. 12, 15, 18 (lI, rI, lII, rII, lIII, rIII squares).

To bring the aircraft A back to the course of the take-off or landing path W, upright position of the symbol's components or the symbol's symmetry is to the restored.

Deviations of the aircraft A from the glide slope of the take-off or landing path W are also determined by distortions of the specified symbol configuration. There are also two methods of detecting these deviations.

If the proposed system comprises one or several sources of electromagnetic radiation with beams oriented in the glide slope plane, e.g. the systems of FIGS. 2, 4, 5, 6, 7, 10, 11, 13, 14, 16, 17, 19, 20, 21, 23, their projections producing the horizontal components of a symbol, any deviation of the aircraft A from the glide slope of the estimated take-off or landing path W makes these components deflect from the horizontal direction and make a certain angle therewith. This is also vividly illustrated in respective tables of distortions of the specified symbol configuration (FIGS. 3, 7, 12, 18, 22).

A second method of determination of deviations of the aircraft A from the glide slope of the estimated take-off or landing path W is employed, when the beams of the sources of electromagnetic radiation of the embodiment of the proposed system used in this case feature a symmetrical configuration. These embodiments are shown in FIGS. 8, 14, 17 and 23.

In such cases, the specified symbol configuration symmetry about the horizontal is upset when the aircraft A deviates from the glide slope of the estimated take-off or landing path W (FIGS. 9, 15, 18).

It is necessary to restore either the horizontal position of these components or the symbol's symmetry to bring the aircraft A to the glide slope of the estimated take-off or landing path W.

As has already been mentioned above, the beams of sources of electromagnetic radiaton delineate various limits of the take-off or landing corridor K, e.g. its side, upper and lower limits. If the aircraft A goes out of the limits of this corridor K, the symbol produced by the beams of sources of electromagnetic radiation is distorted so that the beam projections acquire some common direction. For example, the projections 5, 11, 17, 18, 25, 26 (FIG. 18) and projections 5, 11, 31 (FIG. 22) in the tIV square are directed to the left and upward of their arbitrary points 7, 12, 19, 20, 27, 28 and 7, 12, 32. This means that the aircraft A is outside the take-off or a landing corridor K, to the right and below this corridor, and the task is now to return it into this corridor. The process of returning the aircraft A into the take-off or landing corridor K is described in detail above.

If the aircraft A is in the course plane C and deviates from the glide slope of the estimated take-off or landing path W, e.g. downward, and goes beyond the lower limit of this corridor K, the projection 31 (FIG. 22) of the beam 30 (FIG. 21) changes its position for an opposite one, still remaining vertical. This moment indicates that the aircraft A crosses the lower limit of the take-off or landing corridor K. The projections 5 or 11 (FIG. 22) also change their positions for the opposite in the same way, when the aircraft A goes over (FIG. 21) to the right or left side limit of the take-off or landing corridor K, still staying in the glide slope plane.

If, in this case, the beams 4, 9, 15, 16 (FIG. 14) of the sources 1, 8, 13 and 14 of electromagnetic radiation or the beams 4 and 9 (FIG. 23) of the sources 1 and 8 define the side boundaries 10 and 10' of the take-off and landing platform 3, the aircraft A going beyond the side limits of the take-off or landing corridor K is at the same time evidence of the aircraft A being outside the side boundaries 10 and 10' of the take-off and landing platform 3. If, in this case, the path of the aircraft A is not corrected, the aircraft A is to miss the take-off and landing platform 3 and safe landing is not ensured.

Approaching the limits of the take-off or landing corridor K by the aircraft A may be detected by the direction and degree of distortion of the specified symbol configuration, e.g. the tables of distortions of FIGS. 15, 18, 22 clearly indicate that the l squares correspond to the aircraft A being situated closer to the left side limit of a take-off or landing corridor. The r squares, on the contrary, indicate that the aircraft A is closer to the right side limit.

If the proposed system comprises the landing lights group of sources (FIGS. 24, 26, 28) besides the course and glide slope group of sources (FIGS 1, 2, 4, 5, 6, 8, 10, 11, 13, 14, 16, 17, 19, 20, 21, 23), the beams of these sources and the symbol produced by these beams ensure the entire take-off process from the beginning of the take-off run to the lift-off, as well as the entire landing process at the last stage, immediately before the aircraft A touches the surface of the take-off and landing platform 3, and its landing run.

As mentioned above, take-off of the aircraft A starts with the moment of capturing the beams 36 and/or 40 (FIGS. 24, 26, 28) of the additional sources 35 and/or 39.

When the beams 36 alone are available (FIG. 24), the course of the aircraft A is maintained by the symmetry of the symbol (FIG. 25) produced by the beams 36 of electromagnetic radiation. The receiver of electromagnetic radiation is to be installed aboard the aircraft so that it is somewhat higher than the plane of orientation of the beams 36. In this case the specified symbol configuration of FIG. 25 placed in the cI square is distorted and resembles the one in the cII square. In this case, deviations from the course plane C are perceived as upsetting the symmetry (lII or rII squares). The aircraft A is run to take-off along the center line SS of the take-off and landing platform 3 up to the lift-off point by preserving the symbol symmetry about the vertical 6. After the aircraft A lifts off the surface of the take-off and landing platform 3, take-off is performed by the beams of the sources of the course and glide slope group, e.g. through the use of the system of FIG. 14 or 23 with the aid of the symbol produced by the beams of the sources of these systems. For some time, the symbol produced by the beams 36 of the additional sources 35 may be used.

If the source 39 alone (FIG. 26) is available from the group of additional sources, take-off is performed by keeping the specified symbol configuration produced by the beam 39 of FIG. 27 in the cI square and holding this beam 39 in the course plane.

If the source 35 and 39 are available at a time (FIG. 28), take-off is performed by distortions of the specified configuration of the symbol produced by the beams 36 and 40 shown in the cI square of FIG. 29.

For some time, after the aircraft A lifts off the surface of the take-off and landing platform 3, the symbol produced by the beams 36 and 40 may be used for orientation.

When the aircraft A lands through the use of the symbol produced by the beams of the sources of eletromagnetic radiation of any embodiment of the course and glide slope group, e.g. the system of FIG. 17 or 21, the beams 36 and/or 40 (FIGS. 24, 26, 28) of the additional sources 35 and/or 39 are captured, and the pilot is able to proceed to piloting the aircraft by the symbol produced by these beams 36 and/or 40.

However, piloting the aircraft by the symbol produced by these beams 36 and/or 40 starts after flying over the flare initiation point wherefrom the aircraft is flattened out. In this case, the aircraft A is flown towards the surface of the take-off and landing platform 3 by the straightening configuration of the symbol, approaching the specified configuration (FIGS. 25, 27, 29). When the symbol acquires the specified configuration, the aircraft touches the surface of the take-off and landing platform 3.

Landing run is performed similarly to the take-off run. And deviation of the aircraft A from the course is determined by deflections of the vertical component of the symbol produced by the projection 41 (FIGS. 27, 29) of the beam 40 (FIGS. 26, 28) from the upright position or by upset symmetry of the symbol produced by the projections 37 (FIGS. 25, 29) of the beam 36 (FIGS. 24, 28).

If the aircraft A banks in the process of take-off or landing, this banking is perceived as a turn of the entire symbol as a whole. In this case, the symbol is turned about the point A (FIGS. 7, 9, 12, 15, 18, 22, 25, 27, 29).

The configuration of a symbol turned about the point A is not shown for it can be easily imagined. During such a turn, the horizontal components of the symbol, e.g. the projections 5 and 11 of FIGS. 12, 18, 22 of the beams 4 and 9 of FIGS. 10, 11, 16, 17, 19, 21 are as though deflected from the horizontal direction as viewed by an observer. In reality, these projections retain their horizontal direction and a spatial turn is performed by the banking aircraft A. To recover, the controls of the aircraft A are to be operated so that the projections 5 and 11 of the beams 4 and 9 are positioned horizontally. As mentioned above, this feature of the proposed system significantly facilitates the process of piloting especially when the system is visual, because the symbol produces so-called cross-bar. it is essential that the range to the take-off and landing platform should be indicated in the course of landing. It is currently determined with the aid of radars by the moment of overflying ground-based radio markers. In the proposed system, the assigned range to the take-off and landing platform 3 (FIGS. 30 and 31) is determined by passing the marker points 45 produced by the electromagnetic beams 44. These marker points 45 indicated the range to the outer, middle and inner marker locators, as well as the flare initiation point.

In the process of landing, the aircraft A successively passes these points and the moment of passing each of them is determined by distortions of the specified symbol configuration dependent on the orientation of the beams 44 (FIGS. 32 and 33). The moment of reaching the assigned range occurs when the symbol acquires the specified configuration (the VII square). If the system is visual, the pilot is able to watch each marker point even at long distances, as well as the entire process of approaching this point. The proposed system ensures a very high accuracy of ranging, no worse than 10–15 m. This is of particular value for determining the aircraft flare initiation, since it permits the aircraft to be lead to the flare initiation point with a high accuracy of 0.5–1 m in altitude and 10–15 m in range.

If the aircraft A lands with the aid of the proposed system and the beams of the sources of electromagnetic radiation of the system form a broken path consisting of several legs, the aircraft is at first flown along a leg of the landing path with the glide slope set at one angle by keeping the specified configuration of the symbol produced by the beams of the additional sources indicating the course and glide slope of this leg of the path, then it is piloted along the next leg of the path with the glide slope set at another angle by also keeping the specified configuration of the symbol produced by the beams of the next additionsl sources of electromagnetic radiation, etc. The aircraft is thus successively piloted along separate legs of the landing path and then, finally, it is piloted along the last leg by the specified configuration of the symbol produced by the beams of the sources of electromagnetic radiation installed at the beginning of the take-off and landing platform, whereupon the process of descending along the glide slope is completed and landing is performed. The course of the broken landing path is maintained the same at all stages. For example, when the system of FIG. 36 is used, its beams 4, 9, 30, 4', 9', 30' being indications of the estimated landing path W with one bend, the aircraft A is first flown along the steeper leg $W_2$ of this path by keeping the specified configuration of the symbol produced by the beams 4', 9' and 30', then it is transferred gradually to a flatter leg $W_1$ of the path by also keeping the specified configuration of the symbol produced by the beams 49 and 30. Since in this embodiment of FIG. 36 the sources 1', 8' and 29' are arranged like the sources 1, 8 and 29, the specified symbol configuration looks the same for both legs of the estimated path of FIG. 22.

When piloting the aircraft along the steeper leg $W_2$, the symbol produced by the beams 4', 9' and 30' is maintained in the position shown in the cI square of FIG. 22. Then, as the aircraft approaches the second leg $W_1$ of the path, it is piloted by the symbol produced by the beams 4, 9 and 30 by also maintaining its configuration shown in the cI square of FIG. 22.

When switching over to piloting the aircraft along the flatter leg $W_1$, the symbol produced by the beams 4', 9' and 30' is given up and the aircraft is then piloted by the symbol produced by the beams 4, 9 and 30.

Each step of the method ensuring take-off and landing of the aircraft A through the use of any embodiment of the proposed system is convered in detail above.

Let us once more outline briefly the sequence of all steps.

The process of take-off of the aircraft A with the aid of any embodiment of the proposed system made as a take-off system consists, as mentioned above, in bringing the aircraft into the coverage of extended directed references produced by the beams 36 and/or 40 of the additional sources 35 and/or 39 of electromagnetic radiation positioned, for example, as in FIGS. 24, 26, 28. Then, the aircraft A performs its take-off run to the lift-off point V where it reaches the assigned lift-off speed and moves along the estimated take-off path W climbing along the path designated by the beams of the sources of electromagnetic radiation of the course and glide slope group made as in one of the embodiments of the proposed system, e.g. of FIG. 17, 21 or 25. At all stages, the pilot keeps the specified symbol configuration of FIGS. 29, 18 and 22.

The process of landing is absolutely similar with the reversed sequence of steps.

At first, the aircraft A is brought into the coverage of directed extended references produced by the beams of the sources of the course and glide slope group positioned as in one of the embodiments of the systems (FIGS. 2, 4, 5, 6, 8, 10, 11, 13, 14, 16, 17, 19, 20, 21, 23, 34), then the direction and magnitude of the deviation of the aircraft A from the landing corridor K are determined by the distortions of the specified symbol configuration (FIGS. 3, 7, 9, 12, 15, 18, 22) the aircraft is lead into this corridor and, maintaining the specified configuration of the symbol which corresponds to the aircraft A being on the estimated landing path W, descent is started by piloting the aircraft along this path W. The moment of passing within the assigned range from the take-off and landing platform 3 is determined by the marker points 45 produced by the beams 44 of electromagnetic radiation (FIGS. 30 and 31), e.g. the range to the outer, middle and inner marker locators, while the aircraft approaches the flare initiation point also designated by the marker point 45. The moment of passing a marker point is determined by reaching the specified configuration of the symbol produced by the beams 44 of FIGS. 32 or 33. Then, the aircraft A is flattened out and piloted by the symbol produced by the beams 36 and/or 40 of the additional sources 35 and/or 39 of FIGS. 25, 27, 29. When the symbol acquires the specified configuration, the aircraft A touches the surface of the take-off and landing platform 3. The landing run is performed by keeping the specified configuration of the symbol (FIGS. 25, 27, 29).

As the foregoing indicates, the basic principle of piloting the aircraft A with the aid of the proposed system is the principle of maintaining the specified symbol configuration. And all deviations of the aircraft A from the estimated take-off or landing path W are eliminated if distortions of the specified symbol configuration are corrected.

The proposed system, as mentioned above, may be employed to perform landing of the aircraft A on the deck 3 of the ship 49. In this case (FIGS. 37, 38, 39, 40, 41, 42), it is located on the landing deck 3 of this ship 49. When installed on the landing deck 3, the system carries additional information on angular and linear motions of the deck 3 caused by rough sea surface in addition to the information about the spatial attitude of the aircraft A described in detail above. This information is manifested as periodic distortions of the specified configuration of the symbol produced by the beams of the sources of electromagnetic radiation installed on the surface of the landing deck 3 of the ship 49. Periodic distortions of the specified symbol configuration are an indication of periodic deviations of the aircraft A from the estimated landing path W fluctuating in space about its middle position. All possible motions of the landing deck 3 have been described above.

Not only linear motions of the landing deck 3 in places of location of the sources of electromagnetic radiation, but also angular motions of this deck 3 can be easily determined by distortions of the specified symbol configuration. Linear motions of the landing deck may be detected by distortions of the specified configuration of the symbol produced by the beams of the sources of electromagnetic radiation of any of the systems of FIGS. 37, 38, 39, 40, 41, 42. The heel of the landing deck may be easily detected by watching periodic turns of the symbol, as mentioned above, produced by the beams of the sources of electromagnetic radiation positioned as in FIGS. 39, 40, 42 and 41. The components of this symbol produced by the beams 4 and 9 of the sources 1 and 8 deviate periodically from the horizontal direction. Longitudinal angular motions of the landing deck 3 may be easily detected by periodic repetitions of distortions of components of the symbol produced, for example, by the beams 4 and 9 of the sources 1 and 8 of electromagnetic radiation positioned as in FIGS. 38 or the beams 23, 4, 15 and 24, 9, 16 of the sources 21, 1, 13 and 22, 8, 14 arranged as in FIG. 40. As the foregoing examples indicate, these sources are installed on the landing deck 3 along the center line SS or parallel thereto.

These periodic motions of the landing deck are, as a rule, less in amplitude than the dimensions of the landing corridor W, and in the course of landing the aircraft A, therefore, flies within this landing corridor.

A special note should be made of the peculiarities of take-off or landing of the aircraft A through the use of the embodiments of the proposed system (FIG. 44) ensuring its take-off or landing along a curved path W, as well as the embodiments of the proposed system (FIGS. 45, 46, 48, 49, 50) producing a kinematic symbol.

The use of the embodiment of the system (FIG. 44) ensuring take-off or landing of the aircraft A along a curved path W leaves the take-off or landing method unaltered, since the pilot does not see the turns of the beams 4, 9 and 30 of the sources 1, 8 and 29 of electromagnetic radiation but perceives aboard the aircraft A only distortions of the specified configuration of the symbol (FIG. 22) produced by these beams (4, 9 and 30). His mission is to maintain the specified configuration of the symbol (the cI square of FIG. 22) and, in this case, the aircraft A flies automatically along the curved path W, its shape being set by the system.

In case another embodiment of the proposed system is employed, comprising the marker sources 43 (FIG. 30, 31) of electromagnetic radiation, their beams 44 being turned to move the marker point 45 in space at an assigned speed corresponding to the speed of movement of the aircraft A along the estimated landing path W, the aircraft A is piloted along the estimated landing path W at a speed ensuring constant configuration of the symbol produced by the beams 44.

If the symbol is distorted and acquires the configuration shown in the VI square, this means that the speed of the aircraft A becomes less than the assigned speed of movement of the aircraft A along the estimated landing path W.

If the symbol is distorted and acquires the configuration shown in the VIII square, this means that the speed of movement of the aircraft A becomes more than the assigned. The speed of flight of the aircraft A is corrected by the distortions of the specified symbol configuration in order to maintain the specified configuration. In this case, the aircraft flies at an assigned speed.

In case an embodiment of the proposed system (FIGS. 45, 46, 48, 49 and 50) producing a kinematic symbol is employed, no additional steps are required and the essence of the forementioned steps is not changed too. The basic step is still maintaining the specified symbol configuration of a somewhat different type (FIG. 47). Peculiarities of this configuration have been described in detail above.

As has been already mentioned, the beams of sources of electromagnetic radiation may be produced by electromagnetic radiation of various wavelengths as well as provided with modulators. These features of the proposed system leave the method of take-off or landing absolutely unaffected; they enable the pilot to orient with the aid of the proposed system.

Visual embodiments of the proposed system should be particularly pointed out. In these cases, all steps in the process of piloting the aircraft A are performed visually.

The proposed take-off and landing system is developed as a unified system requiring no additional or auxiliary subsystems. It ensures all stages of aircraft take-off and landing. The system permits not only piloting an aircraft along the estimated take-off or landing path, maintaining the course and glide slope, but also performing take-off run of the aircraft and its landing run, as well as determination of the assigned distance to the take-off and landing platform. Same instrumental means is used during all stages of take-off and landing. Such an instrumental means is the symbol of a specified configuration, produced by beams of electromagnetic radiation.

The symbols of any embodiment of the proposed system look principally alike when produced by the course and glide slope group of sources, as well as by the landing lights group and the group of markers. This permits the use of a single principle of orientation al all stages of take-off and landing and constitutes the basic advantage over known systems.

First of all the extremely high accuracy and ease of aircraft pilotage ensured by the proposed system are to be emphasized. As mentioned above, all embodiments of the system ensure detection of the deviation of the aircraft A from the extimated take-off or landing path W within several centimeters, as well as bringing the aircraft to the flare initiation point with an accuracy of 0.5-1 m in altitude and 10-15 m in range, something no currently used landing system can do, including the international ILS system. Specifically, the proposed system is 100-1,000 times more accurate than any of the known systems.

Besides, such accuracy of the proposed system is far higher than the requirements as to the permissible vertical deviation of the aircraft in the area of the runway threshold, put forth in the draft ICAO program for development of a new landing approach system.

The proposed take-off and landing system may be purely instrumental or visual by selecting proper sources of electromagnetic radiation. Even when visual, the proposed system remains a reliable instrumental means, since it ensures pilotage of an aircraft with a predetermined accuracy. In this case, no additional equipment is installed aboard the aircraft.

The strong emphasis placed on visual landing systems by experts is a matter of common knowledge. Thus, French and US specialists believe that the problem of all-weather landing does not necessarily exclude the pilot from taking part in aircraft control, since reliability of a crew is 10-100 times higher than the reliability of a radio channel.

It should be kept in mind that even with a visual system the aircraft may carry proper receiving equipment and high-accuracy automatic facilities. In this case, the pilot gets a reliable means of checking automatic equipment operation and is able to change over to manual flying at any moment.

The advantages of visual embodiments of the proposed system are evident, because, in this case, the system becomes more reliable since, as far as is known, changing over from flying on instruments to visual flying and observation of the outside space requires a period of 3-5 sec necessary for visual accomodation and identification of ground objects. A modern aircraft covers from 150 to 200 m during this time interval. The period becomes longer during night landung.

Besides, the proposed system produces a take-off or landing corridor formed by electromagnetic beams, acting, in visual embodiments, as approach and lead-in lights and provide favourable conditions for a pilot to orient in space. This advantage of the system becomes still more evident on board a ship, when no other means can be used to provide approach and lead-in lights at sea.

The possibility of designating marker points at sea is also an undoubted advantage of the system.

Embodiments of the proposed system, adapted to be installed on the landing deck of a carrier ship ensure reliable information on linear and angular motions of the landing deck in rough sea conditions, something no other known radio system can provide.

Besides, the proposed take-off and landing system permits designation of the horizon for a landing aircraft and determination of this bank, another thing no other known radio system can provide.

The photograph of FIG. 51 shows the arrangement of the proposed system on an airfield and gives an idea of what a take-off or landing corridor produced by electromagnetic pencil beams looks like. The photograph illustrates the embodiment of the system of FIG. 21. In the photograph, all beams are directed upward, which means that the point, wherefrom the picture was taken, lies below the corridor formed by electromagnetic beams. This photograph corresponds to the cIV square of FIG. 22 with the only difference that the beam 30 (FIG. 21) of the source 29 of electromagnetic radiation positioned on the center line SS of the take-off and landing platform 3 is made up of two parallel beams, one of them being a back-up.

The photograph of FIG. 52 shows a symbol produced by electromagnetic beams of the embodiment of FIG. 34. The picture was taken from the cockpit of an aircraft landing through the use of the proposed system from a distance of 9 km to the take-off and landing platform.

The proposed system permits employment of a reliable and easy method of flying an aircraft along the estimated take-off or landing path, consisting exclusively in continuous maintaining the specified symbol configuration, resulting in the aircraft's flying along the estimated take-off or landing path. The method is universal for all legs of this path, a feature no other currently used method of aircraft take-off or landing possesses.

It can be thus said with confidence that the proposed take-off and landing system not only fulfils the basic requirements of the draft ICAO program for development of a new landing approach system, but also outperforms the program requirements.

The principle advantage of the proposed system lies in its capability to solve the problem of take-off. And, finally proper selction of sources of electromagnetic radiation can make the system both visual and instrumental.

In summary, it might be well to point out that the proposed take-off and landing system comprising lasers as sources of electromagnetic radiation may be installed on any airfield in 2 or 3 hours and be ready for operation immediately thereafter.

What is claimed is:

1. An aircraft take-off and landing system of the type which provides the pilot with information relating to the location of a desired take-off and landing platform and the glide slope thereto, comprising:
    at least one source of electromagnetic radiation within preselected wavelength limits one of which is visible and directed skywards for producing a beam of said electromagnetic radiation which is a pencil beam with a divergence less than 5°, and means for rotating the beam of said at least one source for making said beam describe a closed conical surface, within which said desired take-off or landing path lies, thereby producing a symbol visually appearing to the pilot as a straight line rotating at a variable angular speed whereby said speed is a function of the deviation of the aircraft from said take-off and landing platform glide slope.

2. A take-off system as claimed in claim 1, wherein said at least one source of electromagnetic radiation comprises:
    a main source of electromagnetic radiation, positioned on a take-off and landing platform, on its center line, in the immediate vicinity of the aircraft's lift-off point on the surface of the take-off and landing platform;
    a means for rotation of the beam of said main source of electromagnetic radiation, connected to said main source and ensuring uniform rotation of said main beam beam, making said main beam beam describe a closed conical surface as a circular cone;
    an axis of rotation of the beam of said main source of electromagnetic radiation, coinciding, at each instant of time, with said take-off path;
    a symbol produced by said beam of the main source, having, when an aircraft is on said estimated take-off path, a specified configuration looking like a line rotating at a constant angular speed;
    an additional source of electromagentic radiation positioned on said take-off platform in the immediate vicinity of the end of said take-off and landing platform on the center line of said take-off and landing platform;
    a means for rotation of the beam of said additional source of electromagnetic radiation connected to said additional source and ensuring uniform rotation of said additonal source beam with the result that said additional source beam describes a closed conical surface as a circular cone;
    an axis of rotation of said beam of said additional source of electromagnetic radiation, parallel to the surface of said take-off and landing platform and extending along the center line of said platform;
    a symbol produced by said beam of the additional source, having, when an aircraft is on the surface of said take-off and landing platform on its center line, a specified configuration looking like a line rotating at a constant angular speed;

3. A landing system as claimed in claim 1, wherein said at least one source of electromagnetic radiation comprises:
    a main source of electromagnetic radiation positioned on a take-off and landing platform on its center line, at the beginning of said take-off and landing platform;
    a means for rotation of the beam of said main source, connected to said main source and ensuring uniform rotation of said main source beam with the result that said main source beam describes a closed conical surface as a circular cone;
    an axis of rotation of the beam of said main source of electromagnetic radiation, coinciding, at each instant of time, with said landing path;
    a symbol produced by said beam of the main source, having, when an aircraft is on said estimated landing path, a specified configuration looking like a line rotating at a constant angular speed;
    an additional source of electromagnetic radiation, positioned on the flight platform in the immediate vicinity of the end of said take-off and landing platform on the center line of said take-off and landing platform;
    a means for rotation of the beam of said additional source of electomagnetic radiation, connected to said additional source and ensuring uniform rotation of said additional source beam with the result that said additional source beam describes a closed conical surface as a circular cone;
    an axis of rotation of said beam of said additional source of electromagnetic radiation parallel to the surface of said take-off and landing platform and extending along the center line of said platform;
    a symbol produced by said beam of the additional source, having, when an aircraft is on the surface of said take-off and landing platform on its center line, a specified configuration looking like a line rotating at a constant angular speed.

4. A landing system as claimed in claim 1, wherein said at least one source of electromagnetic radiation comprises:
    a first source of electromagnetic radiation, positioned on the take-off and landing platform on its center line at the beginning of said take-off and landing platform;
    second and third sources of electromagnetic radiation, arranged on said flight platform at the beginning of said take-off and landing platform symmetrically about its center line and behind said first source of electromagnetic radiation on the side boundaries of said take-off and landing platform; and further comprising
    a means for rotation of the beams of all of said three sources of electromagnetic radiation, operably connected to each of said sources of electromagnetic radiation with the result that each of said beams describes a closed circular conical surface;
    said second and third sources and said means for rotation being arranged such that the axis of rotation of the beam of said second and third sources extend in a common glide slope plane;
    said first source and said means for rotation being arranged such that the axis of rotation of the beam of said first source of electromagnetic radiation is oriented in a course plane and extending always below said glide slope plane, wherein said course plane is located perpendicularly to and along the center line of said take-off and landing platform; and
    said conical surfaces produced by the beams of all said three sources of electromagnetic radiation, forming, on intersection, an equisignal zone wherein the estimated landing path lies.

5. A take-off and landing system as claimed in claim 1, wherein said at least one source of electromagnetic radiation is provided with a modulator.

6. An aircraft take-off and landing system of the type which provides the pilot with information relating to the location of a desired landing platform and the glide slope thereto, comprising:

a source of electromagnetic radiation, positioned on the center line of said take-off and landing platform for producing a pencil beam of said electromagnetic radiation within preselected wavelength limits one of which is visible, said beam being directed skywards and having a divergence less than 5°;

a means for rotation of the beam of said source of electromagnetic radiation, connected to said source and ensuring uniform rotation of its beam, making said beam describe a closed conical surface as a circular cone; and said source and said means for rotation being arranged such that the axis of rotation of said beam of electromagnetic radiation coincides with said glide slope;

whereby a symbol produced by said beam of electromagnetic radiation, when an aircraft is on said glide slope, appears as a line in space rotating at a constant angular speed.

* * * * *